United States Patent
Hirano et al.

(10) Patent No.: US 11,079,832 B2
(45) Date of Patent: Aug. 3, 2021

(54) IMAGE FORMING APPARATUS THAT PERFORMS AC-DC AND DC-DC VOLTAGE CONVERSIONS, AND HAVING A POWER SUPPLY THAT REDUCES POWER CONSUMPTION IN LOW CONSUMPTION POWER MODE

(71) Applicant: CANON KABUSHIKI KAISHA, Tokyo (JP)

(72) Inventors: Yuya Hirano, Odawara (JP); Junya Kobayashi, Suntou-gun (JP); Masamitsu Watahiki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/700,992

(22) Filed: Dec. 2, 2019

(65) Prior Publication Data

US 2020/0183484 A1 Jun. 11, 2020

(30) Foreign Application Priority Data

| Dec. 7, 2018 | (JP) | JP2018-229504 |
| Dec. 27, 2018 | (JP) | JP2018-244383 |
| Dec. 27, 2018 | (JP) | JP2018-244384 |
| Jan. 22, 2019 | (JP) | JP2019-008740 |

(51) Int. Cl.
| *G06F 1/3234* | (2019.01) |
| *G03G 15/00* | (2006.01) |
| *G06F 1/3296* | (2019.01) |
| *H02M 7/49* | (2007.01) |
| *H02M 3/24* | (2006.01) |
| *H02M 5/40* | (2006.01) |
| *H02M 7/162* | (2006.01) |
| *H02M 7/5387* | (2007.01) |
| *G06F 1/32* | (2019.01) |

(52) U.S. Cl.
CPC ....... *G06F 1/3284* (2013.01); *G03G 15/5004* (2013.01); *G06F 1/3296* (2013.01); *G06F 1/32* (2013.01); *H02M 3/24* (2013.01); *H02M 5/40* (2013.01); *H02M 7/1623* (2013.01); *H02M 7/49* (2013.01); *H02M 7/53871* (2013.01)

(58) Field of Classification Search
None
See application file for complete search history.

(56) References Cited

U.S. PATENT DOCUMENTS

| 8,159,092 | B2 * | 4/2012 | Luthi | H02J 9/005 307/130 |
| 8,503,197 | B2 | 8/2013 | Hayasaki | |
| 9,621,061 | B2 | 4/2017 | Hayasaki | |
| 9,787,205 | B2 | 10/2017 | Kobayashi | |
| 10,536,084 | B2 | 1/2020 | Kobayashi | |

(Continued)

FOREIGN PATENT DOCUMENTS

JP 2010-142071 6/2010

*Primary Examiner* — Haris Sabah
(74) *Attorney, Agent, or Firm* — Venable LLP

(57) ABSTRACT

The power supply is capable of operating in a first state and a second state having a consumption power lower than a consumption power of the first state. The power supply controls a first power supply in the first state such that a first DC voltage is a first voltage and controls the first power supply in the second state such that the first DC voltage is a second voltage lower than the first voltage.

19 Claims, 31 Drawing Sheets

(56) References Cited

U.S. PATENT DOCUMENTS

| | | | |
|---|---|---|---|
| 10,536,085 B2 | 1/2020 | Hirano | |
| 2005/0154931 A1* | 7/2005 | Oh | G06F 9/5083 |
| | | | 713/300 |
| 2010/0149840 A1 | 6/2010 | Hayasaki | |
| 2012/0159228 A1* | 6/2012 | Arimoto | G03G 15/80 |
| | | | 713/340 |
| 2013/0307917 A1 | 11/2013 | Hayasaki | |
| 2015/0256079 A1* | 9/2015 | Kimura | H02M 3/33507 |
| | | | 363/15 |
| 2016/0085199 A1* | 3/2016 | Aoki | G03G 15/80 |
| | | | 363/15 |
| 2017/0060215 A1* | 3/2017 | Yanagawa | G06F 1/3284 |
| 2019/0199880 A1* | 6/2019 | Abe | G06F 3/1229 |

* cited by examiner

FIG. 12A  AC DC CONVERTER OUTPUT VOLTAGE SWITCHING SIGNAL 2010

FIG. 12B  OUTPUT VOLTAGE 2180

FIG. 12C  REGULATOR START-UP SIGNAL 4010 (DC/DC CONVERTER START-UP SIGNAL 3010)

FIG. 12D  DC/DC CONVERTER START-UP SIGNAL 3010

FIG. 12E  LOAD SW CONTROL SIGNAL 6010

FIG. 15A  AC DC CONVERTER OUTPUT VOLTAGE SWITCHING SIGNAL 2010

FIG. 15B  OUTPUT VOLTAGE 2180

FIG. 15C  DC/DC CONVERTER START-UP SIGNAL 3010

FIG. 15D  REGULATOR START-UP SIGNAL 4010

FIG. 15E  LOAD SW CONTROL SIGNAL 6010

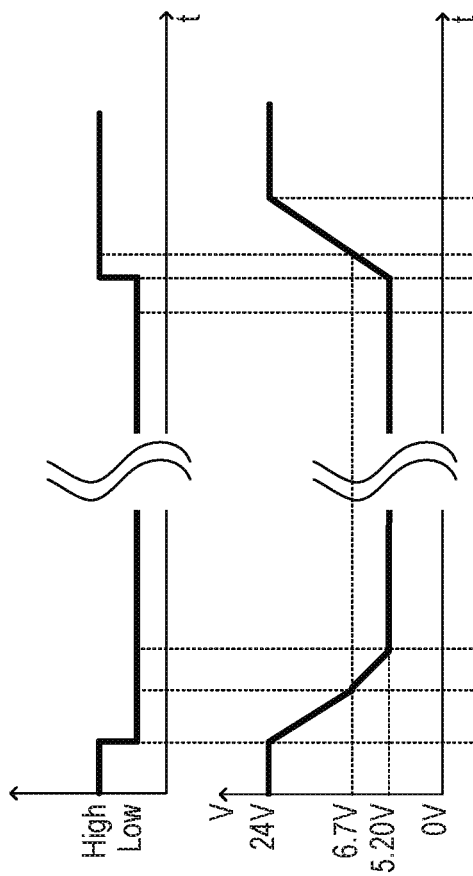
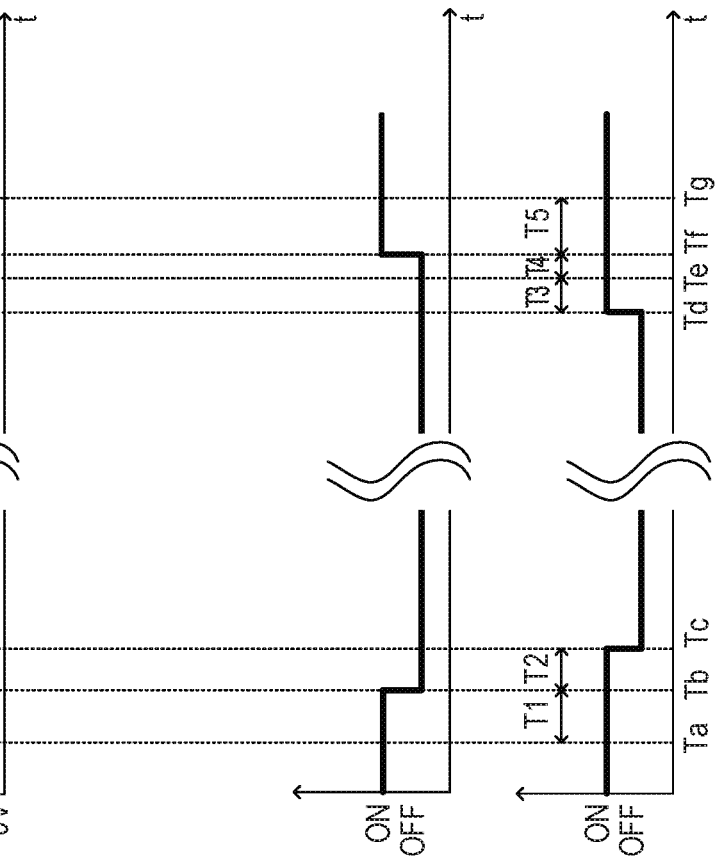

IMAGE FORMING APPARATUS THAT PERFORMS AC-DC AND DC-DC VOLTAGE CONVERSIONS, AND HAVING A POWER SUPPLY THAT REDUCES POWER CONSUMPTION IN LOW CONSUMPTION POWER MODE

BACKGROUND OF THE INVENTION

Field of the Invention

The present invention relates to a power supply and an image forming apparatus, particularly to a technique intended to reduce a consumption power in a low consumption power mode.

Description of the Related Art

As disclosed in Japanese Patent Application Laid-Open No. 2010-142071, the following power supply has been proposed to reduce a consumption power in a sleeping state of a printer or the like. This proposes a power supply that reduces a switching loss of a DC/DC converter by lowering an input voltage to a step-down DC/DC converter of a synchronous rectification type, and setting an ON-duty of a high-side FET at 100% to output an input voltage as it is.

Such a conventional power supply involves a problem in that, in a low consumption power mode in which a load current of the DC/DC converter is very small, a proportion accounted for by a consumption power of a control unit in the DC/DC converter becomes large with respect to a consumption power of the entire power supply. For that reason, it is desired to reduce the consumption power in the low consumption power mode while maintaining a voltage accuracy of an output voltage.

Even in a case where input voltage of the step-down DC/DC converter is decreased and an ON-duty of the high-side FET is set at 100%, there is the following concern about use of a P channel FET as the high-side FET. That is, there is a risk that the output voltage decreases due to an on-resistance of the FET and a resistive component of a coil, which decreases a voltage accuracy of the output voltage with respect to a target voltage. In addition, in a case where an N channel FET having an on-resistance lower than an on-resistance of a P channel FET is used as the high-side FET to improve efficiency in the step-down DC/DC converter, the following constraint is imposed. That is, in order to set the ON-duty of the high-side FET at 100%, the high-side FET needs to be driven with a voltage higher than the input voltage of the step-down DC/DC converter. This requires an additional power supply circuit that generates a voltage higher than the input voltage of the step-down DC/DC converter. Otherwise, the high-side FET cannot be turned ON at an ON-duty of 100%. For that reason, in a case where the input voltage is close to a target voltage of the output voltage and the additional power supply circuit is not provided, there is a risk that the output voltage decreases to fail to provide a targeted output voltage, and the voltage accuracy of the output voltage with respect to the target voltage decreases.

SUMMARY OF THE INVENTION

One aspect of an embodiment of the present invention is a power supply that reduces a consumption power in a low consumption power mode while maintaining a voltage accuracy of an output voltage in the power supply.

Another aspect of an embodiment of the present invention is a power supply capable of operating in a first state and a second state having a consumption power lower than a consumption power of the first state, the power supply including: a first power supply configured to convert AC voltage into a first DC voltage and output the first DC voltage; a second power supply configured to convert the first DC voltage output from the first power supply into a second DC voltage lower than the first DC voltage in the first state, the second power supply configured to stop operation in the second state; a third power supply configured to stop operation in the first state, the third power supply configured to operate to perform constant voltage control such that the second DC voltage is a target voltage when the first state transitions to the second state; and a first control unit configured to control the first power supply such that the first DC voltage is a first voltage in the first state, the first control unit configured to control the first power supply such that the first DC voltage is a second voltage lower than the first voltage in the second state.

A still another aspect of an embodiment of the present invention is an image forming apparatus including a power supply and an image forming unit configured to form an image on a recording material, the image forming apparatus configured to receive power supplied from the power supply, the power supply being capable of operating in a first state and a second state having a consumption power lower than a consumption power of the first state, the power supply including: a first power supply configured to convert AC voltage into a first DC voltage and output the first DC voltage; a second power supply configured to convert the first DC voltage output from the first power supply into a second DC voltage lower than the first DC voltage in the first state, the second power supply configured to stop operation in the second state; a third power supply configured to stop operation in the first state, the third power supply configured to operate to perform constant voltage control such that the second DC voltage is a target voltage when the first state transitions to the second state; and a first control unit configured to control the first power supply such that the first DC voltage is a first voltage in the first state, the first control unit configured to control the first power supply such that the first DC voltage is a second voltage lower than the first voltage in the second state.

Still further aspects of embodiments of the invention will be apparent from detailed description of the present invention and with reference to the accompanying drawings.

Further features of the present invention will become apparent from the following description of exemplary embodiments with reference to the attached drawings.

BRIEF DESCRIPTION OF THE DRAWINGS

FIG. 31A, FIG. 31B, FIG. 31C and FIG. 31D are timing charts illustrating transitions between stand-by and sleeping in Embodiment 11.

DESCRIPTION OF THE EMBODIMENTS

Preferred embodiments of the present invention will now be described in detail in accordance with the accompanying drawings.

Embodiment 1

A case where a power supply 108 in Embodiment 1 is applied to an image forming apparatus will be described below with reference to FIG. 1 to FIG. 4. The power supply according to the present invention may be applied to another kind of apparatus having an operating state, a stand-by state, and a sheet feeding state.

[Description of Laser Beam Printer]

Figure 1:
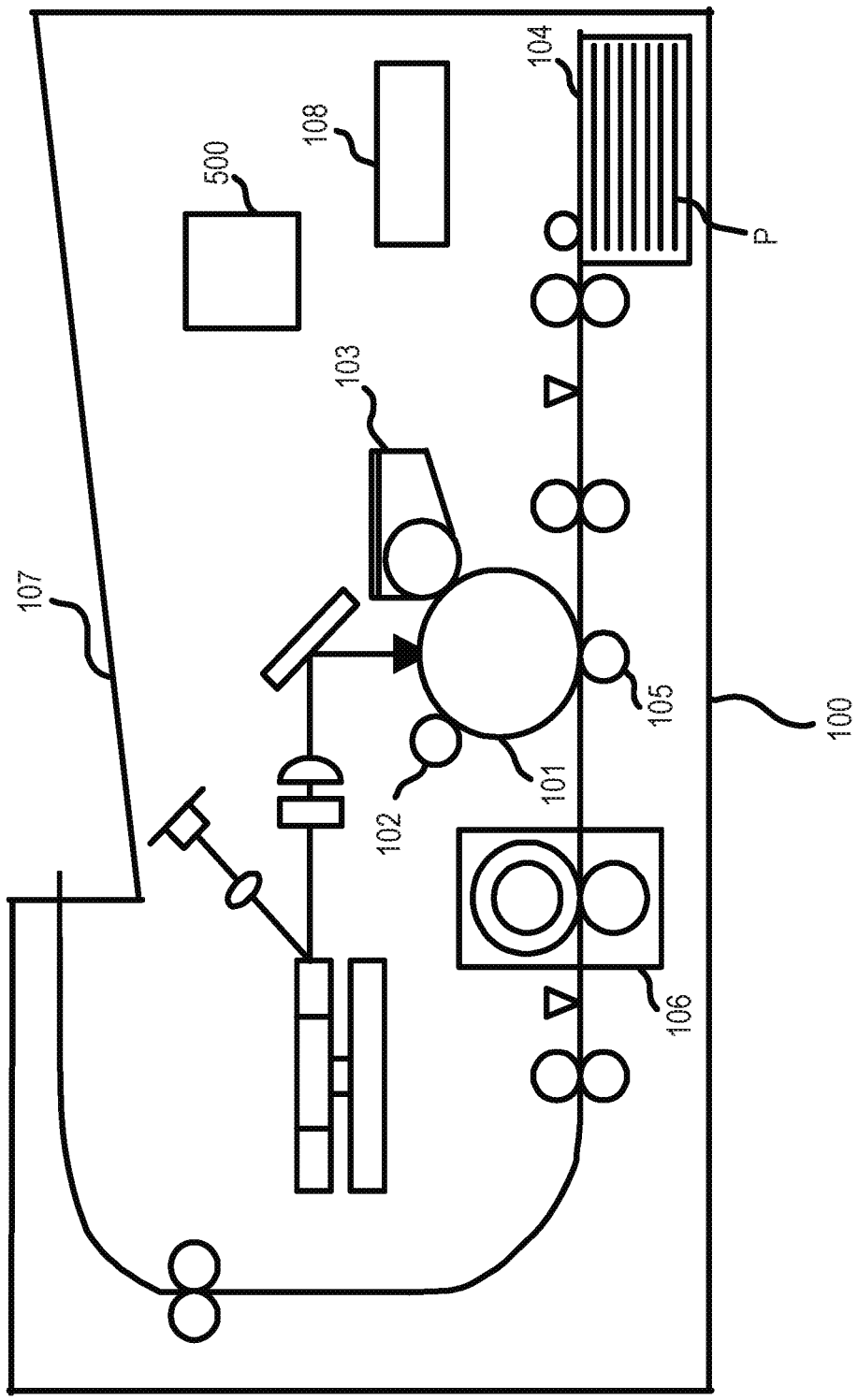
FIG. 1 is a schematic diagram of a laser beam printer in Embodiments 1 and 2.

FIG. 1 illustrates a schematic configuration of a laser beam printer as an example of the image forming apparatus. A laser beam printer 100 (hereinafter, referred to as printer 100) includes a photosensitive drum 101, a charge unit 102, and a developing unit 103. The photosensitive drum 101 is an image bearing member on which an electrostatic latent image is formed. The charge unit 102 charges the photosensitive drum 101 uniformly. The developing unit 103 develops the electrostatic latent image formed on the photosensitive drum 101 with toner to form a toner image. The toner image formed on the photosensitive drum 101 (the image bearing member) is transferred by the transfer unit 105 onto a sheet P as a recording material supplied from a cassette 104, and the unfixed toner image transferred on the sheet P is fixed by a fixing device 106 and discharged to a tray 107. These photosensitive drum 101, charge unit 102, developing unit 103, and transfer unit 105 form an image forming unit. The printer 100 also includes the power supply 108, and the power supply 108 supplies electric power to a driving unit, such as a motor, and a control unit 500. The control unit 500 includes a CPU (not illustrated), which controls image forming operation by the image forming unit, conveying operation of the sheet P, and the like. According to a requested voltage accuracy of the CPU, a specification of a voltage accuracy in Embodiment 1 is set, for example, at 5 V±5% (Vmin=4.75 V to Vmax=5.25 V). After a lapse of a predetermined time period since the printer 100 ends printing operation, the printer 100 transitions to a stand-by state where the printing operation can be performed immediately. After another lapse of the predetermined time period, the printer 100 transitions from the stand-by state to a sleeping state, which is a low consumption power mode, to reduce a consumption power during stand-by. The printer 100 includes three states including the sleeping state being a second state, the stand-by state being a first state, and a printing state, and the control unit 500 transitions to one of these states. The image forming apparatus to which the power supply according to the present invention is applicable is not limited to the configuration illustrated in FIG. 1.

[Description of Power Supply]

Figure 2:
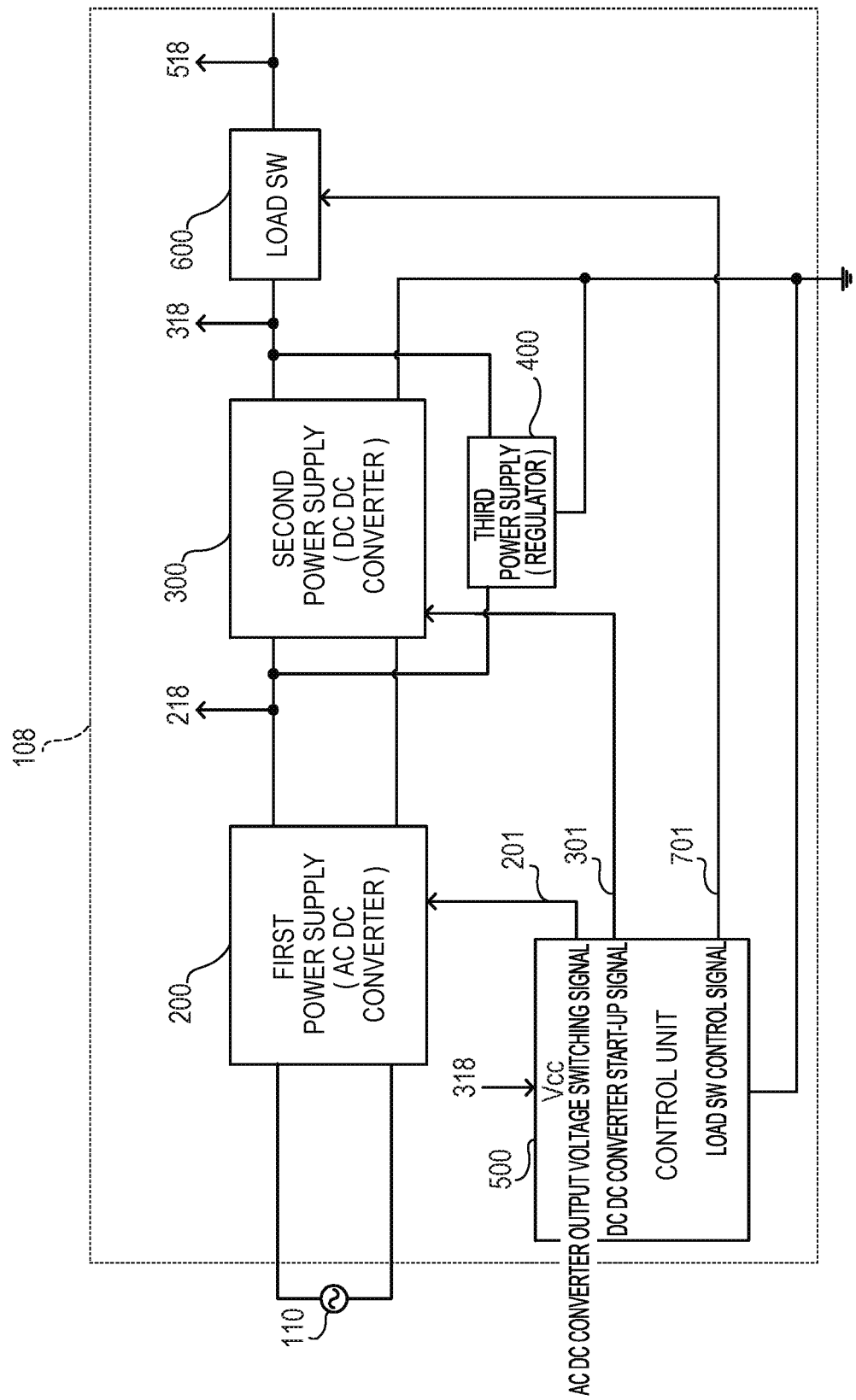
FIG. 2 is a schematic diagram of a power supply in Embodiment 1.

FIG. 2 illustrates an example of a schematic configuration of the power supply 108. AC voltage input from an AC power supply 110 is input into a first power supply 200 (hereinafter, referred to as AC/DC converter 200) and converted by the AC/DC converter 200 into a DC output voltage 218 being a first DC voltage (hereinafter, referred to as output voltage 218), to be stepped down. The output voltage 218 is input into a second power supply 300 (hereinafter, referred to as DC/DC converter 300) and stepped down by the DC/DC converter 300 to a DC output voltage 318 being a second DC voltage (hereinafter, referred to as output voltage 318). A third power supply 400 (hereinafter, referto as regulator 400) is connected to input and output of the DC/DC converter 300. The output voltage 318 is input into a load switch (hereinafter, expressed as load SW) 600, and by bringing a switching element of the load SW 600 into a turn-on state (connection state) or a turn-off state (non-connection state), output of an output voltage 518 to loads is controlled. The control unit 500 being a first control unit is electrically connected to the AC/DC converter 200, the DC/DC converter 300, and the load SW 600, and outputs signals to them to control them. An AC/DC converter output voltage switching signal 201 is input into the AC/DC converter 200 and is a signal to switch a target voltage of the output voltage 218. A DC/DC converter start-up signal 301 is input into the DC/DC converter 300 and is a signal to control operation and stop of the DC/DC converter 300. A load SW control signal 701 is input into the load SW 600 and is a signal to control output of the output voltage 518. To the control unit 500, the output voltage 318 is supplied as a power supply.

[Description of AC/DC Converter 200]

Figure 3:
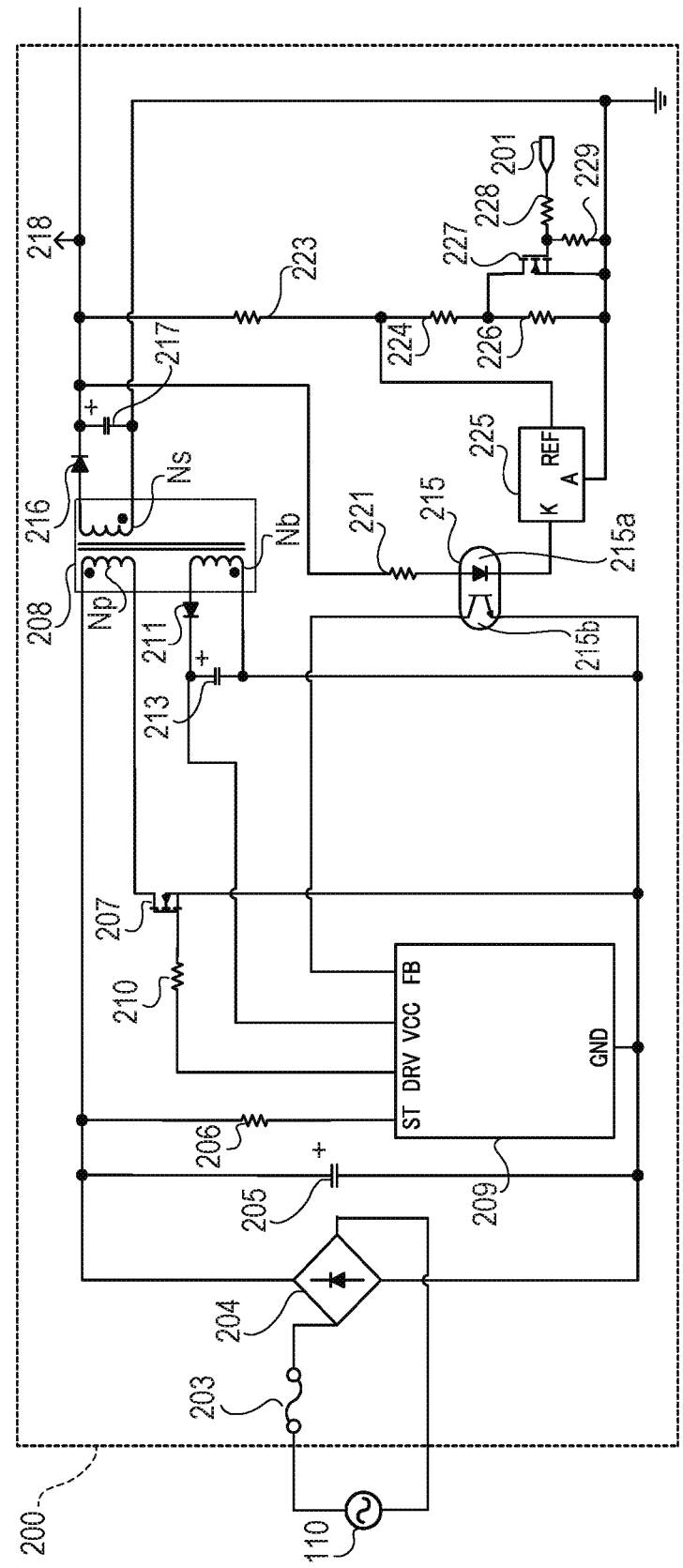
FIG. 3 is a circuit configuration diagram of a first power supply in Embodiment 1.

FIG. 3 illustrates an example of a circuit configuration of the AC/DC converter 200. The circuit configuration of the AC/DC Converter 200 will be described. The AC voltage input from the AC power supply 110 passes through a current fuse 203 for circuit protection and a rectifier diode bridge 204 to be full-wave rectified and is smoothed to be DC voltage by a primary smoothing capacitor 205 (hereinafter, referred to as smoothing capacitor 205). In addition, the DC voltage charged in the smoothing capacitor 205 is supplied through a start-up resistor 206 to a ST terminal of a power supply IC 209. When the DC voltage reaches a start-up voltage of the power supply IC 209, the power supply IC 209 starts up. The power supply IC 209 is a control unit for a field-effect transistor (hereinafter, expressed as FET) 207 being a switching element. Upon starting-up, the power supply IC 209 outputs from its DRV terminal a pulse signal for driving the FET 207 to a gate terminal of the FET 207 through a resistor 210. When the FET 207 is in a conductive state for a period during which the pulse signal is at a high level, the DC voltage of the smoothing capacitor 205 is applied across a primary winding Np of a transformer 208. At that time, a voltage is also induced on a secondary winding Ns side of the transformer 208. However, because the voltage is a voltage that makes an anode side of a diode 216 negative, the diode 216 is not in the conductive state, and thus no energy is transmitted to a secondary side of the transformer 208. Similarly, a voltage is also induced on an auxiliary winding Nb side of the transformer 208. However, because the voltage is a voltage that makes an anode side of a diode 211 negative, the diode 211 is not in the conductive state, and thus no energy is transmitted to an auxiliary winding Nb. Therefore, a current flowing through the primary winding Np of the transformer 208 includes only an exciting current of the transformer 208, and the transformer 208 accumulates energy in proportion to a square of the exciting current. The exciting current increases in proportion to time.

Next, when a pulse signal at a low level is output from the DRV terminal of the power supply IC 209, the FET 207 is in a non-conductive state from the conductive state for a period of the low-level pulse signal. When the FET 207 is in the non-conducted state, voltages with polarities reverse to polarities occurring when the FET 207 is in the conductive state are induced in the windings of the transformer 208. As a result, a voltage of which a positive polarity is on an anode side of the diode 216 is induced in the secondary winding Ns of the transformer 208, which brings the diode 216 into the conductive state. The energy accumulated in the transformer 208 is then rectified and smoothed by the diode 216 and the smoothing capacitor 217 that form a smoothing and rectifying circuit, and the output voltage 218 is output as the DC voltage. At the same time, a voltage of which a positive polarity is on an anode side of the diode 211 is induced in the auxiliary winding Nb, which brings the diode 211 into the conductive state. A capacitor 213 is charged via the diode 211, and the DC voltage charged in the capacitor 213 is supplied to a VCC terminal of the power supply IC 209.

In regard to voltage control of the output voltage 218, a case where the AC/DC converter output voltage switching signal 201 is OFF (at a low level) will be described. In the AC/DC converter 200, the voltage control of the output voltage 218 is performed as follows. First, the output voltage 218 generated on the secondary side of the transformer 208 is divided by a regulator resistor 223, a resistor 224, and a resistor 226 connected in series, and is input into a REF terminal of a shunt regulator 225. Then, a feedback signal according to a level of the voltage input into the REF terminal of the shunt regulator 225 is output from a K terminal of the shunt regulator 225. The K terminal of the shunt regulator 225 is connected to a photodiode 215a of a photocoupler 215. In addition, a phototransistor 215b of the photocoupler 215 is connected to an FB terminal of the power supply IC 209. The feedback signal output from the K terminal of the shunt regulator 225 is input into the FB terminal of the power supply IC 209 via the photocoupler 215. A resistor 221 is a resistor for limiting current flowing through the photodiode 215a (LED) of the photocoupler 215. Therefore, by outputting the pulse signal from the DRV terminal based on the feedback signal input from the FB terminal to perform switching control of the FET 207, the power supply IC 209 can control the output voltage 218 stably. A GND terminal of the power supply IC 209 is connected to a low potential side of the smoothing capacitor 205. Indications on the power supply IC 209 in FIG. 1 are names of the respective terminals.

There are two kinds of the voltage of the output voltage 218 including a voltage necessary for the stand-by state and the print state and a voltage necessary for the sleeping state, and the voltage of the output voltage 218 can be switched in each state. A reason for switching the output voltage 218 in the sleeping state is that the sleeping state need not drive the driving unit, such as a motor, and the image forming unit, and it is sufficient to output only a voltage necessary in sleeping. Therefore, the target voltage of the output voltage 218 is set at a value as close to a target voltage of the output voltage 318 as possible, to improve an efficiency of the power supply 108. In addition, the output voltage 218 is electrically connected via the load SW (not illustrated) to the driving unit, such as a motor, and the photosensitive drum 101, the charge unit 102, the developing unit 103, and the transfer unit 105 forming the image forming unit. The load SW (not illustrated) is in the turn-on state in the stand-by state and the print state to supply power to the driving unit, such as a motor, and the image forming unit, and is in the turn-off state in the sleeping state to reduce the consumption power.

(Switching Control of Output Voltage 218)

Switching control of the target voltage of the output voltage 218 is performed as follows. First, in the stand-by state and the print state of the printer 100, the power supply 108 supplies the output voltage 218 to the driving unit, such as a motor, and the image forming unit. At that time, the control unit 500 outputs the AC/DC converter output voltage switching signal 201 at a high level, and a voltage divided into by the resistor 228 and the resistor 229 is supplied to a gate of an FET 227. The FET 227 is then turned on, and the FET 227 becomes conductive between its drain and source, which brings about a state where the resistor 226 is negligible. This causes the output voltage 218 to be divided by the regulator resistor 223 and the resistor 224 and input into the REF terminal of the shunt regulator 225. Let a REF voltage of the shunt regulator 225 be denoted by Vref, a resistance value of the regulator resistor 223 be denoted by $R_{223}$, a resistance value of the resistor 224 be denoted by $R_{224}$, and a resistance value of the resistor 226 be denoted by $R_{226}$, and assume that an on-resistance of the FET 227 is sufficiently low to be negligible, for simplifying calculation. In the stand-by state and the print state, the output voltage 218 ($V_{24V}$) is expressed by the following Formula (1).

$$V_{24V} = V_{REF} \cdot \frac{R_{223} + R_{224}}{R_{224}} \quad \text{Formula (1)}$$

As a setting example of a specific numerical value, let $V_{24V}$=24 V.

In contrast, in the sleeping state of the printer 100, when the control unit 500 outputs the AC/DC converter output voltage switching signal 201 at a low level (0 V), the FET 227 is turned off, which makes the FET 227 nonconductive between its drain and source. This brings about a state where the resistor 226 is not negligible electrically. Assuming that current flowing when the FET 227 is OFF is 0 A for simplifying calculation, the output voltage 218 in the sleeping state ($V_{5V}$) is expressed by the following Formula (2).

$$V_{5V} = V_{REF} \cdot \frac{R_{223} + R_{224} + R_{226}}{R_{224} + R_{226}} \quad \text{Formula (2)}$$

As a setting example of a specific numerical value, let $V_{5V}$=5.2 V. As seen from the above, the output voltage 218 of the AC/DC converter 200 is switched to $V_{24V}$, a first voltage, when the AC/DC converter output voltage switching signal 201 output from the control unit 500 is at a high level, and switched to $V_{5V}$, a second voltage, when the AC/DC converter output voltage switching signal 201 is at a low level.

[Description of DC/DC Converter 300]

Figure 4:
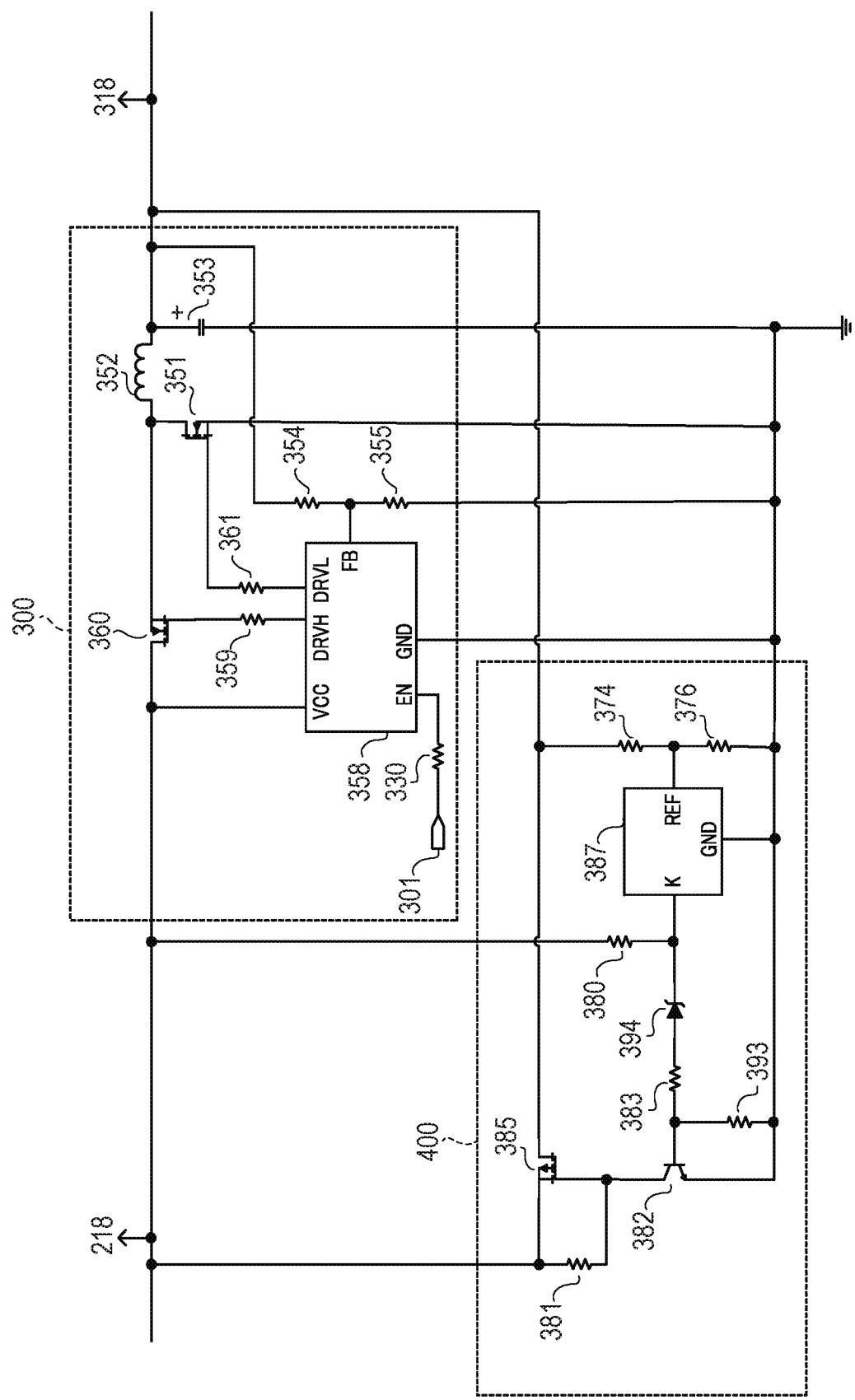
FIG. 4 is a circuit configuration diagram of a second power supply and a third power supply in Embodiment 1.

FIG. 4 illustrates an example of an internal circuit of the step-down DC/DC converter 300 and the regulator 400. A circuit configuration of the step-down DC/DC converter 300 (hereinafter, referred to as DC/DC converter 300) will be described. In the DC/DC converter 300, current flows into a capacitor 353 via an inductor 352 while an N channel high-side FET 360 being a switching element (hereinafter, referred to as high-side FET 360) is on. In contrast, while the high-side FET 360 is off, energy accumulated in the inductor 352 is output via an N channel low-side FET 351 (hereinafter, referred to as low-side FET 351). The high-side FET 360 may be P channel FET, and the low-side FET 351 may be a P channel FET or a rectifier diode.

A power supply IC 358, being a third control unit, turns on the high-side FET 360 and the low-side FET 351 alternately by PWM control. The power supply IC 358 thereby controls ON-duties of the high-side FET 360 and the low-side FET 351 while feeding the output voltage 318 back such that the output voltage 318 is equal to the target voltage. A VCC terminal is a power supply terminal of the power supply IC 358 and receives the output voltage 218. A DRVH terminal is connected to a gate terminal of the high-side FET 360 via a resistor 359. A DRVL terminal is connected to a gate terminal of the low-side FET 351 via a resistor 361. An FB terminal receives a voltage that is the output voltage 318 divided by a resistor 354 and a resistor 355. The power supply IC 358 compares the voltage input into the FB terminal with a reference voltage inside the power supply IC 358 and outputs drive signals to the DRVH terminal and the DRVL terminal so that the output voltage 318 is equal to the target voltage. In a case where the output voltage 318 is lower than the target voltage, the power supply IC 358 outputs the drive signal to the DRVH terminal so that the ON-duty of the high-side FET 360 increases. In a case where the output voltage 318 is higher than the target voltage, the power supply IC 358 outputs the drive signal to the DRVL terminal so that the ON-duty of the low-side FET 351 increases. An EN terminal is a terminal for controlling start-up and stop of the power supply IC 358. When the EN terminal receives the DC/DC converter start-up signal 301 at a high level, the power supply IC 358 starts up, and when the EN terminal receives the DC/DC converter start-up signal 301 at a low level, the power supply IC 358 stops. The EN terminal receives the DC/DC converter start-up signal 301 via a resistor 330.

Let the output voltage 318 controlled by the DC/DC converter 300 be denoted by $V_{5V\_DC/DC}$, the reference voltage inside the power supply IC 358 be denoted by $V_{FB(DC/DC)}$, and resistance values of the resistor 354 and the resistor 355 be denoted by $R_{354}$ and $R_{355}$, respectively. $V_{5V\_DC/DC}$ being the output voltage 318 is controlled to be equal to a voltage expressed by the following Formula (3).

$$V_{5V\_DC/DC} = V_{FB(DC/DC)} \cdot \frac{R_{354} + R_{355}}{R_{355}} \quad \text{Formula (3)}$$

As an example of a specific numerical value, let $V_{5V\_DC/DC}$=5.21 V.

(Power Accuracy of Output Voltage 318 Influenced by Difference in Input Voltage)

Next, a voltage accuracy of the output voltage 318 of the DC/DC converter 300 influenced by a difference of an input voltage (the output voltage 218 of the AC/DC converter 200) will be described. In a case where the input voltage is high (the output voltage 218 ($V_{24V}$)) (in the stand-by state and the print state), a voltage difference between the input voltage (24 V) and the output voltage (5.21 V) is large, and an ON-duty of the DC/DC converter 300 is small. That is, an off period of the high-side FET 360 is long during switching by the DC/DC converter 300. For that reason, there is a sufficient charging period for a capacitor in a bootstrap circuit (not illustrated) inside the power supply IC 358, which enables the capacitor to be boosted to a voltage necessary to drive the high-side FET 360, and thus the high-side FET 360 can be driven. That is, in a case where the input voltage is high, the high-side FET 360 can be driven, and thus the output voltage 318 can be controlled to the target voltage.

In contrast, in a case where the input voltage is low (the output voltage 218 ($V_{5V}$)) (in the sleeping state), the voltage difference between the input voltage (5.2 V) and the output voltage (5.21 V) is small, and the ON-duty of the DC/DC converter 300 is large. That is, the off period of the high-side FET 360 is short during switching by the DC/DC converter 300. For that reason, the charging period for the capacitor in the bootstrap circuit (not illustrated) inside the power supply IC 358 becomes insufficient, which disables the capacitor to be boosted to the voltage necessary to drive the high-side FET 360, and thus the high-side FET 360 cannot be driven sufficiently. That is, in a case where the input voltage is low, the high-side FET 360 cannot be driven sufficiently, and thus the output voltage 318 cannot be controlled to the target voltage, resulting in a drop in the output voltage. Driving the high-side FET 360 with an ON-duty of 100% means that the high-side FET 360 has no off period. This disables the capacitor in the bootstrap circuit (not illustrated) inside the power supply IC 358 to be charged. Thus, a new additional power supply circuit is needed, which creates a need for an expensive power supply IC. In addition, inexpensive power supply ICs have no additional power supply circuit, and therefore many of inexpensive power supply ICs have a limitation on a maximum ON-duty of the high-side FET 360. In Embodiment 1, a limit of a maximum ON-duty of the power supply IC 358 is defined as, for example, 80%.

In a case where a power supply IC having such a limit on its maximum ON-duty is used, when its input voltage drops and a limit value of the maximum ON-duty (e.g., 80%) is reached, the high-side FET cannot be turned on at 100%, as mentioned above. This results in a drop in the output voltage 318, failing to satisfy a required voltage accuracy of the output voltage 318. Hence, the regulator 400 is provided separately from the DC/DC converter 300. In this case, when the DC/DC converter 300 reaches its maximum ON-duty to cause the drop in the output voltage 318, the regulator 400 is caused to operate to prevent the drop in the output voltage 318.

[Description of Regulator 400]

A circuit configuration of the regulator 400 will be described. The regulator 400 is a series regulator and controls a gate-source voltage of an FET 385 to control a voltage applied to between a drain and a source of the FET 385, controlling the output voltage 318 to a constant voltage. The output voltage 318 is divided by a regulator resistor 374 and a resistor 376 and input into a REF terminal of a shunt regulator 387. Then, a feedback signal according to a level of the voltage input into the REF terminal of the shunt regulator 387 is output from a K terminal of the shunt regulator 387. A voltage of the K terminal of the shunt regulator 387 is made by pulling up the output voltage 218 with a resistor 380, passes through a Zener diode 394, is divided by a resistor 383 and a resistor 393, and is electrically connected to a base terminal of a transistor 382. A resistor 381 is connected between a gate and a source of the FET 385 and is used for stability of an electric potential between the gate and the source. The transistor 382 adjusts a voltage a gate terminal of the FET 385 using a feedback signal output from the K terminal of the shunt regulator 387. The shunt regulator 387 is any element (a comparator, an operational amplifier, etc.) capable of controlling the output voltage 318 to the target voltage. The Zener diode 394 is connected to step down a voltage of the feedback signal to turn on and off the transistor 382 reliably. If the voltage of the K terminal of the shunt regulator 387 widely ranges, the transistor 382 can be controlled without stepping down the voltage of the K terminal, and thus the Zener diode 394 can be eliminated. In a case where a dark current of the transistor 382 is low, there is no risk that the dark current turns on the FET 385, which dispenses with the voltage division by the resistor 393 and the resistor 383, and thus the resistor 393 can be eliminated.

(Constant Voltage Control)

Constant voltage control by the regulator 400 will be described. In a case where the output voltage 318 is higher than the target voltage, the voltage of the K terminal decreases, which causes a base current of the transistor 382 to decrease, and thus a collector current of the transistor 382 also decreases. The gate-source voltage of the FET 385 therefore decreases, which causes an on-resistance between the drain and the source of the FET 385 to increase, and thus the output voltage 318 decreases. In a case where the output voltage 318 is controlled by the DC/DC converter 300 to a voltage higher than a target voltage of the regulator 400, the FET 385 is in a turn-off state (the on-resistance is maximized), and thus the regulator 400 stops. In a case where the output voltage 318 is lower than the target voltage, the voltage of the K terminal increases, which causes the base current of the transistor 382 to increase, and thus the collector current of the transistor 382 also increases. The gate-source voltage of the FET 385 therefore increases, which causes the on-resistance between the drain and the source of the FET 385 to decrease, and thus the output voltage 318 increases.

Let the output voltage 318 controlled by the regulator 400 be denoted by $V_{5V\_REG}$. Letting a reference voltage of the shunt regulator 387 be denoted by $V_{REF(REG)}$, and resistance values of the resistor 374 and the resistor 376 be denoted by $R_{374}$ and $R_{376}$, respectively, $V_{5V\_REG}$ is controlled to be equal to a voltage expressed by the following Formula (4).

$$V_{SV\_REG} = V_{REF(REG)} \cdot \frac{R_{374} + R_{376}}{R_{376}} \qquad \text{Formula (4)}$$

As an example of a specific numerical value, let $V_{5V\_REG}$=5.2 V.

(Operation of Regulator)

Operation of the regulator 400 will be described. In the case where the input voltage is high (the output voltage 218 ($V_{24V}$)), the DC/DC converter 300 can perform control such that the output voltage 318 is equal to the target voltage, and thus the regulator 400 performs control to turn off the FET 385, as mentioned above. Specifically, when the DC/DC converter 300 controls the output voltage such that $V_{5V\_DC/DC}$=5.21 V, the regulator 400 feeds back a voltage of the output voltage 318 output by the DC/DC converter 300. The regulator 400 then determines that the output voltage 318 of the regulator 400 is higher than the target voltage $V_{5V\_REG}$. The regulator 400 therefore performs control so as to turn off the FET 385, as mentioned above. Next, in the case where the input voltage is low (the output voltage 218 ($V_{5V}$)), the DC/DC converter 300 cannot control the output voltage 318 such that the output voltage 318 is equal to the target voltage $V_{5V\_DC/DC}$=5.21 V as mentioned above, which causes the output voltage 318 to decrease. When the output voltage 318 falls below the target voltage of the output voltage of the regulator 400, $V_{5V\_REG}$=5.2 V, the regulator 400 starts up to perform the constant voltage control on the output voltage 318.

Next, a reason for making the target voltage $V_{5V\_REG}$ of the output voltage 318 of the regulator 400 lower than the target voltage $V_{5V\_DC/DC}$ of the output voltage 318 of the DC/DC converter 300 will be described. In a case where the regulator 400 performs control to turn on the FET 385, the controls needs to be performed with a little or little difference between the input voltage and the output voltage to the regulator 400 to reduce a loss by the FET 385. While the DC/DC converter 300 controls the output voltage 318 to the target voltage, the input voltage to the regulator 400 is high, and thus if the regulator 400 turns on the FET 385, the loss by the FET 385 increases. Hence, in a case where the DC/DC converter 300 can control the output voltage 318 to the target voltage, the target voltage of the output voltage 318 of the regulator 400 is set to be lower than the target voltage of the output voltage of the DC/DC converter 300. This configuration makes the FET 385 turned off. Here, the case where the DC/DC converter 300 can control the output voltage 318 to the target voltage means a case where the input voltage to the regulator 400 is high.

As seen from the above, in the case where the input voltage is high (the output voltage 218 ($V_{24V}$)) (in the stand-by state and the print state), the output voltage 318 is controlled by the DC/DC converter 300 to be equal to the target voltage $V_{5V\_DC/DC}$. In the case where the input voltage is high, the operation of the regulator 400 is stopped. In the case where the input voltage is low (the output voltage 218 ($V_{5V}$)) (in the sleeping state), the regulator 400 operates, and the output voltage 318 is controlled by the regulator 400 to be equal to the target voltage $V_{5V\_REG}$. The target voltages of the output voltage 318 is in a relation $V_{5V\_REG}$ (5.2 V)<$V_{5V\_DC/DC}$ (5.21 V).

(Effect of Regulator)

Next, an effect of the regulator 400 will be described. In the DC/DC converter 300, in a case where the input voltage decreases, the ON-duty of the high-side FET 360 increases to reach the maximum ON-duty up to which the power supply IC 358 can output (e.g., 80%), as mentioned above. In a state where the power supply IC 358 reaches its maximum ON-duty up to which the power supply IC 358 can output, the power supply IC 358 cannot maintain the output voltage 318 at the target voltage in a switching state, and thus the output voltage 318 decreases to be lower than the target voltage. Specifically, assume that there is no loads for the output voltage 318, and the target voltage of the output voltage 318 of the DC/DC converter 300 is $V_{5V\_DC/DC}$=5.21 V. Then, in a case where the input voltage to the DC/DC converter 300 (the output voltage 218 of the AC/DC converter 200 $V_{5V}$=about 5.2 V) decreases, the high-side FET 360 cannot be driven at 100%. The output voltage 318 of the DC/DC converter 300 ($V_{5V\_DC/DC}$=5.21 V or lower) thus decreases. Therefore, as the input voltage to the DC/DC converter 300 keeps decreasing, the output voltage 318 also decreases, and thus a specification of the voltage accuracy mentioned above cannot be satisfied. Specifically, $V_{5V\_DC/DC}$<Vmin is established.

Hence, in the case where the input voltage to the DC/DC converter 300 keeps decreasing, the regulator 400 uses the FET 385 to perform the constant voltage control on the output voltage 318, as mentioned above. Specifically, assume that there is no loads for the output voltage 318, and the target voltage of the output voltage 318 of the DC/DC converter 300 is $V_{5V\_DC/DC}$=5.21 V. Then, in a case where the input voltage to the DC/DC converter 300 (the output voltage of the AC/DC converter 200 $V_{5V}$=about 5.2 V) decreases, the high-side FET 360 cannot be driven at 100%. The output voltage 318 of the DC/DC converter 300 ($V_{5V\_DC/DC}$=5.21 V or lower) thus decreases. However, the regulator 400 feeds back the output voltage 318 and performs the constant voltage control on the output voltage 318 with the FET 385, and thus the voltage accuracy of the output voltage of the regulator 400 ($V_{5V\_REG}$=5.2 V) can be satisfied. As a result, also in the case where the input voltage to the DC/DC converter 300 keeps decreasing, the specification of the voltage accuracy mentioned above can be satisfied. Specifically, Vmin<$V_{5V\_REG}$<Vmax is established.

[Description of Control Operation]

(Transition from Stand-By State to Sleeping State)

Figure 5:
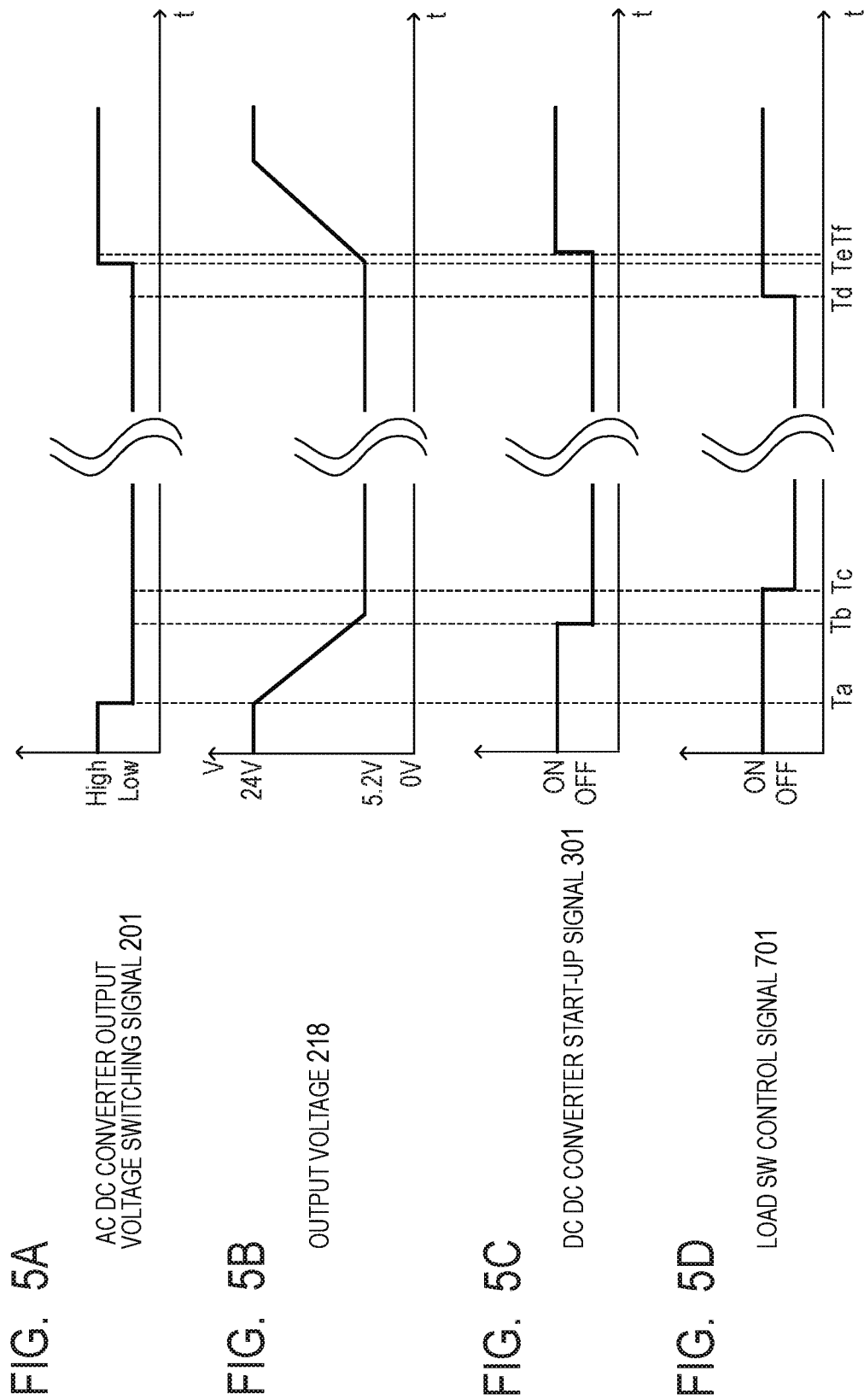
FIG. 5A, FIG. 5B, FIG. 5C and FIG. 5D are timing charts illustrating transitions between stand-by and sleeping in Embodiment 1.

FIG. 5A to FIG. 5D illustrate timing charts of operation of the power supply 108 in a case where the printer 100 transitions from the stand-by state to the sleeping state. In FIG. 5A to FIG. 5D, horizontal axes of their graphs each indicate time t. A vertical axis of FIG. 5A indicates an output of the AC/DC converter output voltage switching signal 201 (at a high level (High) or a low level (Low)). FIG. 5B illustrates a waveform of the output voltage 218 (24 V, 5.2 V). FIG. 5C illustrates an output of the DC/DC converter start-up signal 301 (ON or OFF). FIG. 5D illustrates an output of the load SW control signal 701 (ON or OFF).

A timing Ta indicates a timing at which a predetermined time period t1 elapses since the printer 100 transitions to the stand-by state. As mentioned above, when the predetermined time period elapses since the printer 100 transitions to the stand-by state, the control unit 500 causes the printer 100 to transition to the sleeping state to reduce a consumption power of the printer 100. At the timing Ta, the control unit 500 switches the AC/DC converter output voltage switching signal 201 from a high level to a low level. As mentioned above, when the AC/DC converter output voltage switching signal 201 is at the high level, the AC/DC converter 200 performs control such that the output voltage 218 is equal to 24 V. When the AC/DC converter output voltage switching signal 201 is at the low level, the AC/DC converter 200 performs control such that the output voltage 218 is equal to 5.2 V. Therefore, on and after the timing Ta, the output voltage 218 transitions from 24 V to 5.2 V according to a response time of the AC/DC converter 200.

When the output voltage 218 decreases, and the ON-duty of the power supply IC 358 of the DC/DC converter 300 is the maximum ON-duty (e.g., 80%), the output voltage 318 starts dropping. Therefore, at a timing Tb at which the ON-duty of the power supply IC 358 reaches the maximum ON-duty, the regulator 400 starts performing the constant voltage control on the output voltage 318 with the FET 385, as mentioned above. At the timing Tb at which the regulator 400 starts performing the constant voltage control with the FET 385, the control unit 500 switches the DC/DC converter start-up signal 301 from the high level to the low level. Note that a time from switching the AC/DC converter output voltage switching signal 201 from the high level to the low level by the control unit 500 until the ON-duty of the power supply IC 358 reaching the maximum ON-duty (Tb−Ta) is assumed to be determined in advance through measurement or the like. In addition, the time (Tb−Ta) is assumed to be stored in a storage unit (not illustrated) of the control unit 500 or the like. Furthermore, the control unit 500 is assumed to be capable of time keeping using a timer (not illustrated).

When the DC/DC converter start-up signal 301 is brought to the low level, the DC/DC converter 300 stops. In the sleeping state, a consumption power of the power supply IC 358 accounts for a large proportion of a consumption power of the entire power supply 108. Therefore, the consumption power in the sleeping state can be reduced by stopping the power supply IC 358 to stop the operation of the DC/DC converter 300 in a sleeping period during which the control of the output voltage 318 is performed by the regulator 400.

At a timing Tc, the control unit 500 switches the load SW control signal 701 from ON to OFF to brings the load SW 600 into a turn-off state, power supply to parts that operate only in the print state is cut off. The parts that operate only in the print state include a sheet conveyance sensor (not illustrated) for sensing a position of a sheet P under printing. This further reduces the consumption power in the sleeping state. The timing Tc is set in advance at a timing at which, after the switch of the output voltage 218 at the timing Ta, the output voltage 218 is estimated to finish transitioning to the target voltage 5.2 V after the switch. A time from the timing Ta to the timing Tc is assumed to be stored in the storage unit of the control unit 500 or the like.

(Transition from Sleeping State to Stand-by State)

Next, operation of the power supply 108 in a case where the printer 100 transitions from the sleeping state to the stand-by state will be described. When printing instructions are notified from an external device such as a personal computer (not illustrated) to the printer 100, the control unit 500 first causes the printer 100 to transition from the sleeping state to the stand-by state for printing operation.

At a timing Td at which the printing instructions are notified from the external device, the control unit 500 switches the load SW control signal 701 from OFF to ON to bring the load SW 600 into the turn-on state, to start supply of the output voltage 518. At a timing Te, the AC/DC converter output voltage switching signal 201 is switched from the low level to the high level. As mentioned above, when the AC/DC converter output voltage switching signal 201 is brought to the high level, the AC/DC converter 200 performs control such that the output voltage 218 is equal to 24 V. The output voltage 218 transitions from 5.2 V to 24 V according to the response time of the AC/DC converter 200.

At a timing Tf, the output voltage 218 increases from 5.2 V, which brings about a state where the operation is performed with the ON-duty of the power supply IC 358 of the DC/DC converter 300 being not more than the maximum ON-duty. At the timing Tf, the control unit 500 switches the DC/DC converter start-up signal 301 from the low level to the high level to start up the DC/DC converter 300. The DC/DC converter 300 performs control such that the output voltage 318 is equal to the target voltage. On and after the timing Tf at which the DC/DC converter 300 starts up, the voltage of the output voltage 318 does not drop, the regulator 400 operates to turn off the FET 385. A time from the timing Te to the timing Tf is a time during which the output voltage 218 increases to a voltage corresponding to the state where the operation can be performed with an ON-duty being not more than the maximum ON-duty of the power supply IC 358. This time (Tf−Te) is assumed to be determined in advance through measurement or the like. In addition, the time (Tf−Te) is assumed to be stored, for example, in the storage unit (not illustrated) of the control unit 500.

As seen from the above, according to Embodiment 1, in the sleeping state where the output voltage 318 is controlled by the regulator 400, the power supply IC 358 controlling the DC/DC converter 300 is stopped. The consumption power in the low consumption power mode can be thereby reduced while a voltage accuracy of the output voltage is maintained.

Embodiment 2

Embodiment 2 will be described. Description of main parts is the same as that for Embodiment 1, and thus the same configurations as the configurations in Embodiment 1 will be denoted by the same reference characters and will not be described. Points different from Embodiment 1 will be exclusively described.

[Description of Power Supply in Embodiment 2]

Figure 6:
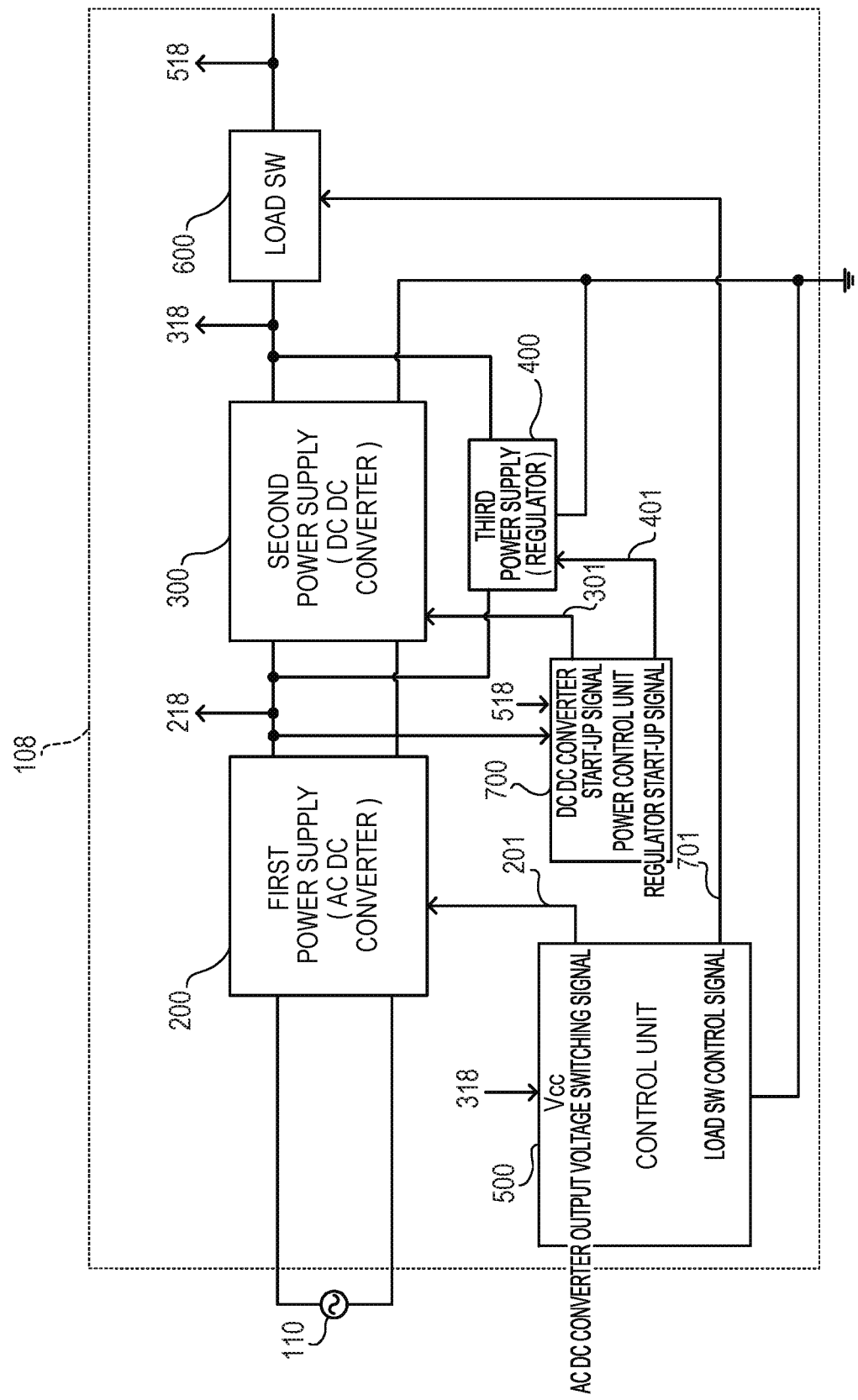
FIG. 6 is a schematic diagram of a power supply in Embodiment 2.

FIG. 6 illustrates an example of a schematic configuration of a power supply 108 in Embodiment 2. In Embodiment 2, the output voltage 218 of the AC/DC converter 200 is input into a power supply control unit 700 being a second control unit. Based on the output voltage 218, the power supply control unit 700 outputs the DC/DC converter start-up signal 301 to the DC/DC converter 300 and outputs the regulator start-up signal 401 to the regulator 400. Therefore, the control unit 500 in Embodiment 2 outputs the AC/DC converter output voltage switching signal 201 and the load SW control signal 701. In addition, power of the power supply control unit 700 is supplied from the output voltage 518 downstream of the load SW 600.

[Operation of Power Supply Control Unit in Embodiment 2]

Figure 7:
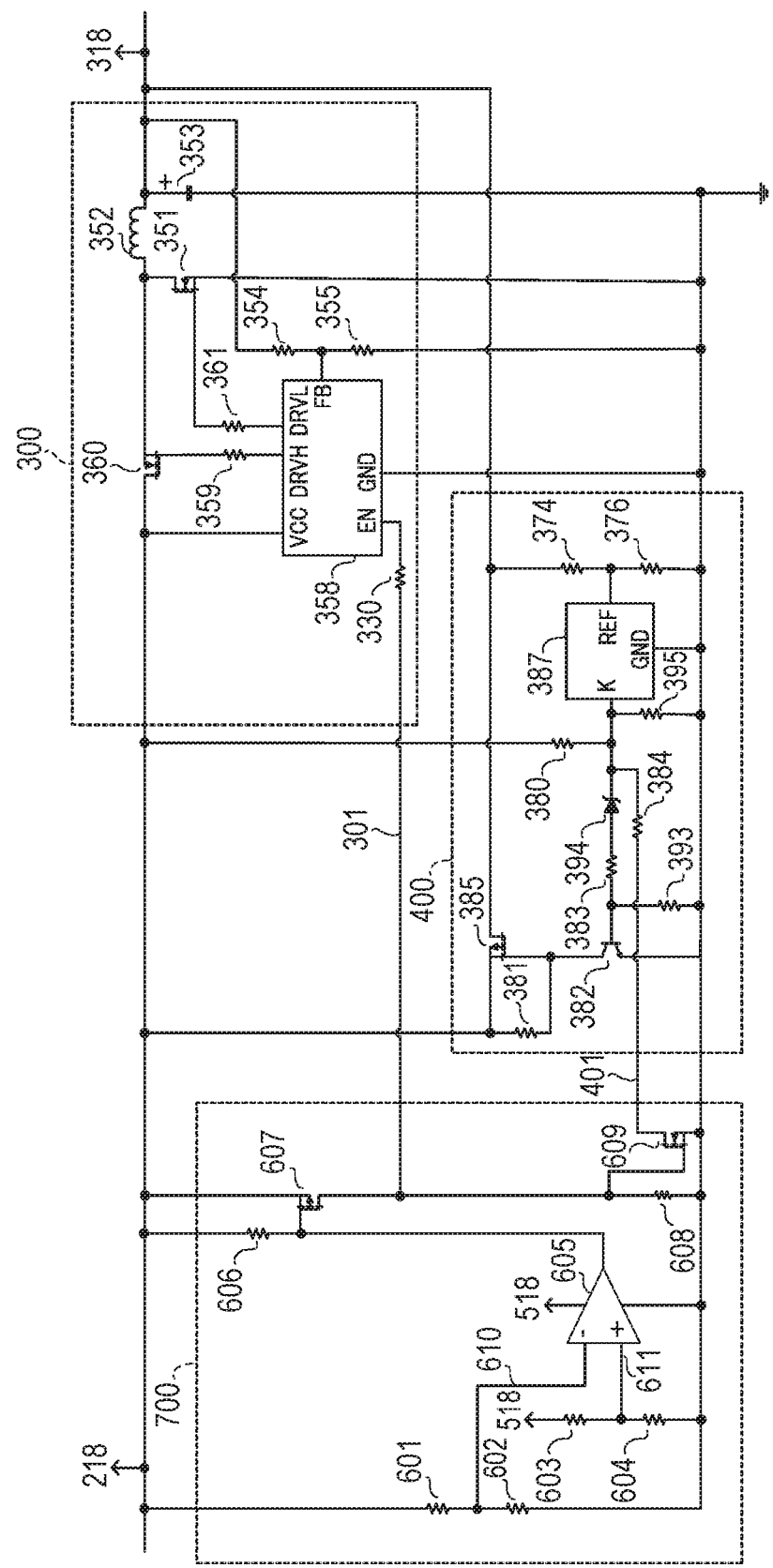
FIG. 7 is a circuit configuration diagram of a third power supply in Embodiment 2.

FIG. 7 illustrates an example of an internal circuit of the DC/DC converter 300, the regulator 400, and the power supply control unit 700 in Embodiment 2. In Embodiment 2, the power supply control unit 700 outputs the DC/DC converter start-up signal 301 to the EN terminal of the power supply IC 358 of the DC/DC converter 300. In the power supply control unit 700, the DC/DC converter start-up signal 301 is output also to a gate terminal of an FET 609. In addition, a drain terminal of the FET 609 of the power supply control unit 700 is connected via a resistor 384 to a connection point between the Zener diode 394 of the regulator 400 and the K terminal of the shunt regulator 387, and the regulator start-up signal 401 is output in this route.

Operation of the power supply control unit 700 will be described first. A comparator 605 compares a reference voltage 611 made by dividing the output voltage 518 with a resistor 603 and a resistor 604 with a voltage 610 made by dividing the output voltage 218 with a resistor 601 and a resistor 602 (hereinafter, referred to as sensing voltage). In the comparator 605, the sensing voltage 610 is input into an inverting input terminal (− terminal), and the reference voltage 611 is input into a noninverting input terminal (+ terminal). The comparator 605 operates on the output voltage 518 as a power supply.

(Case where Output Voltage 218 is Higher than Output Voltage 518)

In a case where the sensing voltage 610 is higher than the reference voltage 611, the comparator 605 decreases a gate voltage of an FET 607, and the FET 607 is thereby turned on. When the FET 607 is turned on, ON (high level) is output as the DC/DC converter start-up signal 301, which causes the power supply IC 358 to start up, as mentioned above in Embodiment 1. In addition, in a case where the DC/DC converter start-up signal 301 is ON, the gate voltage of the FET 609 increases, the FET 609 is thereby turned on, and OFF (low level) is output as the regulator start-up signal 401. When OFF is output as the regulator start-up signal 401, the base current of the transistor 382 decreases via the resistor 384, the Zener diode 394, and the resistor 383, and the transistor 382 is thereby turned off. When the transistor 382 is turned off, a gate voltage of the FET 385 is equal to the output voltage 218 via the resistor 381, and the FET 385 is thereby turned off, which causes the regulator 400 to stop its operation. The case where the sensing voltage 610 is higher than the reference voltage 611 is a case where the output voltage 218 is higher than the output voltage 518, which means that the printer 100 is in the print state or the stand-by state.

(Case where Output Voltage 218 is Lower than Output Voltage 518)

In a case where the sensing voltage 610 is lower than the reference voltage 611, an output of the comparator 605 becomes high impedance, and thus the gate voltage of the FET 607 is equal to the output voltage 218 via a resistor 606, and the FET 607 is thereby turned off. In a case where the FET 607 is off, OFF (low level) is output as the DC/DC converter start-up signal 301 via the resistor 608, which causes the power supply IC 358 to stop, as mentioned above in Embodiment 1. In addition, in a case where the DC/DC converter start-up signal 301 is OFF, the gate voltage of the FET 609 decreases, the FET 609 is thereby turned off, and ON (high impedance) is output as the regulator start-up signal 401. In a case where the regulator start-up signal 401 is ON, the regulator 400 starts up to control the output voltage 318, as mentioned above in Embodiment 1. The case where the sensing voltage 610 is lower than the reference voltage 611 is a case where the output voltage 218 is lower than the output voltage 518, which means that the printer 100 is in the sleeping state.

In addition, in a case where the load SW 600 is turned off to stop the output of the output voltage 518, and power is not supplied to the power supply control unit 700, the comparator 605 using the output voltage 518 as a power supply does not operate. In this case, the output of the comparator 605 becomes high impedance, and thus the DC/DC converter start-up signal 301 is OFF, and the regulator start-up signal 401 is ON, as mentioned above. Therefore, in a case where the load SW 600 is turned off, the power supply IC 358 stops, and the regulator 400 starts up.

[Description of Control Operation in Embodiment 2]

Figure 8:
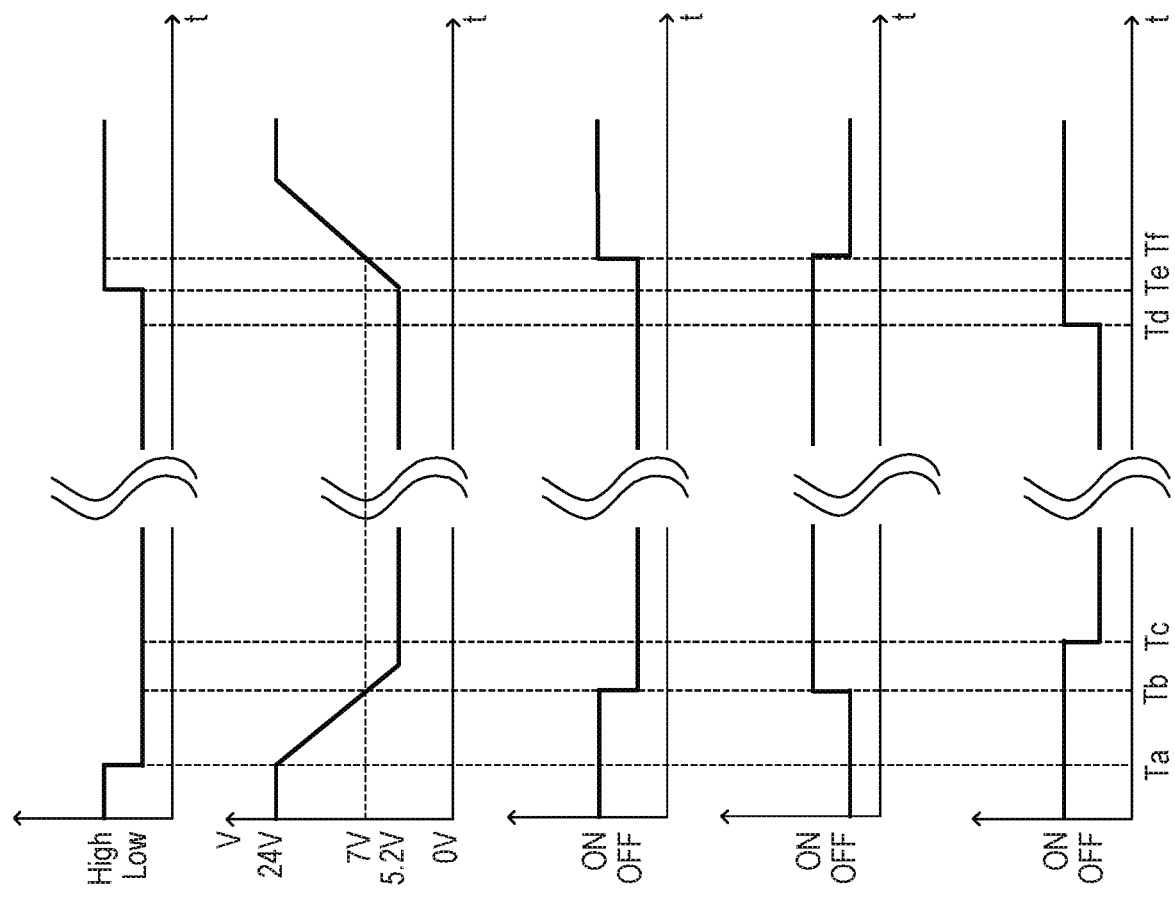
FIG. 8A, FIG. 8B, FIG. 8C, FIG. 8D and FIG. 8E are timing charts illustrating transitions between stand-by and sleeping in Embodiment 2.

FIG. 8A to FIG. 8E illustrate timing charts of operation of the power supply 108 in a case where the printer 100 in Embodiment 2 transitions from the stand-by state to the sleeping state or from the sleeping state to the stand-by state. Graphs of FIG. 8A to FIG. 8C and FIG. 8E are graphs corresponding to the graphs of FIG. 5A to FIG. 5D. FIG. 8D illustrates an output of the regulator start-up signal 401 (ON or OFF).

(Transition from Stand-By State to Sleeping State)

Operation of the power supply 108 in a case where the printer 100 transitions from the stand-by state to the sleeping state will be described. A timing Ta indicates a timing at which a predetermined time period t1 elapses since the printer 100 transitions to the stand-by state. As in Embodiment 1, when the AC/DC converter output voltage switching signal 201 is switched from the high level to the low level, the output voltage 218 transitions from 24 V to 5.2 V according to the response time of the AC/DC converter 200.

At a timing Tb at which the output voltage 218 decreases from 24 V to reach 7 V, the power supply control unit 700 senses with the comparator 605 that the sensing voltage 610 has fallen below the reference voltage 611. The power supply control unit 700 brings the output of the DC/DC converter start-up signal 301 to OFF and brings the output of the regulator start-up signal 401 to ON. At that time, the power supply IC 358 stops, the regulator 400 operates, and the output voltage 318 is subjected to the constant voltage control by the regulator 400. A switching loss of the DC/DC converter 300 and a consumption power of the power supply IC 358 can be thereby reduced, which enables the consumption power in the sleeping state to be reduced.

At a timing Tc, the control unit 500 switches the load SW control signal 701 from ON to OFF to bring the load SW 600 into the turn-off state to cut off a supply of power to the parts that operate only in the print state. The timing Tc may be a timing as long as the timing is later than the timing Tb.

By cutting off the supply of power to the parts unnecessary for the operation in the sleeping state, the consumption power in the sleeping state is reduced. When the load SW 600 is brought into the turn-off state, the supply of power to the power supply control unit 700 is also cut off. As mentioned above, in a case where the power supply control unit 700 operates with the power supplied, the power supply control unit 700 controls the output of the DC/DC converter start-up signal 301 and the regulator start-up signal 401 according to the output voltage 218. As mentioned above, switching the AC/DC converter output voltage switching signal 201 is performed when the load SW 600 is in the turn-on state. Therefore, when the load SW 600 is in the turn-off state, a function of the power supply control unit 700 of sensing the output voltage 218 and controlling the output signal is unnecessary. Therefore, in a case where the load SW 600 is turned off, the supply of power to the power supply control unit 700 is stopped, and thus a power consumed in the sleeping state by the resistor 603, the resistor 604, and the comparator 605 of the power supply control unit 700 can be reduced. As mentioned above, in a case where there is no supply of power to the power supply control unit 700, the output voltage 318 is subjected to the constant voltage control by the regulator 400, and the power supply IC 358 keeps stopping.

(Transition from Sleeping State to Stand-By State)

Next, operation of the power supply 108 in a case where the printer 100 transitions from the sleeping state to the stand-by state will be described. At a timing Td at which the printing instructions or the like are received from the external device, the control unit 500 switches the load SW control signal 701 from OFF to ON to bring the load SW 600 into the turn-on state. When the load SW 600 is brought into the turn-on state, the supply of the output voltage 518 is started. Power is thereby supplied also to power supply control unit 700, and the power supply control unit 700 is enabled to sense the output voltage 218 and control the output signal.

At a timing Te, the AC/DC converter output voltage switching signal 201 is switched from the low level to the high level. As mentioned above, when the AC/DC converter output voltage switching signal 201 is brought to the high level, the output voltage 218 transitions from 5.2 V to 24 V according to the response time of the AC/DC converter 200.

At a timing Tf at which the output voltage 218 increases from 5 V to reach 7 V, the power supply control unit 700 senses with the comparator 605 that the sensing voltage 610 has exceeded the reference voltage 611. The power supply control unit 700 brings the output of the DC/DC converter start-up signal 301 to ON and brings the output of the regulator start-up signal 401 to OFF. This causes the power supply IC 358 to start up and causes the regulator 400 to stop its operation, thereby keeping a state where the constant voltage control is performed by the DC/DC converter 300 on the output voltage 318. In Embodiment 2, a value of the output voltage 218 that determines the timing Tb and timing Tf is set at, for example, 7 V, but the value is not limited to 7 V.

As seen from the above, according to Embodiment 2, the consumption power in the sleeping state can be reduced in the power supply 108 including the power supply control unit 700 that controls the DC/DC converter 300 and the regulator 400 according to the output voltage 218. That is, in the sleeping state, by the power supply control unit 700 causing the regulator 400 to start up and causing the power supply IC 358 of the DC/DC converter 300 to stop, the consumption power in the sleeping state can be reduced. Furthermore, the power supply control unit 700 has a circuit configuration that outputs a signal to keep a start-up state of the regulator 400 and a stop state of the power supply IC 358 in a case where power (output voltage 518) is not supplied. This enables the supply of power to the power supply control unit 700 to be stopped along with the turn-off state of the load SW 600, reducing the consumption power of the power supply control unit 700, which can further reduce the consumption power in the sleeping state.

As described above, according to Embodiment 2, the consumption power in the low consumption power mode can be reduced while the voltage accuracy of the output voltage is maintained.

Embodiment 3

[Description of Power Supply]

Figure 9:
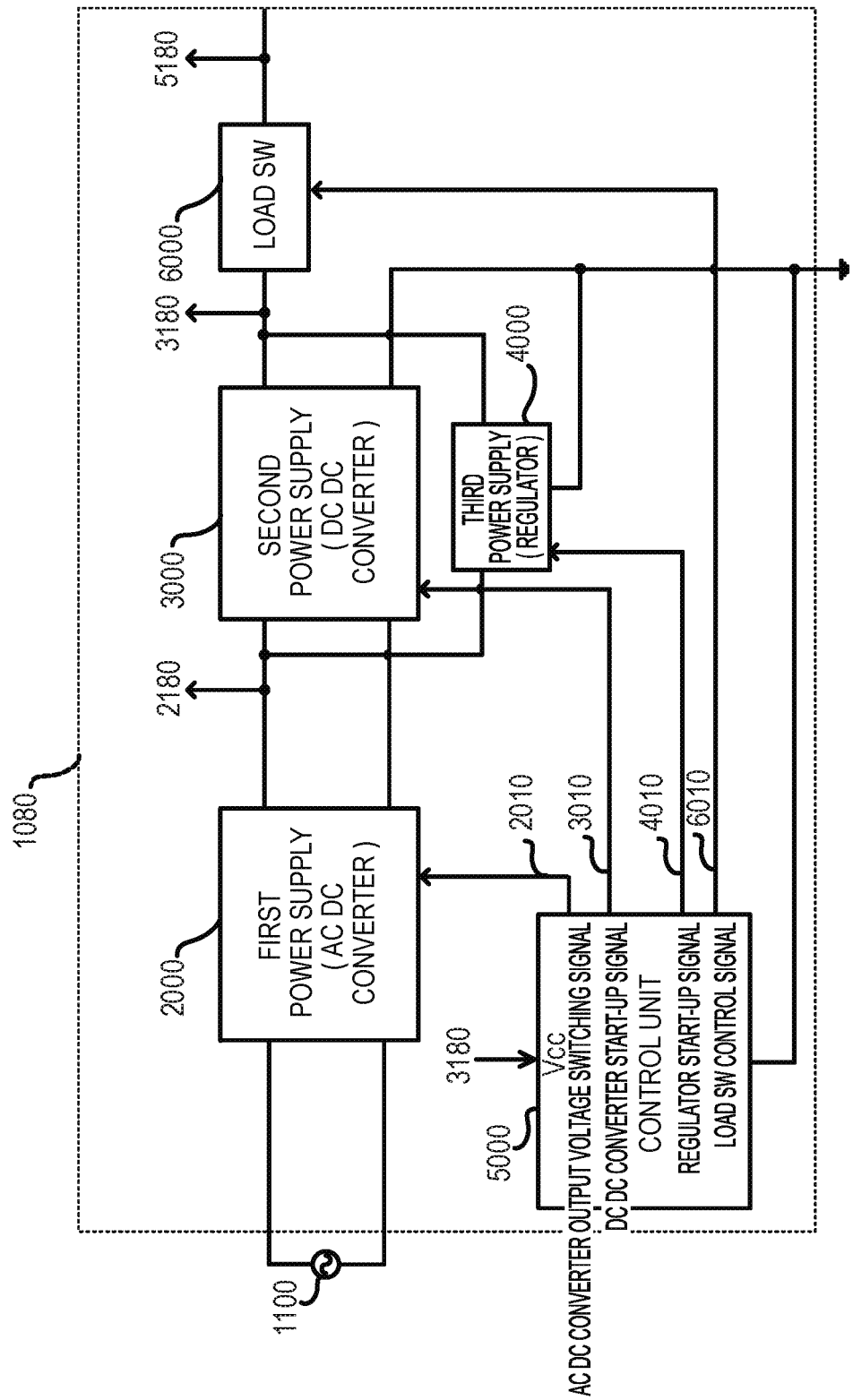
FIG. 9 is a block diagram illustrating a configuration of a power supply in Embodiment 3.

FIG. 9 is a block diagram illustrating an example of a configuration of a power supply 1080 that converts AC voltage into DC voltage. The power supply 1080 includes an AC/DC converter 2000 being a first power supply unit, a DC/DC converter 3000 being a second power supply unit, a regulator 4000 being a third power supply unit, a control unit 5000, and a load SW (load switch) 6000. In the power supply 1080, AC voltage input from a commercial AC power supply 1100 is input into the AC/DC converter 2000, and an output voltage 2180 that is DC and stepped down by the AC/DC converter 2000 is generated and output. The output voltage 2180 is input into the DC/DC converter 3000, and an output voltage 3180 that is DC and stepped down by the DC/DC converter 3000 is generated and output. The regulator 4000 is connected between an input terminal and an output terminal of the DC/DC converter 3000 in parallel to the DC/DC converter 3000. The control unit 5000 (first control unit) outputs control signals to the AC/DC converter 2000, the DC/DC converter 3000, and the load SW 6000 to control the AC/DC converter 2000, the DC/DC converter 3000, and the load SW 6000. An AC/DC converter output voltage switching signal 2010 is output from the control unit 5000 to the AC/DC converter 2000 to switch target voltages for the output voltage 2180 output by the AC/DC converter 2000. A DC/DC converter start-up signal 3010 (first start-up signal) is input into the DC/DC converter 3000 to control operation of the DC/DC converter 3000 and stop of the operation. A regulator start-up signal 4010 (second start-up signal) is input into the regulator 4000 to control operation of the regulator 4000 and stop of the operation. A load SW control signal 6010 is output from the control unit 5000 to the load SW 6000 to control output of an output voltage 5180. To the control unit 5000, the output voltage 3180 generated by the DC/DC converter 3000 is supplied. The load SW 6000 receives the output voltage 3180 from the DC/DC converter 3000. The load SW 6000 receives the load SW control signal 6010 from the control unit 5000, and a switching element of the load SW 6000 is set to a turn-on state or a turn-off state according to the load SW control signal 6010. This causes the output voltage 3180 input from the DC/DC converter 3000 to be output to connected loads or causes the output to be cut off, to control the output of the output voltage 5180.

[Configuration of AC/DC Converter 2000]

Figure 10:
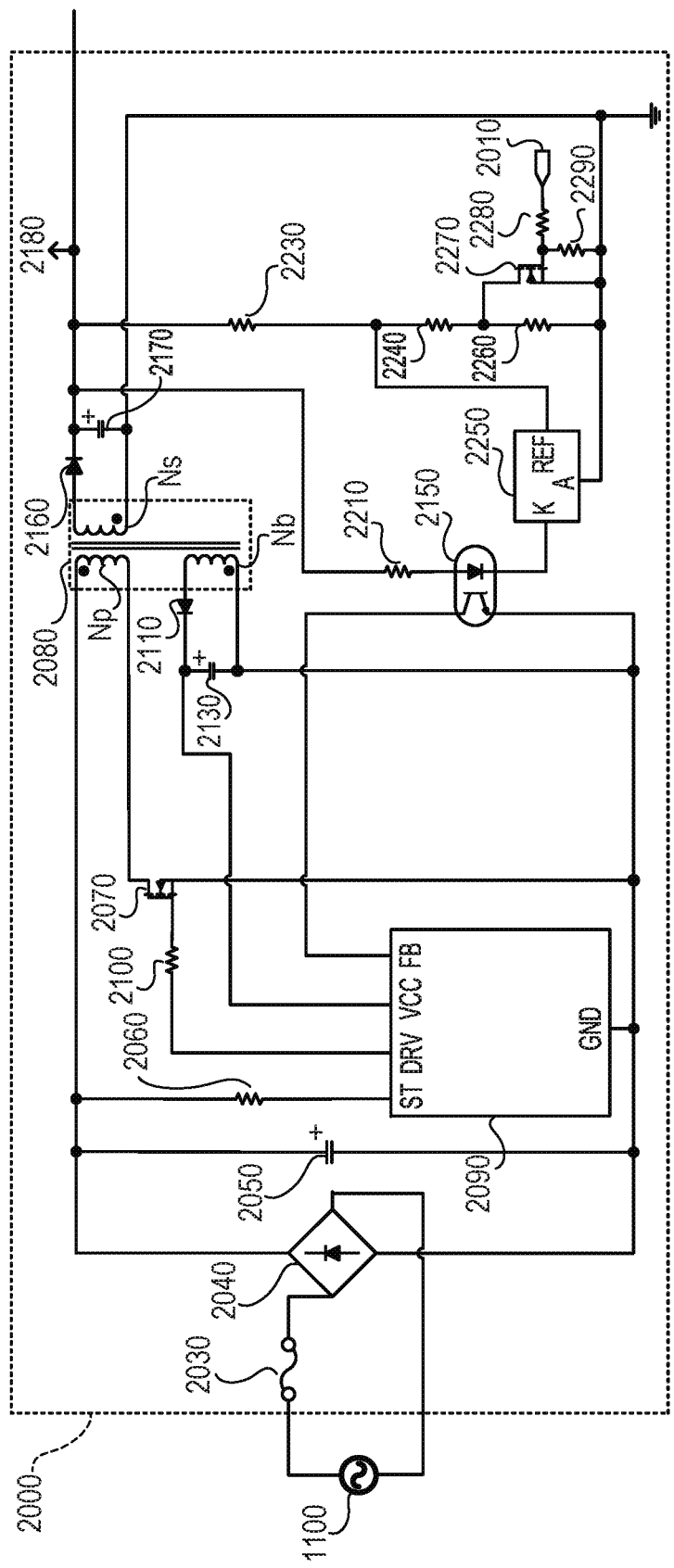
FIG. 10 is a circuit diagram illustrating a configuration of a first power supply unit in Embodiment 3.

FIG. 10 is a circuit diagram illustrating an example of a configuration of the AC/DC converter 2000. A circuit configuration of the AC/DC Converter 2000 will be described first. In FIG. 10, the AC voltage input from the commercial AC power supply 1100 passes through a current fuse 2030 for circuit protection and a rectifier diode bridge 2040 to be full-wave rectified and is smoothed to be DC voltage by a primary smoothing capacitor 2050 (hereinafter, referred to as smoothing capacitor 2050). Then, the DC voltage charged in the smoothing capacitor 2050 is supplied through a start-up resistor 2060 to a ST terminal of a power supply IC 2090 that controls the AC/DC converter 2000. When the supplied voltage reaches a start-up voltage of the power supply IC 2090, the power supply IC 2090 starts up. The power supply IC 2090 performs switching control of a field-effect transistor (hereinafter, expressed as FET) 2070 being a switching element. Upon starting up, the power supply IC 2090 outputs from its DRV terminal a driving pulse to a gate terminal of the FET 2070 through a resistor 2100. For a period during which the driving pulse is at a high level (High), the FET 2070 is in a conductive state (referred also to as turn-on state), and the DC voltage of the smoothing capacitor 2050 is applied across a primary winding Np of a transformer 2080. At that time, a voltage is also induced on a secondary winding Ns side of the transformer 2080. However, because the voltage is a voltage that makes an anode terminal side of a diode 2160 negative, the diode 2160 is not in the conductive state, and thus no energy is transmitted to a secondary side of the transformer 2080. Similarly, a voltage is also induced on an auxiliary winding Nb side of the transformer 2080. However, because the voltage is a voltage that makes an anode terminal side of a diode 2110 negative, the diode 2110 is not in the conductive state, and thus no energy is transmitted to an auxiliary winding Nb. Therefore, a current flowing through the primary winding Np of the transformer 2080 includes only an exciting current of the transformer 2080, and the transformer 2080 accumulates energy in proportion to a square of the exciting current. The exciting current increases in proportion to time.

Next, when a driving pulse at a low level (Low) is output from the DRV terminal of the power supply IC 2090, the FET 2070 is in a non-conductive state from the conductive state for a period of the low level driving pulse. When the FET 2070 is in the non-conductive state, voltages with polarities reverse to polarities occurring when the FET 2070 is conducted are induced in the secondary winding Ns and the auxiliary winding Nb of the transformer 2080. As a result, a voltage of which a positive polarity is on an anode terminal side of the diode 2160 is induced in the secondary winding Ns of the transformer 2080, which brings the diode 2160 into the conductive state. Then, a voltage induced by the energy accumulated in the transformer 2080 is rectified and smoothed by a smoothing and rectifying circuit that is formed by the diode 2160 and the smoothing capacitor 2170, and the output voltage 2180 is generated as the DC voltage. In contrast, a voltage of which a positive polarity is on an anode terminal side of the diode 2110 is induced in the auxiliary winding Nb, which brings the diode 2110 into the conductive state. The voltage induced in the auxiliary winding Nb is charged in a capacitor 2130 via the diode 2110, and the DC voltage charged in the capacitor 2130 is supplied to a VCC terminal of the power supply IC 2090.

[Controlling Output Voltage of AC/DC Converter 2000]

Next, voltage control of the output voltage 2180 will be described. In the AC/DC converter 2000, the voltage control of the output voltage 2180 is performed as follows. First, the output voltage 2180 generated on the secondary side of the transformer 2080 is divided by series-connected resistors including a regulator resistor 2230, a resistor 2240, and a resistor 2260, and is input into a REF terminal of a shunt regulator 2250. Then, in the shunt regulator 2250, a feedback signal according to a level of the voltage input into the REF terminal is output from a K terminal (cathode terminal). The K terminal of the shunt regulator 2250 is connected to a light emitting diode (LED) of a photocoupler 2150. The feedback signal output from the K terminal of the shunt regulator 2250 brings the LED of the photocoupler 2150 into a conductive state, to turn on a phototransistor of the photocoupler 2150, and a voltage according to the feedback signal is input into an FB terminal of the power supply IC 2090. A resistor 2210 is a resistor for limiting current flowing through the LED of the photocoupler 2150. Thus, the power supply IC 2090 can control the output voltage stably, by outputting the driving pulse from its DRV terminal to perform switching control of the FET 2070 based on the voltage according to the feedback signal input into the FB terminal. Indications ST, DRV, VCC and FB on the power supply IC 2090 in FIG. 10 are names of the respective terminals.

There are two kinds of the voltage of the output voltage 2180 including a voltage necessary for the stand-by state and the print state and a voltage necessary for the sleeping state. The voltage of the output voltage 2180 can be switched according to each state by the AC/DC converter output voltage switching signal 2010 from the control unit 5000. A reason for switching the output voltage 2180 in the sleeping state is that the sleeping state need not drive the driving unit, such as a motor, and the image forming unit, and it is sufficient to output the output voltage 3180 necessary in sleeping. Therefore, in the present embodiment, the target voltage of the output voltage 2180 is set at a voltage as close to a target voltage of the output voltage 3180 as possible, in the sleeping state, to improve an efficiency of the power supply 1080. In addition, the output voltage 2180 is supplied via a load SW (not illustrated) separate from the load SW 6000 illustrated in FIG. 9 to the driving unit, such as a motor, and the photosensitive drum 101, the charge unit 102, the developing unit 103, and the transfer unit 105 forming the image forming unit. Under control by the control unit 5000, the load SW (not illustrated) is brought into the turn-on state in the stand-by state and the print state to perform supply of power to the driving unit, such as a motor, and the image forming unit, and is brought into the turn-off state in the sleeping state to cut off the supply of power, reducing the consumption power.

Voltage switching control of the output voltage 2180 is performed as follows. In a case where the printer 100 is in the stand-by state and the print state, the power supply 1080 supplies the output voltage 2180 to the driving unit, such as a motor, and the image forming unit. At that time, the control unit 5000 sets the AC/DC converter output voltage switching signal 2010 at a high level, and a voltage divided into by a resistor 2280 and a resistor 2290 is applied to a gate terminal of an FET 2270. The FET 2270 is then brought into the turn-on state (ON), and the FET 2270 becomes conductive between its drain terminal and source terminal, which brings about a state where the resistor 2260 is negligible (is not connected to the resistor 2240). Let a voltage input into a REF terminal of the shunt regulator 2250 be denoted by a voltage Vref, a resistance value of the resistor 2230 be denoted by a resistance value $R_{2230}$, a resistance value of the resistor 2240 be denoted by a resistance value $R_{2240}$, and a resistance value of the resistor 2260 be denoted by a resistance value $R_{2260}$. Assume that an on-resistance of the FET 2270 is sufficiently low to be negligible, for simplifying calculation. In the stand-by state and the print state of the printer 100, the voltage $V_{24V}$ of the output voltage 2180 is expressed by the following Formula (1).

$$V_{24V} = V_{REF} \cdot \frac{R_{223} + R_{224}}{R_{224}} \qquad \text{Formula (1)}$$

In the present embodiment, assume that the voltage $V_{24V}$ of the output voltage 2180 in the stand-by state and the print state of the printer 100 is set as $V_{24V}$=24 V (first DC voltage), as a setting example of a specific numerical value.

In contrast, in the sleeping state of the printer 100, when the control unit 5000 sets the AC/DC converter output voltage switching signal 2010 at a low level (a voltage of 0 V), the FET 2270 is brought into the turn-off state (OFF), the FET 2270 becomes nonconductive between its drain terminal and source terminal. This consequently brings about a state where the resistor 2260 is not negligible electrically, that is, a state where the resistor 2260 is connected to the resistor 2240. Assuming that current flowing when the FET 2270 is OFF is 0 A for simplifying calculation, a voltage $V_{5V}$ of the output voltage 2180 in the sleeping state is expressed by the following Formula (2).

$$V_{5V} = V_{REF} \cdot \frac{R_{233} + R_{234} + R_{226}}{R_{324} + R_{236}} \qquad \text{Formula (2)}$$

In the present embodiment, assume that the voltage $V_{5V}$ of the output voltage 2180 in the sleeping state is set as $V_{24V}$=5.2 V (second DC voltage), as a setting example of a specific numerical value. The AC/DC converter 2000 may be an isolated DC/DC converter.

[Configuration of DC/DC Converter 3000]

Figure 11:
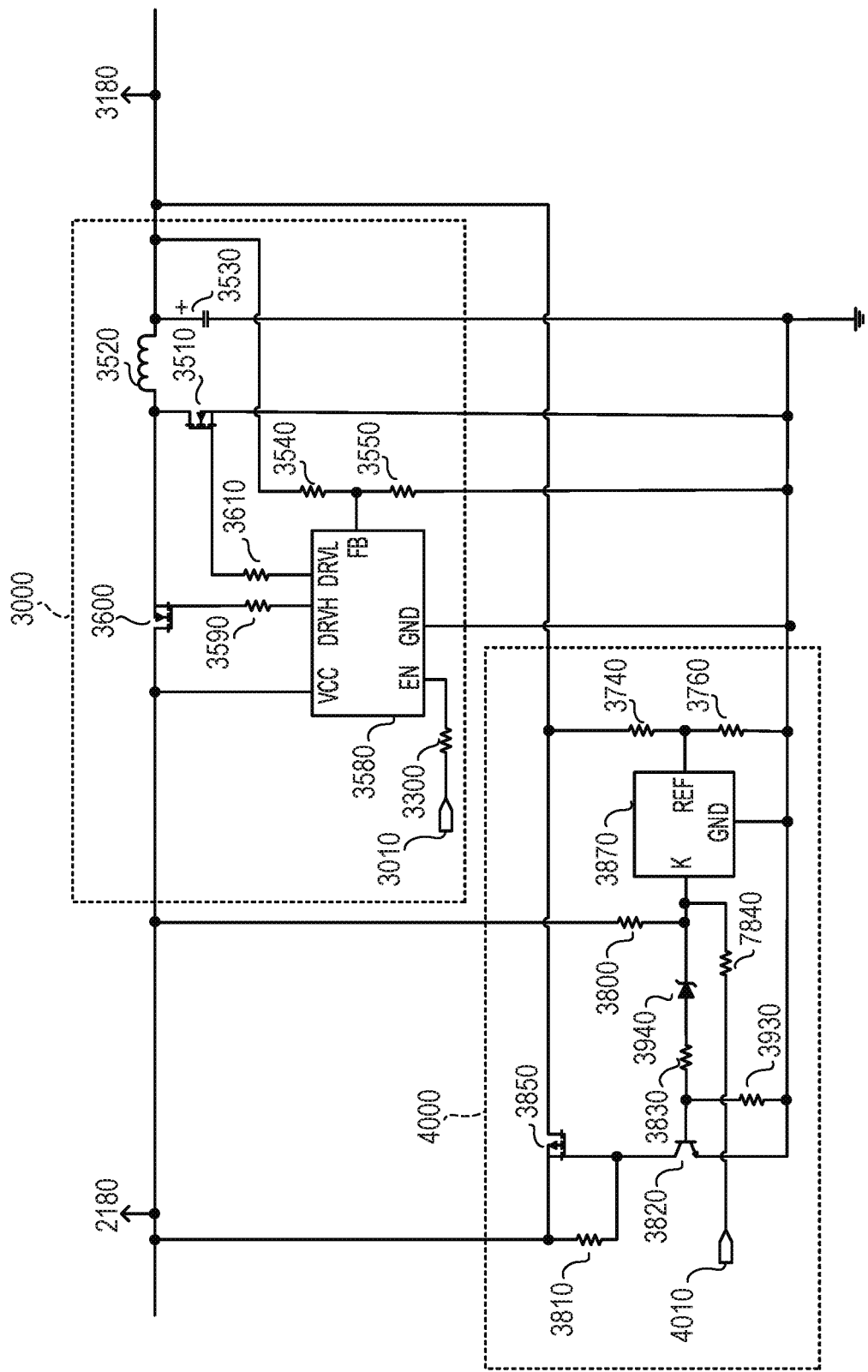
FIG. 11 is a circuit diagram illustrating configurations of a second power supply unit and a third power supply unit in Embodiment 3.

FIG. 11 is a circuit diagram illustrating an example of circuit configurations of the step-down DC/DC converter 3000 and the regulator 4000. The circuit configuration of the step-down DC/DC converter 3000 will be described first. The DC/DC converter 3000 includes a high-side FET 3600, a low-side FET 3510, a power supply IC 3580 (switching control unit), an inductor 3520, a capacitor 3530, and resistors 3540, 3550, 3590 and 3610. In the high-side FET 3600 (first switching element), a drain terminal is connected to an input terminal of the DC/DC converter 3000 into which the output voltage 2180 of the AC/DC converter 2000 is input, and a source terminal is connected to one end of the inductor 3520 and a drain terminal of the low-side FET 3510. A gate terminal of the high-side FET 3600 is connected via the resistor 3590 to a DRVH terminal of the power supply IC 3580. In the low-side FET 3510 (second switching element), the drain terminal is connected to the one end of the inductor 3520 and the source terminal of the high-side FET 3600, and a source terminal is connected to a ground (GND). A gate terminal of the low-side FET 3510 is connected via the resistor 3610 to a DRVL terminal of the power supply IC 3580. In the inductor 3520 being a coil, the one end is connected to the source terminal of the high-side FET 3600 and the drain terminal of the low-side FET 3510, and another end is connected to one end of the capacitor 3530 and an output terminal of the DC/DC converter 3000. In the capacitor 3530, the one end is connected to the inductor 3520 and the output terminal of the DC/DC converter 3000, and another end is connected to the ground.

In the DC/DC converter 3000, current flows into the capacitor 3530 via the inductor 3520 while the N channel high-side FET 3600 being a switching element is ON. In contrast, while the high-side FET 3600 is OFF, energy accumulated in the inductor 3520 is output via the N channel low-side FET 3510. The high-side FET 3600 may be a P channel FET. In addition, although an N channel FET is used here as the low-side FET 3510, the low-side FET 3510 may be, for example, a P channel FET or a rectifier diode. The power supply IC 3580 turns on the high-side FET 3600 and the low-side FET 3510 alternately by PWM control to control ON-duties of the high-side FET 3600 and the low-side FET 3510 such that a voltage of the output voltage 3180 is equal to the target voltage. A VCC terminal being a power supply terminal of the power supply IC 3580 receives the output voltage 2180 of the AC/DC converter 2000.

In the power supply IC 3580, the DRVH terminal is connected via the resistor 3590 to the gate terminal of the high-side FET 3600, and the DRVL terminal is connected via the resistor 3610 to the gate terminal of the low-side FET 3510. An FB terminal of the power supply IC 3580 receives a voltage made by dividing the output voltage 3180 with the resistor 3540 and the resistor 3550. The power supply IC 3580 compares the voltage input into the FB terminal with a reference voltage inside the power supply IC 3580 and outputs drive signals from the DRVH terminal and the DRVL terminal to the high-side FET 3600 and the low-side FET 3510, respectively, so that the output voltage 3180 is equal to the target voltage. In a case where the output voltage 3180 is lower than the target voltage, the power supply IC 3580 outputs the drive signal from the DRVH terminal so that the ON-duty of the high-side FET 3600 increases. In contrast, in a case where the output voltage 3180 is higher than the target voltage, the power supply IC 3580 outputs the drive signal from the DRVL terminal so that the ON-duty of the low-side FET 3510 increases. An EN terminal of the power supply IC 3580 is a terminal for controlling start-up and stop of the power supply IC 3580 and receives the DC/DC converter start-up signal 3010 via a resistor 3300. The power supply IC 3580 starts up when the EN terminal receives the DC/DC converter start-up signal 3010 at a high level, and stops when the EN terminal receives the DC/DC converter start-up signal 3010 at a low level. The low-side FET 3510 can be replaced with a diode.

Let the output voltage 3180 controlled by the DC/DC converter 3000 be denoted by $V_{5V\_DC/DC}$, the reference voltage inside the power supply IC 3580 be denoted by $V_{FB(DC/DC)}$, and resistance values of the resistor 3540 and the resistor 3550 be denoted by $R_{3540}$ and $R_{3550}$, respectively. Then, the voltage $V_{5V\_DC/DC}$ is expressed by the following Formula (3).

$$V_{5V\_DC/DC} = V_{FB(DC/DC)} \cdot \frac{R_{354} + R_{355}}{R_{355}} \qquad \text{Formula (3)}$$

In the present embodiment, assume that the voltage $V_{5V\_DC/DC}$ of the output voltage 3180 controlled by the DC/DC converter 3000 is set as $V_{5V\_DC/DC}$=5.21 V, as an example of a specific numerical value. The voltage of the output voltage 3180 controlled by the DC/DC converter 3000, 5.21 V, is a voltage close to 5.2 V, and is higher than 5.2 V (predetermined DC voltage), which is a voltage of the output voltage 3180 controlled by the regulator 4000 described below.

Next, a voltage accuracy of the output voltage 3180 of the DC/DC converter 3000 influenced by a difference of an input voltage will be described. In a case where the input voltage of the DC/DC converter 3000 is high (the output voltage 2180 is 24 V), that is, in a case where the printer 100 is in the stand-by state or the print state, a voltage difference between the output voltage 2180 and the output voltage 3180 is large. Therefore, the ON-duty of the DC/DC converter 3000 (a period of the turn-on state) is short, and a period of the turn-off state (OFF) of the high-side FET 3600 in switching of the DC/DC converter 3000 is long. Thus, there is a sufficient charging period for a capacitor in a bootstrap circuit (not illustrated) provided inside the power supply IC 3580. As a result, a voltage of the capacitor is boosted to a voltage necessary to drive the high-side FET 3600, and thus the high-side FET 3600 can be driven. That is, in the case where the input voltage is high, the high-side FET 3600 can be driven, and thus the DC/DC converter 3000 can control the output voltage 3180 to the target voltage.

In contrast, in a case where the output voltage 2180 input into the DC/DC converter 3000 is low (the output voltage 2180 is 5.2 V), that is, in a case where the printer 100 is in the sleeping state, the voltage difference between the output voltage 2180 and the output voltage 3180 is small. Therefore, the ON-duty of the DC/DC converter 3000 increases (is long), and the period of the turn-off state (OFF) of the high-side FET 3600 in switching of the DC/DC converter 3000 is short. For that reason, the charging period for the capacitor in the bootstrap circuit (not illustrated) inside the power supply IC 3580 becomes insufficient, which disables the capacitor to be boosted to the voltage necessary to drive the high-side FET 3600, and thus the high-side FET 3600 cannot be driven sufficiently. That is, in the case where the output voltage 2180 is low, the high-side FET 3600 cannot be driven sufficiently, and thus the output voltage 3180 cannot be controlled to the target voltage, resulting in a drop in the output voltage 3180. For driving the high-side FET 3600 with its ON-duty set at 100%, the capacitor in the bootstrap circuit (not illustrated) inside the power supply IC 3580 cannot be charged because the high-side FET 3600 has no period of the turn-off state. Thus, a new additional power supply circuit is needed, which creates a need for an expensive power supply IC. In addition, inexpensive power supply ICs have no additional power supply circuit, and therefore a limitation is imposed on a maximum ON-duty of the high-side FET 3600. In the present embodiment, assume that a maximum ON-duty of the power supply IC 3580 is limited to 80%.

In a case where a power supply IC having a limit on its maximum ON-duty is used, when the output voltage 2180 input into the DC/DC converter 3000 drops, and the ON-duty of the power supply IC 3580 reaches the maximum ON-duty, the high-side FET cannot be turned on at 100%. This results in a drop in the output voltage 3180, failing to satisfy a required output voltage accuracy. Hence, the power supply 1080 in the present embodiment includes the regulator 4000 connected in parallel to the DC/DC converter 3000. This enables the regulator 4000 to operate to prevent the drop in the output voltage 3180 when the DC/DC converter 3000 reaches the maximum ON-duty and the output voltage 3180 drops.

[Configuration of Regulator 4000]

Next, a circuit configuration of the regulator 4000 will be described. The regulator 4000 in the present example is a series regulator, including a shunt regulator 3870, a transistor 3820, an FET 3850 (switching element), a Zener diode 3940, and resistors 3740, 3760, 3800, 3810, 3830 and 3930. In the regulator 4000, a voltage applied to between a drain terminal and a source terminal of the P channel FET 3850 is controlled using a voltage between the gate terminal and the source terminal of the FET 3850, and the output voltage 3180 is thereby maintained at a constant voltage. The output voltage 3180 is divided by the regulator resistor 3740 and the resistor 3760, and the divided voltage is input into a REF terminal of the shunt regulator 3870. Then, a voltage being a feedback signal according to a level of the voltage input into the REF terminal of the shunt regulator 3870 being a feedback unit is output from a K (cathode) terminal of the shunt regulator 3870. The K terminal of the shunt regulator 3870 is pulled up by the output voltage 2180 via the resistor 3800 and is connected to a cathode terminal of the Zener diode 3940. An anode terminal of the Zener diode 3940 is connected to one end of the resistor 3830, and another end of the resistor 3830 is connected to the resistor 3930 and a base terminal of the transistor 3820. The base terminal of the transistor 3820 receives a voltage made by dividing the voltage output from the K terminal of the shunt regulator 3870 via the Zener diode 3940 with the resistor 3830 and the resistor 3930.

The resistor 3810 is connected to between the gate terminal and the source terminal of the FET 3850 and provided to stabilize a potential between the gate terminal and the source terminal. A collector terminal of the transistor 3820 is connected to a gate terminal of the FET 3850 and adjusts a voltage applied to the gate terminal of the FET 3850 according to the voltage output from the K terminal of the shunt regulator 3870. In the P channel FET 3850, the source terminal is connected to an input terminal that receives the output voltage 2180 of the AC/DC converter 2000, and the drain terminal is connected to an output terminal of the regulator 4000. The shunt regulator 3870 may be an element capable of controlling the output voltage 3180 to the target voltage, such as a comparator and an operational amplifier. The Zener diode 3940 is provided to step down the voltage output from the K terminal of the shunt regulator 3870 to turn on and off the transistor 3820 reliably. For that reason, if the voltage output from the K terminal of the shunt regulator 3870 ranges narrowly, the voltage of the K terminal (hereinafter, referred to also as K terminal voltage) can be input into the base terminal of the transistor 3820 without being stepped down, and thus the Zener diode 3940 can be eliminated. In a case where a dark current of the transistor 3820 is low, there is no risk that the dark current turns on the FET 3850. This dispenses with dividing the voltage input into the base terminal of the transistor 3820 with the resistors 3930 and 3830, and thus the resistor 3930 can be eliminated.

[Constant Voltage Control by Regulator 4000]

Next, constant voltage control by the regulator 4000 will be described. In the regulator 4000, in the case where the output voltage 3180 is higher than the target voltage, the voltage input into the REF terminal of the shunt regulator 3870 increases, and thus the K terminal voltage decreases. As a result, current input into the base terminal of the transistor 3820 decreases, and thus collector current flowing into the collector terminal of the transistor 3820 also decreases. The voltage between the gate terminal and the source terminal of the FET 3850 therefore decreases, and an on-resistance between the drain terminal and the source terminal of the FET 3850 increases, which causes the output voltage 3180 to decrease. In a case where the output voltage 3180 is controlled by the DC/DC converter 3000 to a voltage higher than a target voltage of the regulator 4000, the FET 3850 is in a turn-off state (OFF) (the on-resistance is maximized), and thus the regulator 4000 stops its operation. In contrast, in the case where the output voltage 3180 is lower than the target voltage, the voltage input into the REF terminal of the shunt regulator 3870 decreases, and thus the K terminal voltage increases. As a result, base current input into the base terminal of the transistor 3820 increases, and thus the collector current flowing into the collector terminal of the transistor 3820 also increases. The voltage between the gate terminal and the source terminal of the FET 3850 therefore increases, and the on-resistance between the drain terminal and the source terminal of the FET 3850 decreases, which causes the output voltage 3180 to increase.

Let the output voltage 3180 controlled by the regulator 4000 be denoted by $V_{5V\_REG}$, the reference voltage of the shunt regulator 3870 be denoted by a reference voltage $V_{REF(REG)}$, and resistance values of the resistor 3740 and the resistor 3760 be denoted by $R_{3740}$ and $R_{3760}$, respectively. Then, the voltage $V_{5V\_REG}$ is expressed by the following Formula (4).

$$V_{5V\_REG} = V_{REF(REG)} \cdot \frac{R_{374} + R_{376}}{R_{376}} \qquad \text{Formula (4)}$$

In the present embodiment, let $V_{5V\_REG}$=5.2 V, as an example of a specific numerical value.

[Operation of Regulator 4000]

Next, Operation of the regulator 4000 will be described. First, in the case where the input voltage is high, that is, in a case where the output voltage 2180 of the AC/DC converter 2000 being the input voltage is higher than the target voltage of the output voltage 3180, the step-down DC/DC converter 3000 can control the output voltage 3180 to the target voltage. The regulator 4000 therefore performs control to turn off the FET 3850, as mentioned above. Specifically, when the DC/DC converter 3000 controls the output voltage to the target voltage ($V_{5V\_DC/DC}$=5.21 V), the regulator 4000 compares the output voltage 3180 output by the DC/DC converter 3000 with the target voltage of the output voltage of the regulator 4000. The regulator 4000 then determines that the voltage of the output voltage 3180 output by the DC/DC converter 3000 is higher than the target voltage of the output voltage of the regulator 4000 ($V_{5V\_REG}$=5.2 V) and performs control to turn off the operation of the FET 3850, as mentioned above.

In contrast, in the case where the input voltage is low, that is, in a case where the output voltage 2180 of the AC/DC converter 2000 is the voltage $V_{5V}$=5.2 V, the following occurs. Due to being a step-down DC/DC converter, the DC/DC converter 3000 is no longer able to perform control to maintain the output voltage 3180 to the target voltage $V_{5V\_DC/DC}$=5.21 V, and as a result, the output voltage 3180 decreases to be lower than the target voltage. When the output voltage 3180 becomes not more than the target voltage of the output voltage of the regulator 4000, $V_{5V\_REG}$=5.2 V (not more than the predetermined DC voltage), the regulator 4000 starts up. The voltage output from the K terminal of the shunt regulator 3870 is output to the base terminal of the transistor 3820. The transistor 3820 is thereby turned on, and the FET 3850 is turned on, the FET 3850 performs the constant voltage control such that the output voltage 3180 is equal to the target voltage ($V_{5V\_REG}$=5.2 V) by the FET 3850.

Next, a reason for making the target voltage of the output voltage 3180 of the regulator 4000 ($V_{5V\_REG}$=5.2 V) lower than the target voltage of the output voltage 3180 of the DC/DC converter 3000 $V_{5V\_DC/DC}$=5.21 V will be described. In a case where the regulator 4000 performs control to turn on the FET 3850, there is a little or little voltage difference between the output voltage 2180 being the input voltage to the regulator 4000 and the output voltage 3180, and a loss by the FET 3850 needs to be reduced. While the DC/DC converter 3000 controls the output voltage 3180 to the target voltage, the input voltage to the regulator 4000 is also high, and thus if the regulator 4000 turns on the FET 3850 in this state, the loss by the FET 3850 increases. For that reason, in the case where the DC/DC converter 3000 can control the output voltage 3180 to the target voltage, that is, in a case where the input voltage to the regulator 4000 is high, the FET 3850 should not be turned on, and thus there is no need for starting up the regulator 4000. Hence, the regulator 4000 is configured to turn off the FET 3850 by setting the target voltage of the output voltage 3180 of the regulator 4000 to be lower than the target voltage of the output voltage 3180 of the DC/DC converter 3000.

[Effect of Regulator 4000]

Next, Effect of providing the regulator 4000 will be described. In the DC/DC converter 3000, in the case where the input voltage decreases, the ON-duty of the high-side FET 3600 increases to reach the maximum ON-duty up to which the power supply IC 3580 can output (80% in the present embodiment), as mentioned above. In a state where the power supply IC 3580 reaches its maximum ON-duty up to which the power supply IC 3580 can output, the power supply IC 3580 cannot maintain the output voltage 3180 at the target voltage in a switching state, and thus the output voltage 3180 decreases to be lower than the target voltage. Specifically, assume that there are no loads connected to the output voltage 3180, and the target voltage of the output voltage of the DC/DC converter 3000 ($V_{5V\_DC/DC}$) is 5.21 V. In a case where the input voltage to the DC/DC converter 3000 (the output voltage of the AC/DC converter 2000 $V_{5V}$) decreases to about 5.2 V, the high-side FET 3600 cannot be driven at an ON-duty of 100%. The output voltage of the DC/DC converter 3000 ($V_{5V\_DC/DC}$) thus decreases to not more than 5.21 V. As the input voltage to the DC/DC converter 3000 keeps decreasing, the output voltage 3180 also decreases. As a result, the specification of the voltage accuracy mentioned above cannot be satisfied, and the output voltage of the DC/DC converter 3000 $V_{5V\_DC/DC}$ decreases to be lower than a minimum voltage Vmin (=4.75 V). Hence, in the case where the input voltage to the DC/DC converter 3000 keeps decreasing, the regulator 4000 uses the FET 3850 to perform the constant voltage control on the output voltage 3180. Specifically, assume that there are no loads connected to the output voltage 3180, and the target voltage of the output voltage of the DC/DC converter 3000 ($V_{5V\_DC/DC}$) is 5.21 V. In a case where the input voltage to the DC/DC converter 3000 (the output voltage $V_{5V}$ of the AC/DC converter 2000) decreases to about 5.2 V, the high-side FET 3600 cannot be driven at an ON-duty of 100%. The output voltage of the DC/DC converter 3000 ($V_{5V\_DC/DC}$) thus decreases to not more than 5.21 V. However, the regulator 4000 feeds back the voltage of the output voltage 3180, and the FET 3850 controls the output voltage 3180 to the constant voltage according to a result of the feedback. Thus, the voltage accuracy of the output voltage of the regulator 4000 ($V_{5V\_REG}$=5.2 V) can be satisfied. As a result, also in the case where the input voltage to the DC/DC converter 3000 keeps decreasing, the specification of the voltage accuracy mentioned above, that is, a relation of minimum voltage Vmin<$V_{5V\_REG}$<maximum voltage Vmax, can be satisfied.

The regulator start-up signal 4010 is a signal to set the FET 3850 to the turn-off state (OFF) forcibly irrespective of the constant voltage control by the regulator 4000. When the regulator start-up signal 4010 at a low level is input, a voltage downstream of a resistor 7840 and the Zener diode 3940 is divided by the resistor 3830 and the resistor 3930, and the divided voltage is applied to the base terminal of the transistor 3820, which brings the transistor 3820 into the turn-off state. Therefore, no voltage is applied to between the gate terminal and the source terminal of the FET 3850, and the FET 3850 is brought to OFF. The FET 3850 of the regulator 4000 can be thus set to the turn-off state forcibly.

In contrast, when the regulator start-up signal 4010 at a high level is input, this brings about the same state as a state where a voltage is output from the K (cathode) terminal of the shunt regulator 3870. This causes a high-level signal to be input into the base terminal of the transistor 3820 via the resistor 7840, the Zener diode 3940, and the resistor 3830, and thus the transistor 3820 is turned on. As a result, a voltage is applied to between the gate terminal and the source terminal of the FET 3850, and the FET 3850 is thus set to the turn-on state. As seen from the above, the constant voltage control is performed on the output voltage 3180 by turning on the transistor 3820 and setting the FET 3850 to the turn-on state.

[Description of Control Operation]

Figure 12:
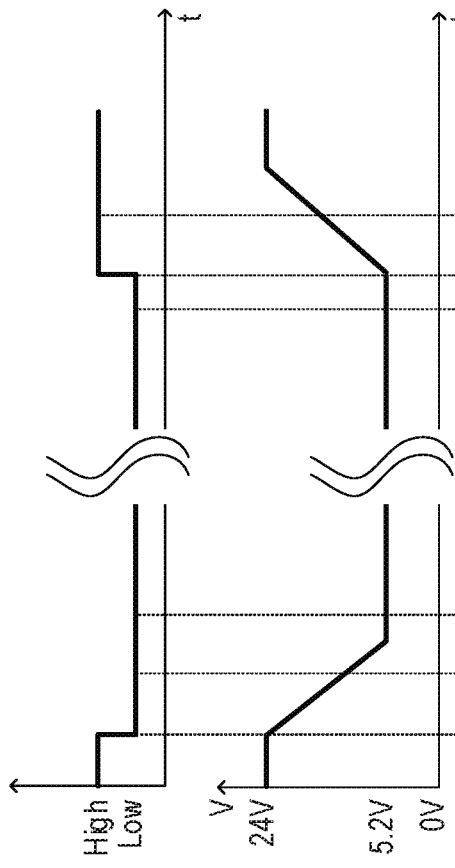
FIG. 12A, FIG. 12B, FIG. 12C, FIG. 12D and FIG. 12E are timing charts used for describing operation of the power supply in Embodiment 3.

FIG. 12A to FIG. 12E are timing charts illustrating operation of the power supply 1080 in a case where the printer 100 transitions from the stand-by state to the sleeping state and a case where the printer 100 transitions from the sleeping state to the stand-by state. FIG. 12A illustrates output levels of the AC/DC converter output voltage switching signal 2010, where High indicates an output at a high level, and Low indicates an output at a low level. FIG. 12B is a voltage waveform illustrating a voltage of the output voltage 2180, where 24 V and 5.2 V are voltage values of the output voltage 2180. FIG. 12C is a signal waveform illustrating output levels (ON, OFF) of the regulator start-up signal 4010. FIG. 12D is a signal waveform illustrating output levels (ON, OFF) of the DC/DC converter start-up signal 3010. FIG. 12E is a signal waveform illustrating output levels (ON, OFF) of the load SW control signal 6010. In FIG. 12A to FIG. 12E, horizontal axes each indicate elapsed time t. Ta, Tb, Tc, Td, Te and Tf each indicate a timing (time).

First, operation of the power supply 1080 in a case where the printer 100 transitions from the stand-by state to the sleeping state will be described. The timing Ta indicates a timing at which a time period t1 being a predetermined time period elapses without a transition to the print state since the printer 100 transitions to the stand-by state. As mentioned above, when the predetermined time period elapses since the printer 100 transitions to the stand-by state, the control unit 5000 causes the printer 100 to transition to the sleeping state to reduce a consumption power of the printer 100. Therefore, at the timing Ta, the control unit 5000 switches the AC/DC converter output voltage switching signal 2010 from the high level (High) to the low level (Low). Then, when the AC/DC converter output voltage switching signal 2010 is at the low level, the AC/DC converter 2000 controls the output voltage 2180 such that the output voltage is equal to 5.2 V. As a result, the output voltage 2180 transitions from 24 V to 5.2 V according to a response time of the AC/DC converter 2000.

The timing Tb indicates a timing at which a predetermined time period t2 elapses since the AC/DC converter output voltage switching signal 2010 switches from the high level (High) to the low level (Low). The predetermined time period t2 is set at a time during which the output voltage 2180 is estimated to have decreased to a voltage that does not exceed an allowable power of the FET 3850 even when the FET 3850 is caused to operate in a condition where load current of the regulator 4000 is maximized. Here, an input-output voltage difference of the FET 3850 is a voltage difference between the output voltage 3180 and the output voltage 2180, a product of the input-output voltage difference and the load current is a power consumed by the FET 3850. In addition, fluctuations of the output voltage 2180 are changed by the response time of the AC/DC converter 2000 as well as the load current of the output voltage 2180, and the larger the load current of the output voltage 2180 is, the earlier the output voltage 2180 transitions to 5.2 V. For that reason, the predetermined time period t2 is set with consideration given to a condition where the load current of the output voltage 2180 is minimized, that is, the fluctuations of the output voltage 2180 are slowest, when the load SW 6000 is in the turn-on state.

By causing the regulator 4000 to start up at the timing Tb, that is, a timing at which the power consumed by the FET 3850 does not exceed the allowable power of the FET 3850, an inexpensive FET having a small allowable power can be used as the FET 3850. When the regulator 4000 starts up, the output voltage 3180 is controlled to the constant voltage by the regulator 4000. Therefore, to reduce the consumption power in the sleeping state, the control unit 5000 switches the DC/DC converter start-up signal 3010 from ON to OFF to stop the operation of the DC/DC converter 3000.

At a timing Tc, the control unit 5000 switches the load SW control signal 6010 from ON to OFF to set the load SW 6000 to the turn-off state to cut off a supply of power to loads that operate in the print state and the stand-by state. In the sleeping state of the printer 100, the consumption power is reduced by cutting off the supply of power to the loads unnecessary for the operation in the sleeping state.

Next, operation of the power supply 1080 in a case where the printer 100 transitions from the sleeping state to the stand-by state will be described. Upon receiving printing instructions from an external device such as a personal computer (not illustrated), the control unit 5000 causes the printer 100 to transition from the sleeping state to the stand-by state for printing operation. At the timing Td, the control unit 5000 switches the load SW control signal 6010 from the turn-off state (OFF) to the turn-on state (ON) to set the load SW 6000 to the turn-on state, supplying the output voltage 5180 to the loads. Subsequently, at the timing Te, the control unit 5000 switches the AC/DC converter output voltage switching signal 2010 from the low level (Low) to the high level (High). When the AC/DC converter output voltage switching signal 2010 is at the high level (High), the AC/DC converter 2000 controls the output voltage 2180 such that the output voltage 2180 is equal to 24 V. As a result, the output voltage 2180 transitions from 5.2 V to 24 V according to the response time of the AC/DC converter 2000.

The timing Tf indicates a timing at which a predetermined time period t3 elapses since the AC/DC converter output voltage switching signal 2010 switches from the low level (Low) to the high level (High). The predetermined time period t3 is set to be equal to or shorter than a time during which the output voltage 2180 is estimated to have increased to a maximum voltage that does not exceed the allowable power of the FET 3850 even when the FET 3850 is caused to operate in the condition where the load current of the regulator 4000 is maximized. In addition, the predetermined time period t3 is set with consideration given to the condition where the fluctuations of the output voltage 2180 are slowest, as with the predetermined time period t2.

At the timing Tf, the control unit 5000 switches the DC/DC converter start-up signal 3010 from OFF to ON to cause the DC/DC converter 3000 to start up. The control unit 5000 then switches the regulator start-up signal 4010 from ON to OFF to set the FET 3850 of the regulator 4000 to the turn-off state forcibly. By setting the FET 3850 to the turn-off state at a timing at which the power consumed by the FET 3850 does not exceed the allowable power of the FET 3850 as with the timing Tb, an inexpensive FET having a small allowable power can be used as the FET 3850. As described above, with the power supply 1080 in the present embodiment, the voltage accuracy of the output voltage 3180 can be improved at low cost in the low consumption power mode in which the input voltage to the DC/DC converter 3000 is decreased to reduce the switching loss. That is, the FET 3850 is set to the turn-on state to cause the regulator 4000 to start up at a timing at which the power consumed by the FET 3850 is estimated to be small. This enables an inexpensive FET having a small allowable power to be used as the FET 3850, thereby enabling the voltage accuracy of the output voltage 3180 to be improved at low cost.

As described above, according to the present embodiment, the voltage accuracy of the output voltage can be improved at low cost in the low consumption power mode.

Embodiment 4

In Embodiment 3, the DC/DC converter start-up signal 3010 and the regulator start-up signal 4010 are output from the control unit 5000, and the control unit 5000 controls start-up and stop of the DC/DC converter 3000 and the regulator 4000. In Embodiment 4, a power supply control unit 7000 will be described. The power supply control unit 7000 outputs the DC/DC converter start-up signal 3010 and the regulator start-up signal 4010 according to the output voltage of the AC/DC converter 2000 to control start-up and stop of the DC/DC converter 3000 and the regulator 4000. In the power supply 1080, the same circuits as those in Embodiment 3 will be denoted by the same reference numerals and thus will not be described here.

[Configuration of Power Supply]

Figure 13:
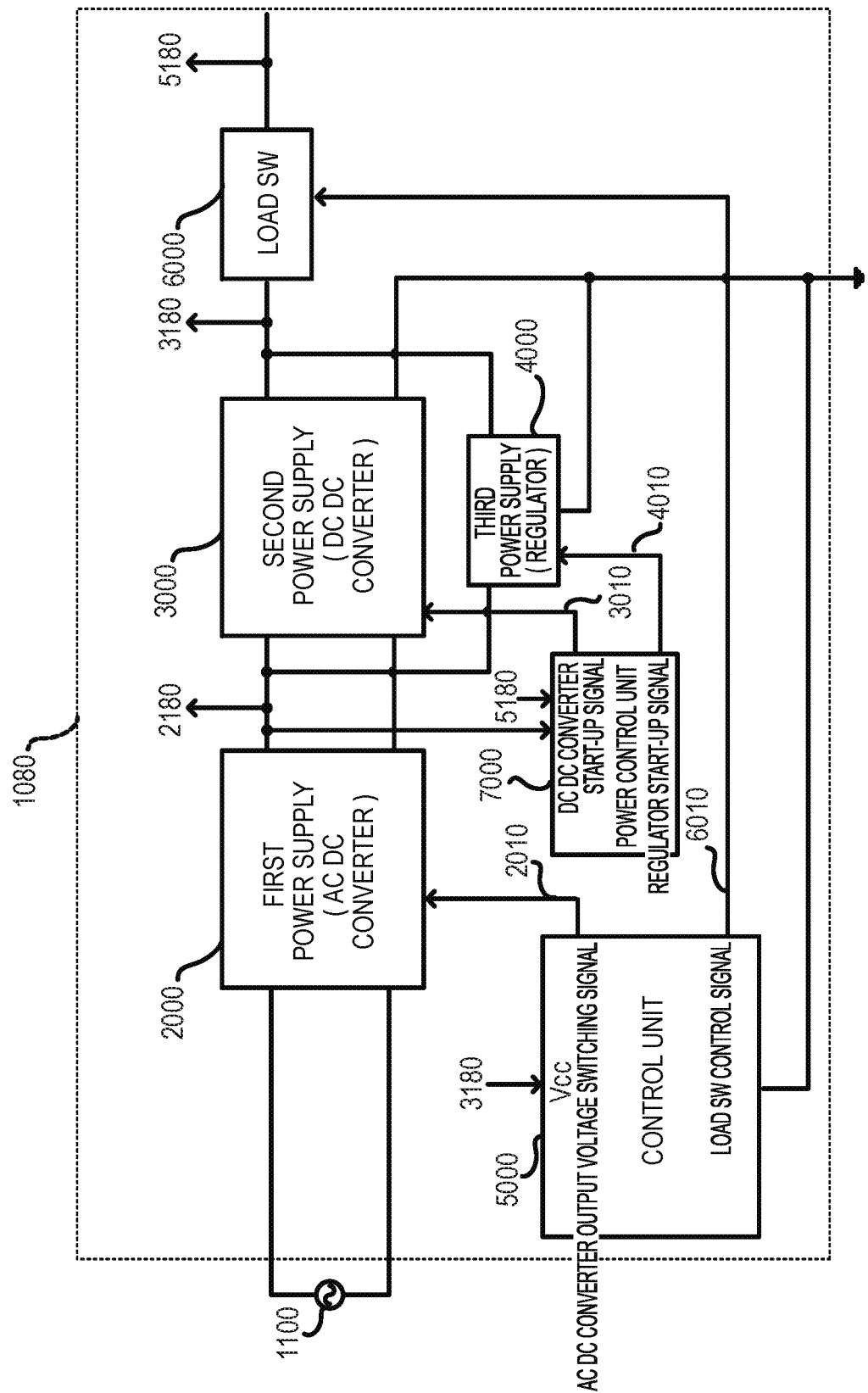
FIG. 13 is a block diagram illustrating a configuration of a power supply in Embodiment 4.

FIG. 13 is a block diagram illustrating an example of a configuration of the power supply 1080 in the present embodiment. The configuration of the power supply 1080 in the present embodiment is different from the power supply 1080 illustrated in FIG. 9 in Embodiment 3 in that the power supply control unit 7000 is added, and the DC/DC converter start-up signal 3010 and the regulator start-up signal 4010 are output from the power supply control unit 7000. In FIG. 13, the output voltage 2180 of the AC/DC converter 2000 is input into the power supply control unit 7000. Based on the voltage of the output voltage 2180, the power supply control unit 7000 outputs the DC/DC converter start-up signal 3010 to the DC/DC converter 3000 and outputs the regulator start-up signal 4010 to the regulator 4000. A power supply voltage for driving the power supply control unit 7000 is supplied from the output voltage 5180 output from the load SW 6000.

[Configuration and Operation of Power Supply Control Unit]

Figure 14:
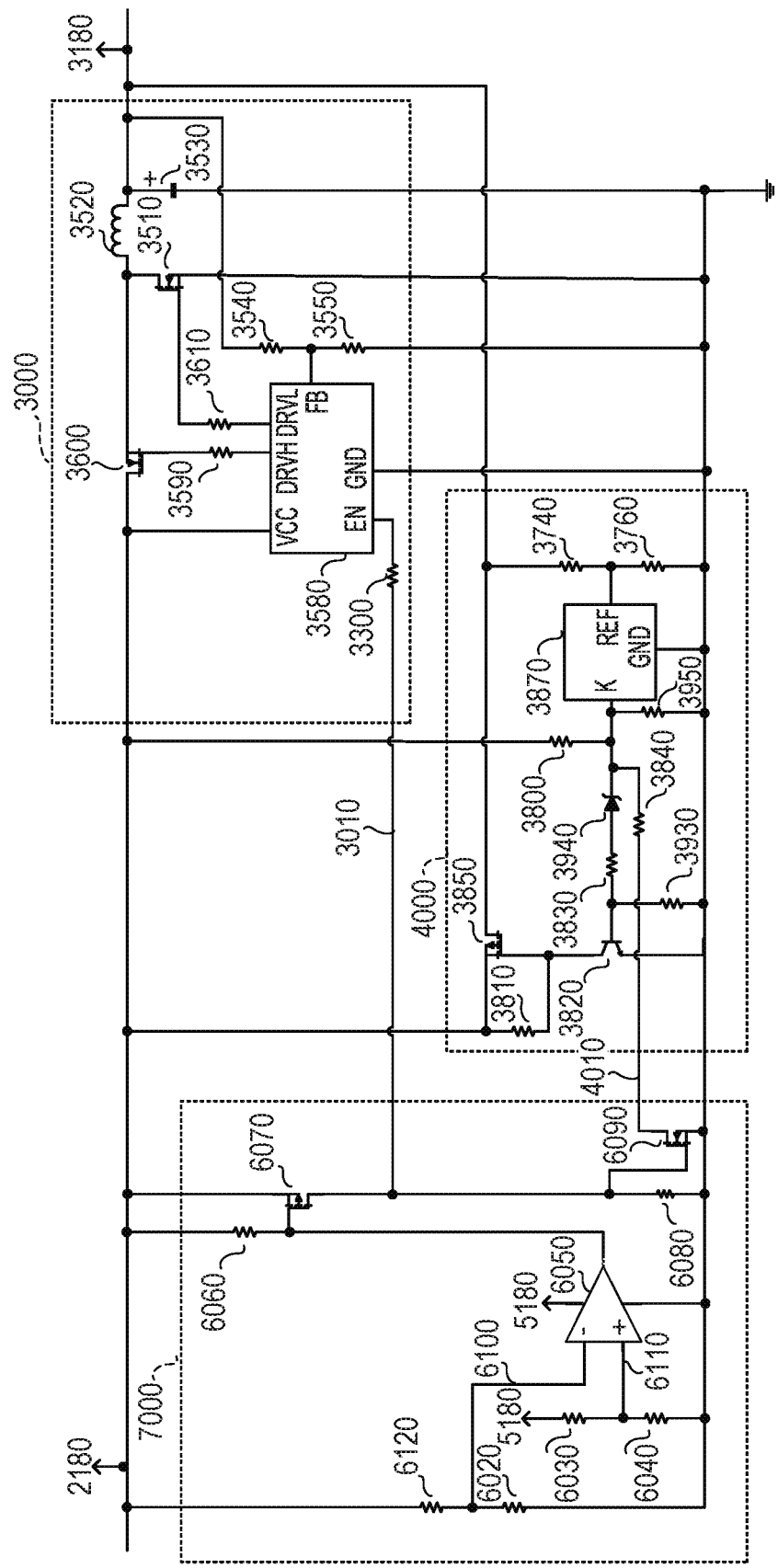
FIG. 14 is a circuit diagram illustrating configurations of a second power supply unit, a third power supply unit, and a power supply control unit in Embodiment 4.

FIG. 14 is a circuit diagram illustrating an example of circuit configurations of the DC/DC converter 3000, the regulator 4000, and the power supply control unit 7000 in the present embodiment. The same circuits as those illustrated in FIG. 11 in Embodiment 3 will be denoted by the same reference numerals and will not be described.

The power supply control unit 7000 includes a comparator 6050, a P channel FET 6070, an N channel FET 6090, and resistors 6020, 6030, 6040, 6060, 6080 and 6120. To the comparator 6050, the output voltage 5180 being the output voltage of the load SW 6000 is supplied as power supply voltage. In the comparator 6050, an inverting input terminal (−) receives a voltage made by dividing the output voltage 2180 with the resistors 6120 and 6020, and a noninverting input terminal (+) receives a reference voltage made by dividing the output voltage 5180 with the resistors 6030 and 6040. An output terminal of the comparator 6050 is connected to a gate terminal of the FET 6070, and a source terminal of the FET 6070 is connected to the output voltage 2180. A drain terminal of the FET 6070 is connected to the EN terminal of the power supply IC 3580 of the DC/DC converter 3000 and a gate terminal of the FET 6090, and connected to a ground via the resistor 6080. In the FET 6090, a drain terminal is connected to the regulator 4000 as a terminal to output the regulator start-up signal 4010, and a source terminal is connected to a ground.

Next, operation of the power supply control unit 7000 will be described. The comparator 6050 compares a reference voltage 6110 that is made by dividing the output voltage 5180 with the resistor 6030 and the resistor 6040 and input into the noninverting input terminal (+), with a sensing voltage 6100 that is made by dividing the output voltage 2180 with the resistors 6120 and 6020 and input into the inverting input terminal. Then, the power supply control unit 7000 operates as follows according to a result of the comparison of the comparator 6050.

In a case where the sensing voltage 6100 input into the inverting input terminal (−) is higher than the reference voltage 6110 input into the noninverting input terminal (+), a low level is output from the output terminal of the comparator 6050, a voltage of the gate terminal of the FET 6070 decreases, and the FET 6070 is thereby turned on. When the FET 6070 is turned on, the DC/DC converter start-up signal 3010 at a high level (ON) is output to the EN terminal of the power supply IC 3580 of the DC/DC converter 3000, which causes the power supply IC 3580 to start up, as described in Embodiment 3. In addition, in a case where the DC/DC converter start-up signal 3010 is at the high level (ON), the voltage applied to the gate terminal of the FET 6090 increases, the FET 6090 is thereby turned on, and the regulator start-up signal 4010 at a low level (OFF) is output to the regulator 4000. When the regulator start-up signal 4010 at the low level (OFF) is output, the current flowing into the base terminal of the transistor 3820 via the resistor 3840, the Zener diode 3940, and the resistor 3830 decreases, and the transistor 3820 is thereby turned off. When the transistor 3820 is turned off, the voltage applied to the gate terminal of the FET 3850 is the output voltage 2180 via the resistor 3810, and the FET 3850 is thereby brought to the turn-off state, which causes the regulator 4000 to stop its switching operation.

In contrast, in a case where the sensing voltage 6100 input into the inverting input terminal (−) is lower than the reference voltage 6110 input into the noninverting input terminal (+), the output of the comparator 6050 is in a high impedance state, and thus the output voltage 2180 is applied to the gate terminal of the FET 6070 via the resistor 6060, which turns off (OFF) the FET 6070. In a case where the FET 6070 is in the turn-off state (OFF), the DC/DC converter start-up signal 3010 at a low level (OFF) is input into the EN terminal of the power supply IC 3580, which causes the power supply IC 3580 to stop its operation, as described in Embodiment 3. In addition, in a case where the DC/DC converter start-up signal 3010 is at the low level (OFF), the voltage applied to the gate terminal of the FET 6090 decreases, the FET 6090 is thereby turned off (OFF), and ON (high impedance) is output to the regulator start-up signal 4010. In a case where the regulator start-up signal 4010 is ON, the regulator 4000 starts up, and the constant voltage control of the output voltage 3180 is performed.

In addition, in a case where the load SW 6000 is brought into the turn-off state by bringing the load SW control signal 6010 to OFF and no power (the output voltage 5180 being the power supply voltage) is supplied to the power supply control unit 7000, the comparator 6050 using the output voltage 5180 as the power supply voltage does not operate. At that time, the output of the comparator 6050 becomes a high impedance state, and thus the DC/DC converter start-up signal 3010 is at the low level (OFF), and the regulator start-up signal 4010 is at the high level (ON), as mentioned above. Therefore, in this case, the power supply IC 3580 stops its operation, and the regulator 4000 starts up.

[Description of Control Operation]

Figure 15:
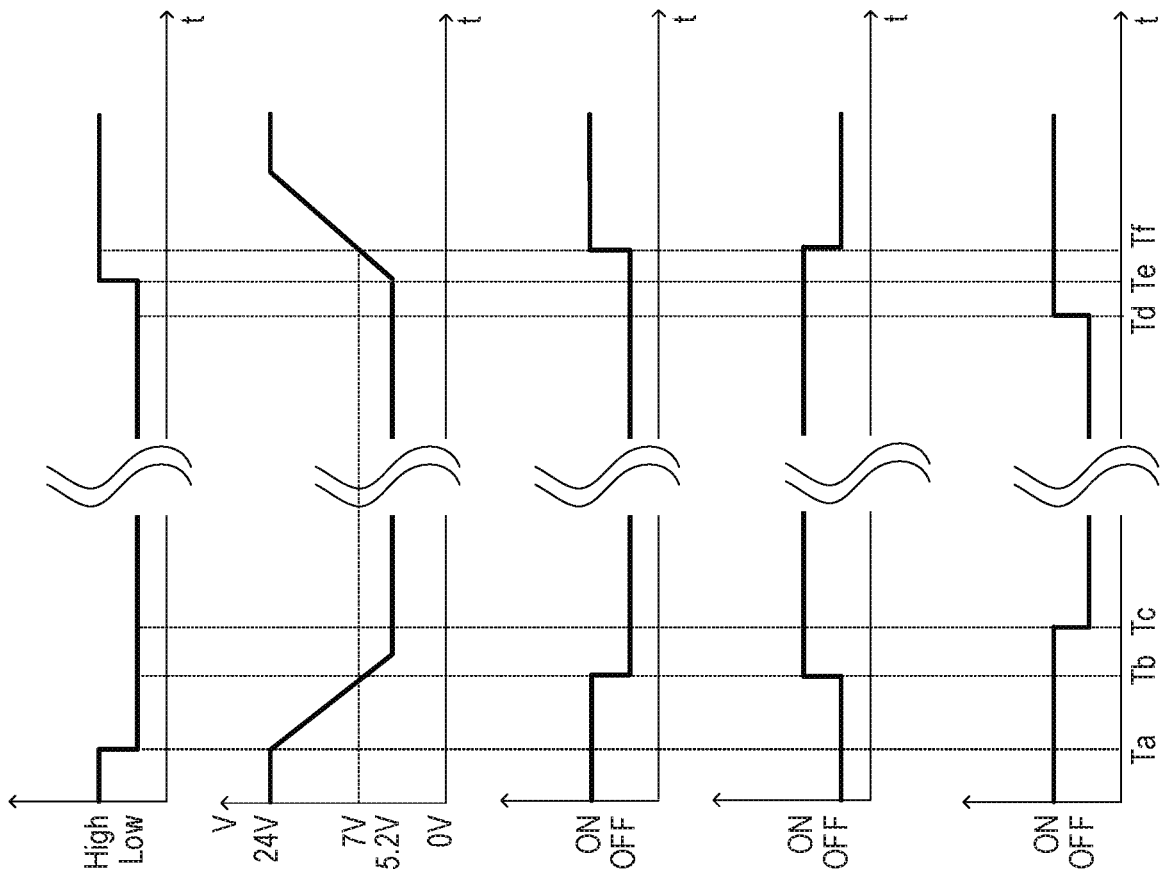
FIG. 15A, FIG. 15B, FIG. 15C, FIG. 15D and FIG. 15E are timing charts used for describing operation of a power supply in Embodiment 4.

FIG. 15A to FIG. 15E are timing charts illustrating operation of the power supply 1080 in a case where the printer 100 in Embodiment 4 transitions from the stand-by state to the sleeping state and a case where the printer 100 transitions from the sleeping state to the stand-by state. FIG. 15A illustrates output levels of the AC/DC converter output voltage switching signal 2010, where High indicates an output at a high level, and Low indicates an output at a low level. FIG. 15B is a voltage waveform illustrating a voltage of the output voltage 2180, where 24 V and 5.2 V are voltage values of the output voltage 2180. FIG. 15C is a signal waveform illustrating output levels (ON, OFF) of the DC/DC converter start-up signal 3010, and FIG. 15D is a signal waveform illustrating output levels (ON, OFF) of the regulator start-up signal 4010. FIG. 15E is a signal waveform illustrating output levels (ON, OFF) of the load SW control signal 6010. In FIG. 15A to FIG. 15E, horizontal axes each indicate elapsed time t. Ta, Tb, Tc, Td, Te and Tf each indicate a timing (time).

First, operation of the power supply 1080 in a case where the printer 100 transitions from the stand-by state to the sleeping state will be described. The timing Ta indicates a timing at which a time period t1 being a predetermined time period elapses without a transition to the print state since the printer 100 transitions to the stand-by state. As mentioned above, when the predetermined time period elapses since the printer 100 transitions to the stand-by state, the control unit 5000 causes the printer 100 to transition to the sleeping state to reduce a consumption power of the printer 100. Therefore, at the timing Ta, the control unit 5000 switches the AC/DC converter output voltage switching signal 2010 from the high level (High) to the low level (Low). Then, when the AC/DC converter output voltage switching signal 2010 is at the low level, the AC/DC converter 2000 controls the output voltage 2180 such that the output voltage is equal to 5.2 V. As a result, the output voltage 2180 transitions from 24 V to 5.2 V according to a response time of the AC/DC converter 2000.

At the timing Tb, in a case where the comparator 6050 senses with the sensing voltage 6100 that the output voltage 2180 has fallen below a predetermined value, the power supply control unit 7000 brings an output of the DC/DC converter start-up signal 3010 to OFF and brings an output of the regulator start-up signal 4010 to ON. The predetermined value in this case is set to be equal to or lower than a maximum voltage that does not exceed the allowable power of the FET 3850 even when the FET 3850 is caused to operate in the condition where the load current of the regulator 4000 is maximized. In the present embodiment, the predetermined value is set at 7 V. The OFF (low level) output of the DC/DC converter start-up signal 3010 and the ON (high impedance) output of the regulator start-up signal 4010 causes the power supply IC 3580 to stop its operation, and the output voltage 3180 is subjected to the constant voltage control by the regulator 4000. As described in Embodiment 3, fluctuations of the voltage of the output voltage 2180 are changed by the response time of the AC/DC converter 2000 as well as the load current of the output voltage 2180. In the present embodiment, by using the regulator start-up signal 4010 to cause the FET 3850 to operate based on a result of sensing the output voltage 2180, the regulator 4000 can be caused to start up at an appropriate timing irrespective of the load current of the output voltage 2180. This enables an inexpensive FET having a small allowable power to be used as the FET 3850, enabling a time from the timing Ta to the Timing Tb to cause the FET 3850 to operate to be prevented from prolonging more than necessary.

At a timing Tc, the control unit 5000 switches the load SW control signal 6010 from ON to OFF to set the load SW 6000 to the turn-off state to cut off the supply of power to the loads that operate in the print state and the stand-by state. By cutting off the supply of power to the loads unnecessary for the operation in the sleeping state, the consumption power in the sleeping state can be reduced. At that time, the supply of power to the power supply control unit 7000 is also cut off. As mentioned above, in a case where the output voltage 5180 is supplied to the power supply control unit 7000 as power, that is, power supply voltage, the power supply control unit 7000 controls the output of the DC/DC converter start-up signal 3010 and the regulator start-up signal 4010 according to the output voltage 2180. Switching the AC/DC converter output voltage switching signal 2010 is performed with the load SW 6000 being in the turn-on state. Therefore, in a case where the load SW 6000 is in the turn-off state, a function of the power supply control unit 7000 of sensing the output voltage 2180 and controlling the output signals of the DC/DC converter start-up signal 3010 and the regulator start-up signal 4010 is unnecessary. Therefore, in a case where the load SW 6000 is in the turn-off state, the supply of power to the power supply control unit 7000 is stopped, and thus a power consumed in the sleeping state by the resistors 6030 and 6040, and the comparator 6050 of the power supply control unit 7000 can be reduced. As mentioned above, in a case where the supply of power to the power supply control unit 7000 is not performed, the output voltage 3180 is subjected to the constant voltage control by the regulator 4000, and the power supply IC 3580 of the DC/DC converter 3000 keeps stopping.

Next, operation of the power supply 1080 in a case where the printer 100 transitions from the sleeping state to the stand-by state will be described. At the timing Td, the control unit 5000 switches the load SW control signal 6010 from the turn-off state (OFF) to the turn-on state (ON) to set the load SW 6000 to the turn-on state, supplying the output voltage 5180 to the loads. This causes power, that is, the output voltage 5180 as the power supply voltage to be supplied also to the power supply control unit 7000, which enables the power supply control unit 7000 to sense the output voltage 2180 and control the output signal of the DC/DC converter start-up signal 3010 and the regulator start-up signal 4010.

Subsequently, at the timing Te, the control unit 5000 switches the AC/DC converter output voltage switching signal 2010 from the low level (Low) to the high level (High). As mentioned above, when the AC/DC converter output voltage switching signal 2010 is at the high level (High), the AC/DC converter 2000 performs control such that the output voltage 2180 is equal to 24 V. As a result, the output voltage 2180 transitions from 5.2 V to 24 V according to the response time of the AC/DC converter 2000. At the timing Tf, in a case where the power supply control unit 7000 senses with the sensing voltage 6100 input into the comparator 6050 that the output voltage 2180 has exceeded the predetermined value, 7 V, the power supply control unit 7000 outputs the following signals. That is, the power supply control unit 7000 brings the output of the DC/DC converter start-up signal 3010 to ON and brings the output of the regulator start-up signal 4010 to OFF. This causes the power supply IC 3580 of the DC/DC converter 3000 to start up and causes the regulator 4000 to stop its operation, thereby keeping a state where the DC/DC converter 3000 controls the output voltage 3180 to the constant voltage. The power supply control unit 7000 causes the FET 3850 of the regulator 4000 to operate based on a result of sensing the output voltage 2180 as in the case of the timing Tb mentioned above, which enables an inexpensive FET having a small allowable power to be used as the FET 3850. Furthermore, this can prevent a time taken to transition from the sleeping state to the stand-by state from prolonging more than necessary.

As described above, the power supply 1080 in the present embodiment includes the power supply control unit 7000 that controls the DC/DC converter 3000 and the regulator 4000 according to the output voltage 2180, which enables the voltage accuracy of the output voltage 3180 to be improved at low cost. That is, according to the output voltage 2180, the power supply control unit 7000 turns on the FET 3850 to cause the regulator 4000 to start up at a timing at which the power consumed by the FET 3850 is estimated to be small. This enables an inexpensive FET having a small allowable power to be used as the FET 3850, enabling the voltage accuracy of the output voltage 3180 to be further improved at low cost. In addition, by causing the FET 3850 to operate based on a result of sensing the output voltage 2180, the FET 3850 can be turned on (ON) at an appropriate timing irrespective of the load current of the output voltage 2180. This enables the transition between the sleeping state and the stand-by state to be shortened. Embodiments 2 and 3 are described with the control unit 5000 being a control device provided in the power supply 1080. However, for example, the control unit 500 of the laser beam printer described with reference to FIG. 1 may be configured to, instead of the control unit 5000, control the power supply 1080.

As described above, according to the present embodiment, the voltage accuracy of the output voltage can be improved at low cost in the low consumption power mode.

Embodiment 5

In Embodiments 3 and 4, the load SW control signal 6010 is output at a timing different from the timing of the DC/DC converter start-up signal 3010 and the regulator start-up signal 4010. In Embodiment 5, an embodiment in which the load SW control signal 6010 is output at the same timing as the timing of the DC/DC converter start-up signal 3010 and the regulator start-up signal 4010 will be described. The configuration of the power supply 1080 is the same as that in Embodiment 3 and thus will not be described here.

[Description of Control Operation]

Figure 16:
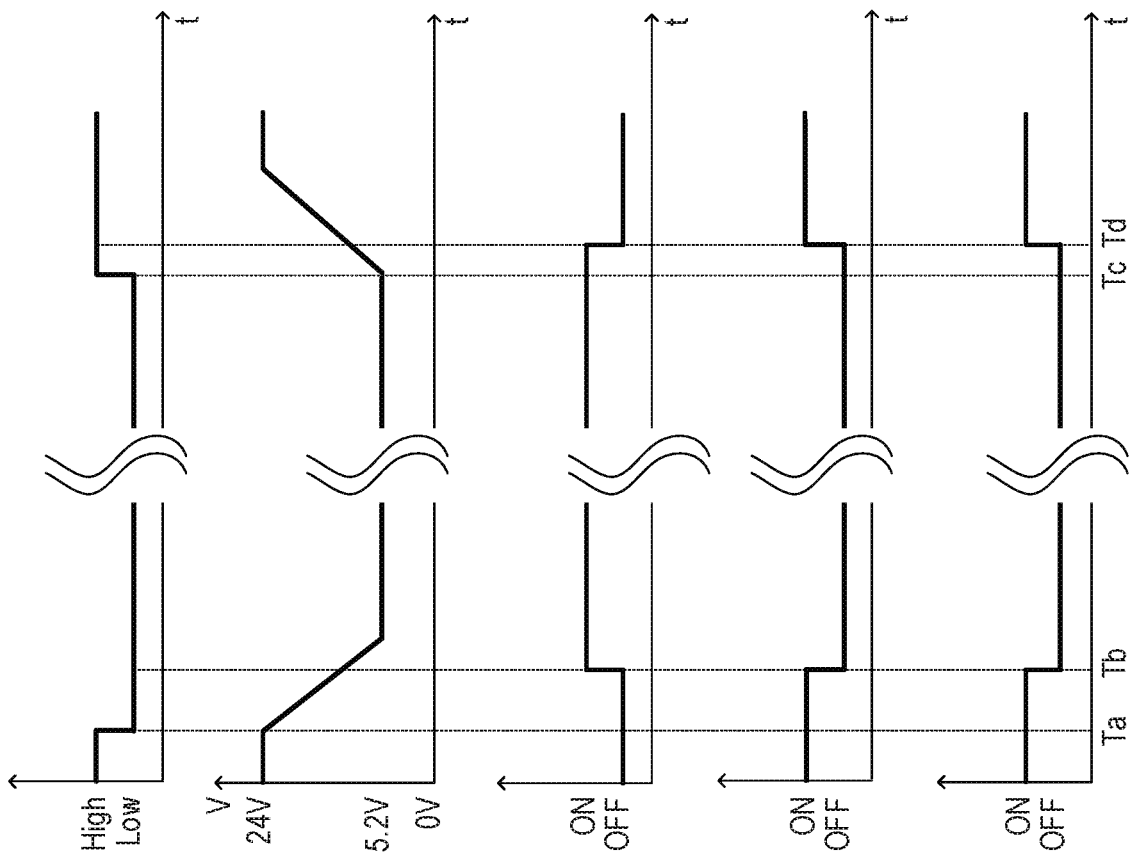
FIG. 16A, FIG. 16B, FIG. 16C, FIG. 16D and FIG. 16E are timing charts used for describing operation of a power supply in Embodiment 5.

FIG. 16A to FIG. 16E are timing charts illustrating operation of the power supply 1080 in a case where the printer 100 in Embodiment 5 transitions from the stand-by state to the sleeping state and a case where the printer 100 transitions from the sleeping state to the stand-by state. FIG. 16A illustrates output levels of the AC/DC converter output voltage switching signal 2010, where High indicates an output at a high level, and Low indicates an output at a low level. FIG. 16B is a voltage waveform illustrating a voltage of the output voltage 2180, where 24 V and 5.2 V are voltage values of the output voltage 2180. FIG. 16C is a signal waveform illustrating output levels (ON, OFF) of the regulator start-up signal 4010, and FIG. 16D is a signal waveform illustrating output levels (ON, OFF) of the DC/DC converter start-up signal 3010. FIG. 16E is a signal waveform illustrating output levels (ON, OFF) of the load SW control signal 6010. In FIG. 16A to FIG. 16E, horizontal axes each indicate elapsed time t. Ta, Tb, Tc and Td each indicate a timing (time).

First, operation of the power supply 1080 in a case where the printer 100 transitions from the stand-by state to the sleeping state will be described. As in Embodiment 3 mentioned above, at the timing Ta, the control unit 5000 switches the AC/DC converter output voltage switching signal 2010 from the high level (High) to the low level (Low). This causes the output voltage 2180 to transition from 24 V to 5.2 V according to the response time of the AC/DC converter 2000.

At the timing Tb, the control unit 5000 switches the load SW control signal 6010 from ON to OFF to set the load SW 6000 to the turn-off state to cut off the supply of power to the loads that operate in the print state and the stand-by state. At the same time, the control unit 5000 switches the regulator start-up signal 4010 from OFF to ON. By setting the load SW 6000 to the turn-off state, the load current of the regulator 4000 decreases, and the consumption power of the FET 3850 also decreases. Therefore, by causing the FET 3850 to operate with the load SW 6000 set to the turn-off state, an inexpensive FET having a small allowable power can be used as the FET 3850.

Furthermore, at the same time, the control unit 5000 switches the DC/DC converter start-up signal 3010 from ON to OFF. When the regulator 4000 starts up, the output voltage 3180 is controlled to the constant voltage by the regulator 4000. Therefore, to reduce the consumption power in the sleeping state, the control unit 5000 switches the DC/DC converter start-up signal 3010 from ON to OFF to stop the operation of the DC/DC converter 3000.

Next, operation of the power supply 1080 in a case where the printer 100 transitions from the sleeping state to the stand-by state will be described. At the timing Tc, the control unit 5000 switches the AC/DC converter output voltage switching signal 2010 from the low level (Low) to the high level (High). This causes the AC/DC converter 2000 to perform control such that the output voltage 2180 changes from 5.2 V to 24 V. The output voltage 2180 transitions from 5.2 V to 24 V according to the response time of the AC/DC converter 2000.

At the timing Td, the control unit 5000 switches the load SW control signal 6010 from OFF to ON to set the load SW 6000 to the turn-on state, supplying the output voltage 5180 to the loads. Concurrently with switching the load SW control signal 6010 to OFF, the control unit 5000 then switches the regulator start-up signal 4010 from ON to OFF to set the FET 3850 of the regulator 4000 to the turn-off state (OFF) forcibly. By setting the FET 3850 to the turn-off state at a timing at which the power consumed by the FET 3850 is small as with the timing Tb mentioned above, an inexpensive FET having a small allowable power can be used as the FET 3850. The control unit 5000 switches the DC/DC converter start-up signal 3010 from OFF to ON to cause the DC/DC converter 3000 to start up.

In the present embodiment, the timing for turning on or off the FET 3850 is determined according to a state of the load current of the regulator 4000 in the turn-on state or the turn-off state of the load SW 6000, but the timing may be determined by estimating the load current from a voltage drop between input and output of the load SW 6000. Alternatively, the timing for turning on or off the FET 3850 may be determined from a consumption power of the FET 3850 that is calculated from the load current of the regulator 4000 and the sensed output voltage 2180, as in Embodiment 4.

As described above, with the power supply 1080 in the present embodiment can enhance the voltage accuracy of the output voltage 3180 can be improved at low cost in the low consumption power mode in which the input voltage to the DC/DC converter 3000 is decreased to reduce the switching loss. That is, the FET 3850 is turned on to cause the regulator 4000 to start up at a timing at which the power consumed by the FET 3850 is estimated to be small from the state of the load current of the regulator 4000. This enables the voltage accuracy of the output voltage 3180 to be improved at low cost using an inexpensive FET having a small allowable power to be used as the FET 3850.

As described above, according to the present embodiment, the voltage accuracy of the output voltage can be improved at low cost in the low consumption power mode.

Embodiment 6

[Description of Power Supply]

Figure 17:
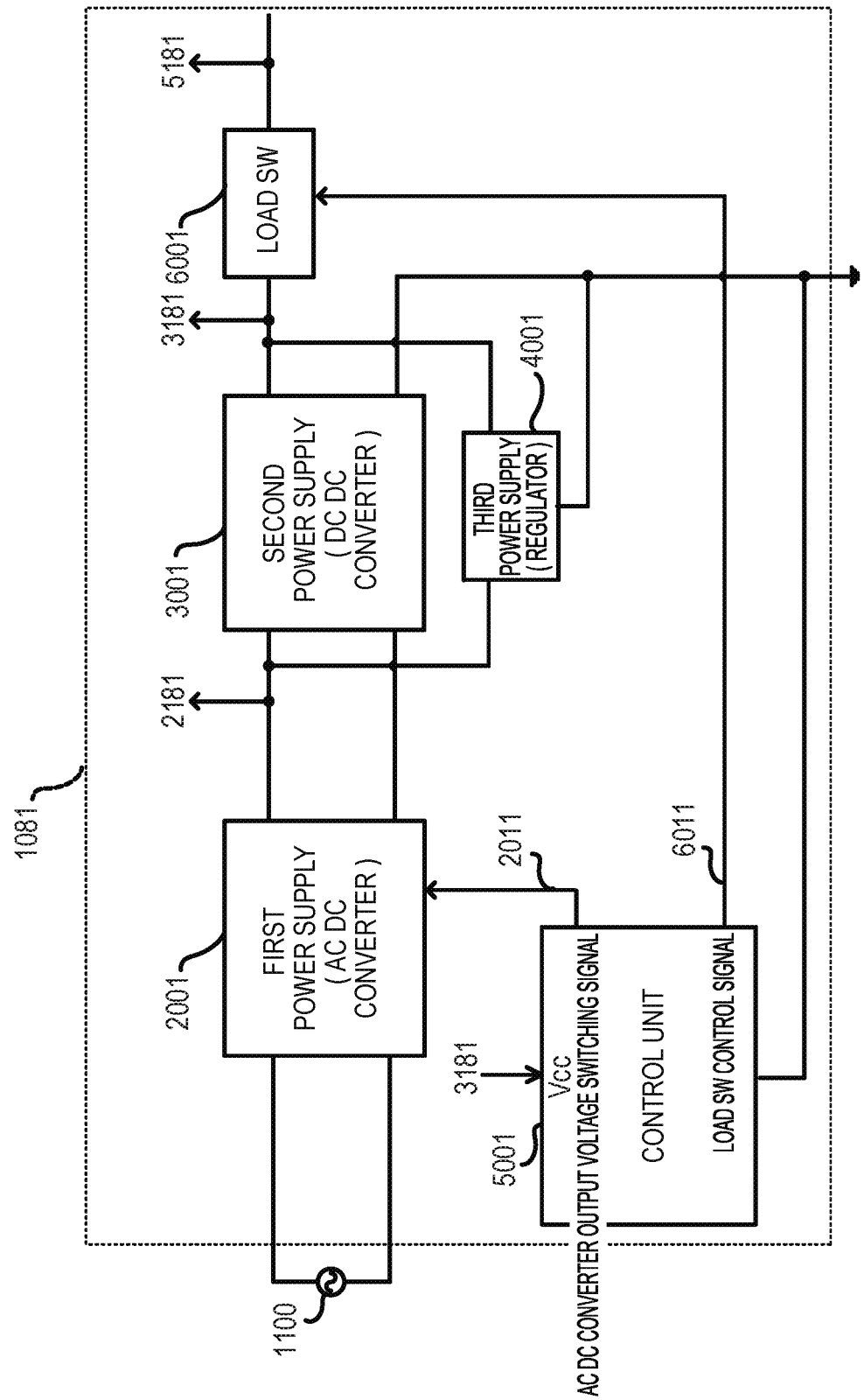
FIG. 17 is a block diagram illustrating a configuration of a power supply in Embodiment 6.

FIG. 17 is a block diagram illustrating an example of a configuration of a power supply 1081 that converts AC voltage into DC voltage. The power supply 1081 includes an AC/DC converter 2001 being a first power supply unit, a DC/DC converter 3001 being a second power supply unit, a regulator 4001 being a third power supply unit, a control unit 5001, and a load switch (load SW) 6001. In the power supply 1081, AC voltage input from the commercial AC power supply 1100 is input into the AC/DC converter 2001, and an output voltage 2181 that is DC and stepped down by the AC/DC converter 2001 is generated and output. The output voltage 2181 is input into the DC/DC converter 3001, and an output voltage 3181 that is DC and stepped down by the DC/DC converter 3001 is generated and output. The regulator 4001 is connected between an input terminal and an output terminal of the DC/DC converter 3001 in parallel to the DC/DC converter 3001. The control unit 5001 (first control unit) outputs control signals to the AC/DC converter 2001, the DC/DC converter 3001, and the load SW 6001 to control the AC/DC converter 2001, the DC/DC converter 3001, and the load SW 6001. An AC/DC converter output voltage switching signal 2011 is output from the control unit 5001 to the AC/DC converter 2001 to switch target voltages for an output voltage 2181 output by the AC/DC converter 2001. A load SW control signal 6011 is output from the control unit 5001 to the load SW 6001 to control output of the output voltage 5181. To the control unit 5001, an output voltage 3181 generated by the DC/DC converter 3001 is supplied. The load SW 6001 receives the output voltage 3181 from the DC/DC converter 3001. The load SW 6001 receives the load SW control signal 6011 from the control unit 5001, and a switching element of the load SW 6001 is set to a turn-on state or a turn-off state according to the load SW control signal 6011. This causes the output voltage 3181 input from the DC/DC converter 3001 to be output as it is or to be cut off, to control the output of the output voltage 5181.

[Configuration of AC/DC Converter 2001]

Figure 18:
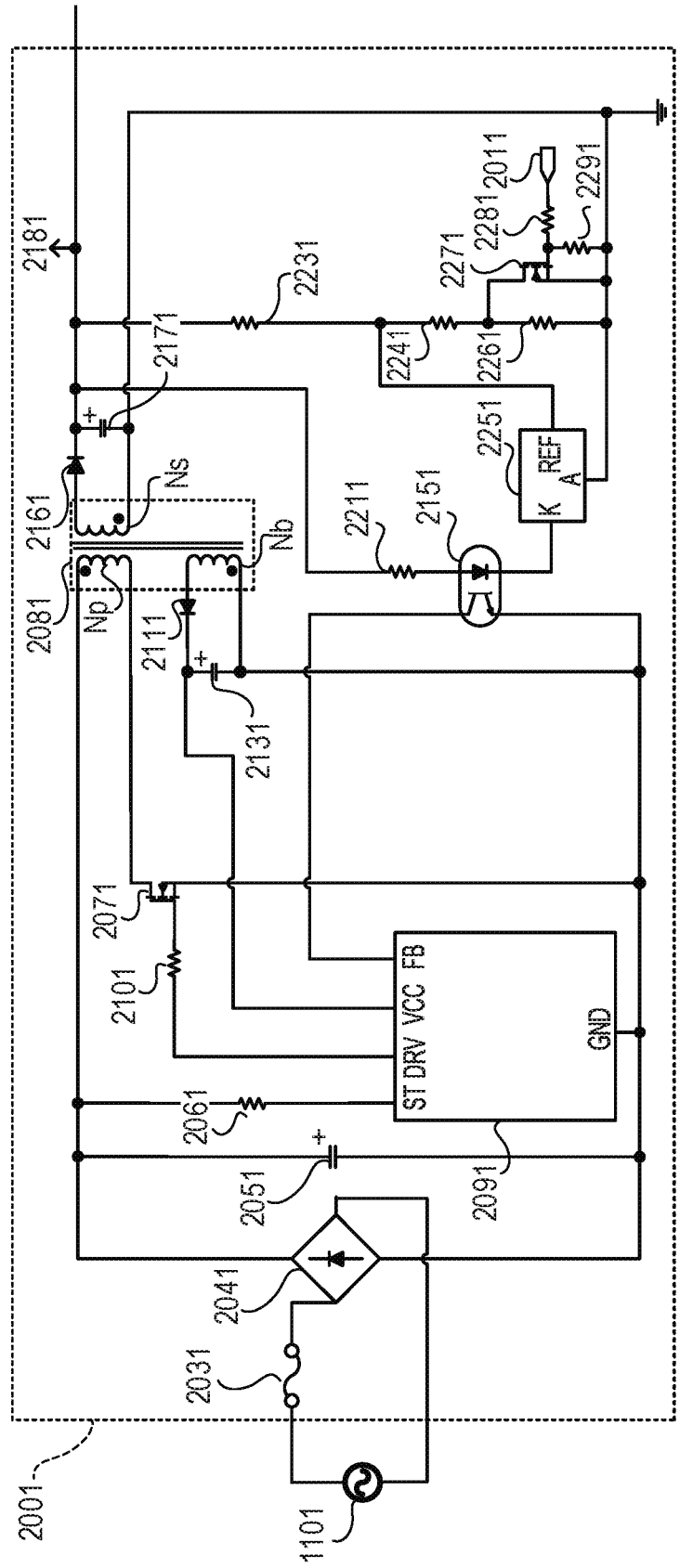
FIG. 18 is a circuit diagram illustrating a configuration of a first power supply unit in Embodiment 6.

FIG. 18 is a circuit diagram illustrating an example of a configuration of the AC/DC converter 2001. A circuit configuration of the AC/DC Converter 2001 will be described first. In FIG. 18, the AC voltage input from the commercial AC power supply 1100 passes through a current fuse 2031 for circuit protection and a rectifier diode bridge 2041 to be full-wave rectified and is smoothed to be DC voltage by a primary smoothing capacitor 2051 (hereinafter, referred to as smoothing capacitor 2051). Then, the DC voltage charged in the smoothing capacitor 2051 is supplied through a start-up resistor 2061 to a ST terminal of a power supply IC 2091 that controls the AC/DC converter 2001. When the supplied voltage reaches a start-up voltage of the power supply IC 2091, the power supply IC 2091 starts up. The power supply IC 2091 performs switching control of a field-effect transistor (hereinafter, expressed as FET) 2071 being a switching element. Upon starting up, the power supply IC 2091 outputs from its DRV terminal a driving pulse to a gate terminal of the FET 2071 through a resistor 2101. For a period during which the driving pulse is at a high level (High), the FET 2071 is in a conductive state (referred also to as turn-on state), and the DC voltage of the smoothing capacitor 2051 is applied across a primary winding Np of a transformer 2081. At that time, a voltage is also induced on a secondary winding Ns side of the transformer 2081. However, because the voltage is a voltage that makes an anode terminal side of a diode 2161 negative, the diode 2161 is not in the conductive state, and thus no energy is transmitted to a secondary side of the transformer 2081. Similarly, a voltage is also induced on an auxiliary winding Nb side of the transformer 2081. However, because the voltage is a voltage that makes an anode terminal side of a diode 2111 negative, the diode 2111 is not in the conductive state, and thus no energy is transmitted to an auxiliary winding Nb. Therefore, a current flowing through the primary winding Np of the transformer 2081 includes only an exciting current of the transformer 2081, and the transformer 2081 accumulates energy in proportion to a square of the exciting current. The exciting current increases in proportion to time.

Next, when a driving pulse at a low level (Low) is output from the DRV terminal of the power supply IC 2091, the FET 2071 is in a non-conductive state from the conductive state for a period of the low level driving pulse. When the FET 2071 is in the non-conductive state, voltages with polarities reverse to polarities occurring when the FET 2071 is conducted are induced in the secondary winding Ns and the auxiliary winding Nb of the transformer 2081. As a result, a voltage of which a positive polarity is on an anode terminal side of the diode 2161 is induced in the secondary winding Ns of the transformer 2081, which brings the diode 2161 into the conductive state. Then, a voltage induced by the energy accumulated in the transformer 2081 is rectified and smoothed by a smoothing and rectifying circuit that is formed by the diode 2161 and the smoothing capacitor 2171, and the output voltage 2181 is generated as the DC voltage. At the same time, a voltage of which a positive polarity is on an anode terminal side of the diode 2111 is induced in the auxiliary winding Nb, which brings the diode 2111 into the conductive state. The voltage induced in the auxiliary winding Nb is charged in a capacitor 2131 via the diode 2111, and the DC voltage charged in the capacitor 2131 is supplied to a VCC terminal of the power supply IC 2091.

[Controlling Output Voltage of AC/DC Converter 2001]

Next, voltage control of the output voltage 2181 will be described. In the AC/DC converter 2001, the voltage control of the output voltage 2181 is performed as follows. First, the output voltage 2181 generated on the secondary side of the transformer 2081 is divided by series-connected resistors including a regulator resistor 2231, a resistor 2241, and a resistor 2261, and is input into a REF terminal of a shunt regulator 2251. Then, in the shunt regulator 2251, a feedback signal according to a level of the voltage input into the REF terminal is output from a K terminal (cathode terminal). The K terminal of the shunt regulator 2251 is connected to a light emitting diode (LED) of a photocoupler 2151. The feedback signal output from the K terminal of the shunt regulator 2251 brings the LED of the photocoupler 2151 into a conductive state to turn on a phototransistor of the photocoupler 2151, and a voltage according to the feedback signal is input into an FB terminal of the power supply IC 2091. A resistor 2211 is a resistor for limiting current flowing through the LED of the photocoupler 2151. Thus, the power supply IC 2091 can control the output voltage stably by outputting the driving pulse from its DRV terminal to perform switching control of the FET 2071 based on the voltage according to the feedback signal input into the FB terminal. Indications ST, DRV, VCC and FB shown inside the power supply IC 2091 in FIG. 18 are names of the respective terminals.

There are two kinds of the voltage of the output voltage 2181 including a voltage necessary for the stand-by state and the print state and a voltage necessary for the sleeping state. The voltage of the output voltage 2181 can be switched according to each state by the AC/DC converter output voltage switching signal 2011 from the control unit 5001. A reason for switching the output voltage 2181 in the sleeping state is that the sleeping state need not drive the driving unit, such as a motor, and the image forming unit, and it is sufficient to output the output voltage 3181 necessary in sleeping. Therefore, in the present embodiment, the target voltage of the output voltage 2181 is set at a voltage as close to a target voltage of the output voltage 3181 as possible, in the sleeping state, to improve an efficiency of the power supply 1081. In addition, the output voltage 2181 is supplied via a load SW (not illustrated) separate from the load SW 6001 illustrated in FIG. 17 to the driving unit, such as a motor, and the photosensitive drum 101, the charge unit 102, the developing unit 103, and the transfer unit 105 forming the image forming unit. Under control by the control unit 5001, the load SW (not illustrated) is brought into the turn-on state in the stand-by state and the print state to perform supply of power to the driving unit, such as a motor, and the image forming unit, and is brought into the turn-off state in the sleeping state to cut off the supply of power, reducing the consumption power.

Voltage switching control of the output voltage 2181 is performed as follows. In a case where the printer 100 is in the stand-by state and the print state, the power supply 1081 supplies the output voltage 2181 to the driving unit, such as a motor, and the image forming unit. At that time, the control unit 5001 sets the AC/DC converter output voltage switching signal 2011 at a high level, and a voltage divided into by a resistor 2281 and a resistor 2291 is applied to a gate terminal of an FET 2271. The FET 2271 is then brought into the turn-on state (ON), and the FET 2271 becomes conductive between its drain terminal and source terminal, which brings about a state where the resistor 2261 is negligible (is not connected to the resistor 2241). Let a voltage input into a REF terminal of the shunt regulator 2251 be denoted by a voltage Vref, a resistance value of the resistor 2231 be denoted by a resistance value $R_{2231}$, a resistance value of the resistor 2241 be denoted by a resistance value $R_{2241}$, and a resistance value of the resistor 2261 be denoted by a resistance value $R_{2261}$. Assume that an on-resistance of the FET 2271 is sufficiently low to be negligible, for simplifying calculation. In the stand-by state and the print state of the printer 100, the voltage $V_{24V}$ of the output voltage 2181 is expressed by the following Formula (1).

$$V_{24V} = V_{REF} \cdot \frac{R_{223} + R_{224}}{R_{224}} \quad \text{Formula (1)}$$

In the present embodiment, assume that the voltage $V_{24V}$ of the output voltage 2181 in the stand-by state and the print state of the printer 100 is set as $V_{24V}$=24 V (first DC voltage), as a setting example of a specific numerical value.

In contrast, in the sleeping state of the printer 100, when the control unit 5001 sets the AC/DC converter output voltage switching signal 2011 at a low level (a voltage of 0 V), the FET 2271 is brought into the turn-off state (OFF), the FET 2271 becomes nonconductive between its drain terminal and source terminal. This consequently brings about a state where the resistor 2261 is not negligible electrically, that is, a state where the resistor 2261 is connected to the resistor 2241. Assuming that current flowing when the FET 2271 is OFF is 0 A for simplifying calculation, a voltage $V_{5V}$ of the output voltage 2181 in the sleeping state is expressed by the following Formula (2).

$$V_{5V} = V_{REF} \cdot \frac{R_{223} + R_{224} + R_{225}}{R_{224} + R_{226}} \quad \text{Formula (2)}$$

In the present embodiment, assume that the voltage $V_{5V}$ of the output voltage 2181 in the sleeping state is set as $V_{5V}$=5.2 V (second DC voltage), as a setting example of a specific numerical value. The AC/DC converter 2001 may be an isolated DC/DC converter.

[Configuration of DC/DC Converter 3001]

Figure 19:
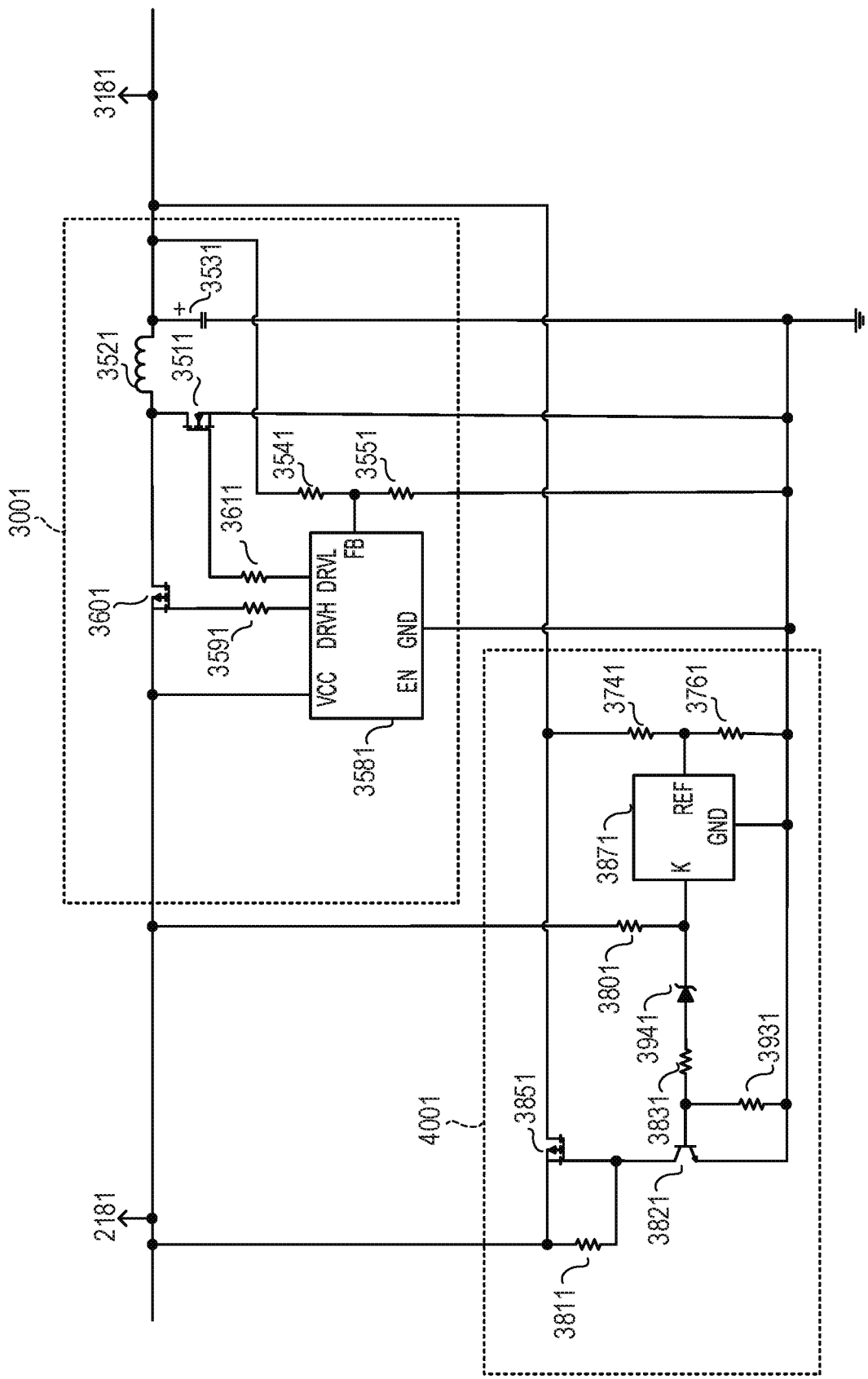
FIG. 19 is a circuit diagram illustrating configurations of a second power supply unit and a third power supply unit in Embodiment 6.

FIG. 19 is a circuit diagram illustrating an example of circuit configurations of a step-down DC/DC converter 3001 and a regulator 4001. The circuit configuration of the step-down DC/DC converter 3001 will be described first. The DC/DC converter 3001 includes a high-side FET 3601, a low-side FET 3511, a power supply IC 3581 (second control unit), an inductor 3521, a capacitor 3531, and resistors 3541, 3551, 3591 and 3611. In the high-side FET 3601 (first switching element), a source terminal is connected to an input terminal of the DC/DC converter 3001 into which the output voltage 2181 of the AC/DC converter 2001 is input, and a drain terminal is connected to one end of the inductor 3521 and a drain terminal of the low-side FET 3511. A gate terminal of the high-side FET 3601 is connected via the resistor 3591 to a DRVH terminal of the power supply IC 3581. In the low-side FET 3511 (second switching element), the drain terminal is connected to the one end of the inductor 3521 and the drain terminal of the high-side FET 3601, and a source terminal is connected to a ground (GND). A gate terminal of the low-side FET 3511 is connected via the resistor 3611 to a DRVL terminal of the power supply IC 3581. In the inductor 3521, the one end is connected to the drain terminal of the high-side FET 3601 and the drain terminal of the low-side FET 3511, and another end is connected to one end of the capacitor 3531 and an output terminal of the DC/DC converter 3001. In the capacitor 3531, the one end is connected to the inductor 3521 and the output terminal of the DC/DC converter 3001, and another end is connected to the ground.

In the DC/DC converter 3001, current flows into the capacitor 3531 via the inductor 3521 while the P channel high-side FET 3601 being a switching element is ON. In contrast, while the high-side FET 3601 is OFF, energy accumulated in the inductor 3521 is output via the N channel low-side FET 3511. Although an N channel FET is used here as the low-side FET 3511, the low-side FET 3511 may be, for example, a P channel FET or a rectifier diode. The power supply IC 3581 turns on the high-side FET 3601 and the low-side FET 3511 alternately by PWM control to control ON-duties of the high-side FET 3601 and the low-side FET 3511 such that a voltage of the output voltage 3181 is equal to the target voltage. A VCC terminal being a power supply terminal of the power supply IC 3581 receives the output voltage 2181 of the AC/DC converter 2001.

In the power supply IC 3581, the DRVH terminal is connected via the resistor 3591 to the gate terminal of the high-side FET 3601, and the DRVL terminal is connected via the resistor 3611 to the gate terminal of the low-side FET 3511. An FB terminal of the power supply IC 3581 receives a voltage made by dividing the output voltage 3181 with the resistor 3541 and the resistor 3551. The power supply IC 3581 compares the voltage input into the FB terminal with a reference voltage inside the power supply IC 3581 and outputs drive signals from the DRVH terminal and the DRVL terminal to the high-side FET 3601 and the low-side FET 3511, respectively, so that the output voltage 3181 is equal to the target voltage. In a case where the output voltage 3181 is lower than the target voltage, the power supply IC 3581 outputs the drive signal from the DRVH terminal so that the ON-duty of the high-side FET 3601 increases. In contrast, in a case where the output voltage 3181 is higher than the target voltage, the power supply IC 3581 outputs the drive signal from the DRVL terminal so that the ON-duty of the low-side FET 3511 increases. The low-side FET 3511 can be replaced with a diode.

Let the output voltage 3181 controlled by the DC/DC converter 3001 be denoted by $V_{5V\_DC}$/DC, the reference voltage inside the power supply IC 3581 be denoted by $V_{FB(DC/DC)}$, and resistance values of the resistor 3541 and the resistor 3551 be denoted by $R_{3541}$ and $R_{3551}$, respectively. Then, the voltage $V_{5V\_DC/DC}$ is expressed by the following Formula (3).

$$V_{5V\_DC/DC} = V_{FB(DC/DC)} \cdot \frac{R_{354} + R_{355}}{R_{355}} \quad \text{Formula (3)}$$

In the present embodiment, assume that the voltage $V_{5V\_DC/DC}$ of the output voltage 3181 controlled by the DC/DC converter 3001 is set as $V_{5V\_DC/DC}$=5.21 V, as an example of a specific numerical value. The voltage of the output voltage 3181 controlled by the DC/DC converter 3001, 5.21 V, is a voltage close to 5.2 V and is higher than 5.2 V (predetermined DC voltage), which is a voltage of the output voltage 3181 controlled by the regulator 4001 described below.

[Configuration of Regulator 4001]

Next, a circuit configuration of the regulator 4001 will be described. The regulator 4001 in the present embodiment is a series regulator, including a shunt regulator 3871, a transistor 3821, an FET 3851 (switching element), a Zener diode 3941, and resistors 3741, 3761, 3801, 3811, 3831 and 3931. In the regulator 4001, a voltage applied to between a drain terminal and a source terminal of the P channel FET 3851 is controlled using a voltage between a gate terminal and the source terminal of the FET 3851, and the output voltage 3181 is thereby maintained at a constant voltage. The output voltage 3181 is divided by the regulator resistor 3741 and the resistor 3761, and the divided voltage is input into a REF terminal of the shunt regulator 3871. Then, a voltage being a feedback signal according to a level of the voltage input into the REF terminal of the shunt regulator 3871 being a feedback unit is output from a K (cathode) terminal of the shunt regulator 3871. The voltage of the K terminal of the shunt regulator 3871 is pulled up by the output voltage 2181 via the resistor 3801 and is connected to a cathode terminal of the Zener diode 3941. An anode terminal of the Zener diode 3941 is connected to one end of the resistor 3831, and another end of the resistor 3831 is connected to the resistor 3931 and a base terminal of the transistor 3821. The base terminal of the transistor 3821 receives a voltage made by dividing the voltage output from the K terminal of the shunt regulator 3871 via the Zener diode 3941 with the resistor 3831 and the resistor 3931.

The resistor 3811 is connected to between the gate terminal and the source terminal of the FET 3851 and provided to stabilize a potential between the gate terminal and the source terminal. A collector terminal of the transistor 3821 is connected to the gate terminal of the FET 3851 and adjusts a voltage applied to the gate terminal of the FET 3851 according to the voltage output from the K terminal of the shunt regulator 3871. In the P channel FET 3851, the source terminal is connected to an input terminal that receives the output voltage 2181 of the AC/DC converter 2001, and the drain terminal is connected to an output terminal of the regulator 4001. The shunt regulator 3871 may be any element capable of controlling the output voltage 3181 to the target voltage, such as a comparator and an operational amplifier. The Zener diode 3941 is provided to step down the voltage output from the K terminal of the shunt regulator 3871 to turn on and off the transistor 3821 reliably. For that reason, if the voltage output from the K terminal of the shunt regulator 3871 ranges narrowly, the voltage of the K terminal (hereinafter, referred to also as K terminal voltage) can be input into the base terminal of the transistor 3821 without being stepped down, and thus the Zener diode 3941 can be eliminated. In a case where a dark current of the transistor 3821 is low, there is no risk that the dark current turns on the FET 3851. This dispenses with dividing the voltage input into the base terminal of the transistor 3821 with the resistors 3931 and 3831, and thus the resistor 3931 can be eliminated.

[Constant Voltage Control by Regulator 4001]

Next, constant voltage control by the regulator 4001 will be described. In the regulator 4001, in the case where the output voltage 3181 is higher than the target voltage, the voltage input into the REF terminal of the shunt regulator 3871 increases, and thus the K terminal voltage decreases. As a result, current input into the base terminal of the transistor 3821 decreases, and thus collector current flowing into the collector terminal of the transistor 3821 also decreases. Therefore, the voltage between the gate terminal and the source terminal of the FET 3851 decreases, and thus an on-resistance between the drain terminal and the source terminal of the FET 3851 increases, which causes the output voltage 3181 to decrease. In a case where the output voltage 3181 is controlled by the DC/DC converter 3001 to a voltage higher than the target voltage of the regulator 4001, the FET 3851 is in a turn-off state (OFF) (the on-resistance is maximized), and thus the regulator 4001 stops its operation. In contrast, in the case where the output voltage 3181 is lower than the target voltage, the voltage input into the REF terminal of the shunt regulator 3871 decreases, and thus the K terminal voltage increases. As a result, the base current input into the base terminal of the transistor 3821 increases, and thus the collector current flowing into the collector terminal of the transistor 3821 also increases. Therefore, the voltage between the gate terminal and the source terminal of the FET 3851 increases, and thus the on-resistance between the drain terminal and the source terminal of the FET 3851 decreases, which causes the output voltage 3181 to increase.

Let the output voltage 3181 controlled by the regulator 4001 be denoted by $V_{5V\_REG}$, the reference voltage of the shunt regulator 3871 be denoted by a reference voltage $V_{REF(REG)}$, and resistance values of the resistor 3741 and the resistor 3761 be denoted by $R_{3741}$ and $R_{3761}$, respectively. Then, the voltage $V_{5V\_REG}$ is expressed by the following Formula (4).

$$V_{5V\_REG} = V_{REF(REG)} \cdot \frac{R_{374} + R_{376}}{R_{376}} \quad \text{Formula (4)}$$

In the present embodiment, let $V_{5V\_REG}$=5.2 V, as an example of a specific numerical value.

[Operation of Regulator 4001]

Next, operation of the regulator 4001 will be described. First, in the case where the input voltage is high, that is, in a case where the output voltage 2181 of the AC/DC converter 2001 being the input voltage is higher than the target voltage of the output voltage 3181, the step-down DC/DC converter 3001 can control the output voltage 3181 to the target voltage. The regulator 4001 therefore performs control to turn off the FET 3851, as mentioned above. Specifically, when the DC/DC converter 3001 controls the output voltage to the target voltage ($V_{5V\_DC/DC}$=5.21 V), the regulator 4001 compares the output voltage 3181 output by the DC/DC converter 3001 with the target voltage of the output voltage of the regulator 4001. The regulator 4001 then determines that the voltage of the output voltage 3181 output by the DC/DC converter 3001 is higher than the target voltage of the output voltage of the regulator 4001 ($V_{5V\_REG}$=5.2 V) and performs control to turn off the operation of the FET 3851, as mentioned above.

In contrast, in the case where the input voltage is low, that is, in a case where the output voltage 2181 of the AC/DC converter 2001 is the voltage $V_5V$=5.2 V, the following occurs. Being a step-down DC/DC converter, the DC/DC converter 3001 is no longer able to perform control to maintain the output voltage 3181 to the target voltage $V_{5V\_DC/DC}$=5.21 V, and as a result, the output voltage 3181 decreases to be lower than the target voltage. When the output voltage 3181 becomes not more than the target voltage of the output voltage of the regulator 4001, $V_{5V\_REG}$=5.2 V (not more than the predetermined DC voltage), the regulator 4001 starts up. The voltage output from the K terminal of the shunt regulator 3871 is output to the base terminal of the transistor 3821. The transistor 3821 is thereby turned on, the FET 3851 is turned on, and the FET 3851 performs the constant voltage control such that the output voltage 3181 is equal to the target voltage ($V_{5V\_REG}$=5.2 V).

Next, a reason for making the target voltage of the output voltage 3181 of the regulator 4001 ($V_{5V\_REG}$=5.2 V) lower than the target voltage of the output voltage 3181 of the DC/DC converter 3001 $V_{5V\_DC/DC}$=5.21 V will be described. In a case where the regulator 4001 performs control to turn on the FET 3851, there is a little or little voltage difference between the output voltage 2181 being the input voltage to the regulator 4001 and the output voltage 3181, and a loss by the FET 3851 needs to be reduced. While the DC/DC converter 3001 controls the output voltage 3181 to the target voltage, the input voltage to the regulator 4001 is also high, and thus if the regulator 4001 turns on the FET 3851 in this state, the loss by the FET 3851 increases. For that reason, in the case where the DC/DC converter 3001 can control the output voltage 3181 to the target voltage, that is, in a case where the input voltage to the regulator 4001 is high, the FET 3851 should not be turned on, and thus there is no need for starting up the regulator 4001. Hence, the regulator 4001 is configured to turn off the FET 3851 by setting the target voltage of the output voltage 3181 of the regulator 4001 to be lower than the target voltage of the output voltage of the DC/DC converter 3001.

Next, Effect of providing the regulator 4001 will be described. When the DC/DC converter 3001 brings the high-side FET 3601 into a conductive state (turn-on state) with the voltage of the output voltage 2181 decreased, a voltage drop occurs due to an on-resistance of the FET and a resistive component of the coil (inductor 3521), resulting in a further decrease in the output voltage 3181. As a result, there is a risk of failing to maintain the output voltage 3181 to the target voltage. Hence, in a case where the input voltage to the DC/DC converter 3001 decreases, the regulator 4001 sets the FET 3851 to the turn-on state as mentioned above to perform the constant voltage control on the output voltage 3181, thereby enabling the voltage accuracy of the output voltage 3181 to be improved. For example, assume that the load current of the output voltage 3181 is 10 A, the on-resistance of the high-side FET 3601 of the DC/DC converter 3001 is 7 m$\Omega$, and a direct current resistance of the coil (inductor 3521) is 6.3 ma Assuming that the output voltage 2181 is 5.2 V, the output voltage $V_{5V\_DC/DC}$ of the DC/DC converter is 5.07 V ($\approx$5.2 V−(7 m$\Omega$+6.3 m$\Omega$)×10 A). At the same time, assuming that the on-resistance of the FET 3851 of the regulator 4001 is 3.3 m$\Omega$, the output voltage $V_{5V\_REG}$ of the regulator 4001 is 5.17 V ($\approx$5.2 V−3.3 m$\Omega$×10 A). Therefore, by performing the constant voltage control by the regulator 4001 with the high-side FET 3601 of the DC/DC converter 3001 not being turned on, a voltage drop due to resistive components of the high-side FET 3601 and the inductor 3521 of the DC/DC converter can be eliminated. As a result, the output voltage accuracy can be improved.

[Description of Control Operation]

Figure 20:
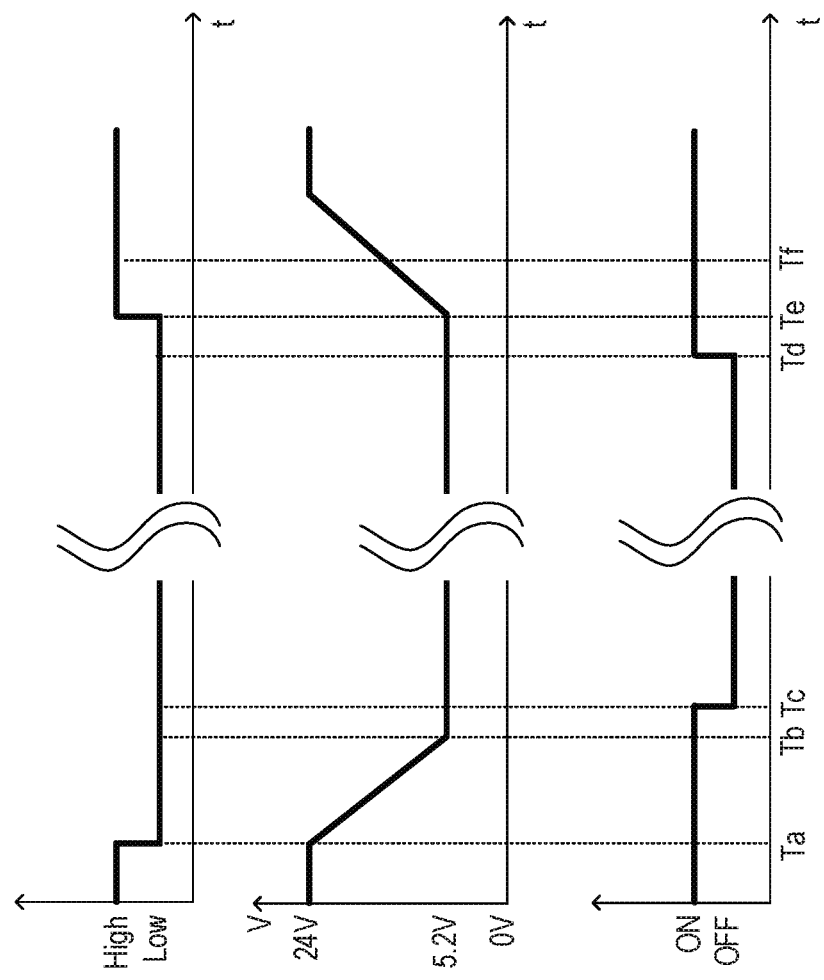
FIG. 20A, FIG. 20B and FIG. 20C are timing charts used for describing operation of the power supply in Embodiment 6.

FIG. 20A to FIG. 20C are timing charts illustrating operation of the power supply 1081 in a case where the printer 100 transitions from the stand-by state to the sleeping state and a case where the printer 100 transitions from the sleeping state to the stand-by state. FIG. 20A illustrates output levels of the AC/DC converter output voltage switching signal 2011, where High indicates an output at a high level, and Low indicates an output at a low level. FIG. 20B is a voltage waveform illustrating a voltage of the output voltage 2181 of the AC/DC converter 2001, where 24 V and 5.2 V are voltage values of the output voltage 2181. FIG. 20C illustrates output levels (ON, OFF) of the load SW control signal 6011. In FIG. 20A to FIG. 20C, horizontal axes each indicate elapsed time t. Ta, Tb, Tc, Td, Te and Tf each indicate a timing (time).

First, operation of the power supply 1081 in a case where the printer 100 transitions from the stand-by state to the sleeping state will be described. The timing Ta indicates a timing at which a time period T1 being a predetermined time period elapses without a transition to the print state since the printer 100 transitions to the stand-by state. As mentioned above, when the predetermined time period elapses since the printer 100 transitions to the stand-by state, the control unit 5001 causes the printer 100 to transition to the sleeping state to reduce a consumption power of the printer 100. Therefore, at the timing Ta, the control unit 5001 switches the AC/DC converter output voltage switching signal 2011 from the high level (High) to the low level (Low). Then, when the AC/DC converter output voltage switching signal 2011 is at the low level, the AC/DC converter 2001 controls the output voltage 2181 such that the output voltage is equal to 5.2 V. As a result, the output voltage 2181 transitions from 24 V to 5.2 V after a lapse of the response time of the AC/DC converter 2001 (at the Timing Tb). At the timing Tb, the output voltage 2181 decreases to 5.2 V, and the voltage of the output voltage 3181 starts decreasing due to resistive components of the high-side FET 3601 and the inductor 3521 of the DC/DC converter 3001. Therefore, as mentioned above, the regulator 4001 turns on the FET 3851 to perform the constant voltage control of the output voltage 3181.

At the timing Tc, the control unit 5001 switches the load SW control signal 6011 from the turn-on state (ON) to the turn-off state (OFF) to set the load SW 6001 to the turn-off state, cutting off a supply of power to loads that operate in the print state and the stand-by state. This further reduces the consumption power in the sleeping state. The loads that operate in the print state and the stand-by state include a sheet conveyance sensor (not illustrated) for sensing a position of a recording material conveyed in printing. The timing Tc is set to a timing at which, after the output voltage 2181 is switched from 24 V to 5.2 V by the AC/DC converter output voltage switching signal 2011 at the timing Ta, the output voltage 2181 is estimated to finish transitioning to the target voltage 5.2 V.

Next, operation of the power supply 1081 in a case where the printer 100 transitions from the sleeping state to the stand-by state will be described. Upon receiving printing instructions from an external device such as a personal computer (not illustrated), the control unit 5001 causes the printer 100 to transition from the sleeping state to the stand-by state for printing operation. At the timing Td, the control unit 5001 switches the load SW control signal 6011 from the turn-off state (OFF) to the turn-on state (ON) to set the load SW 6001 to the turn-on state, supplying the output voltage 5181 being the output voltage 3181 to the loads. Subsequently, at the timing Te, the control unit 5001 switches the AC/DC converter output voltage switching signal 2011 from the low level (Low) to the high level (High). As mentioned above, when the AC/DC converter output voltage switching signal 2011 is at the high level (High), the AC/DC converter 2001 performs control such that the output voltage 2181 becomes equal to 24 V from 5.2 V. At the timing Tf, the output voltage 2181 increases from 5.2 V, and the output voltage 3181 from the DC/DC converter 3001 does not drop from the target voltage (5.21 V). Therefore, the regulator 4001 performs control to turn off the FET 3851.

As described above, in the low consumption power mode in which the input voltage to the DC/DC converter 3001 is decreased to reduce the switching loss, the regulator 4001 performs control to maintain the output voltage 3181 of the DC/DC converter 3001 to the constant voltage according to the output voltage 3181. As a result, the voltage accuracy of the output voltage 3181 with respect to the target voltage can be improved.

As described above, according to the present embodiment, the voltage accuracy of the output voltage can be improved in the low consumption power mode.

Embodiment 7

Embodiment 6 is described about the power supply 1081 in which the DC/DC converter 3001 and the regulator 4001 are made to operate all the time. Embodiment 7 is described about a power supply 1081 in which startup of a DC/DC converter and a regulator is controlled by the control unit 5001. In the power supply 1081, the same circuits as those in Embodiment 6 will be denoted by the same reference numerals and thus will not be described here.

[Description of Power Supply]

Figure 21:
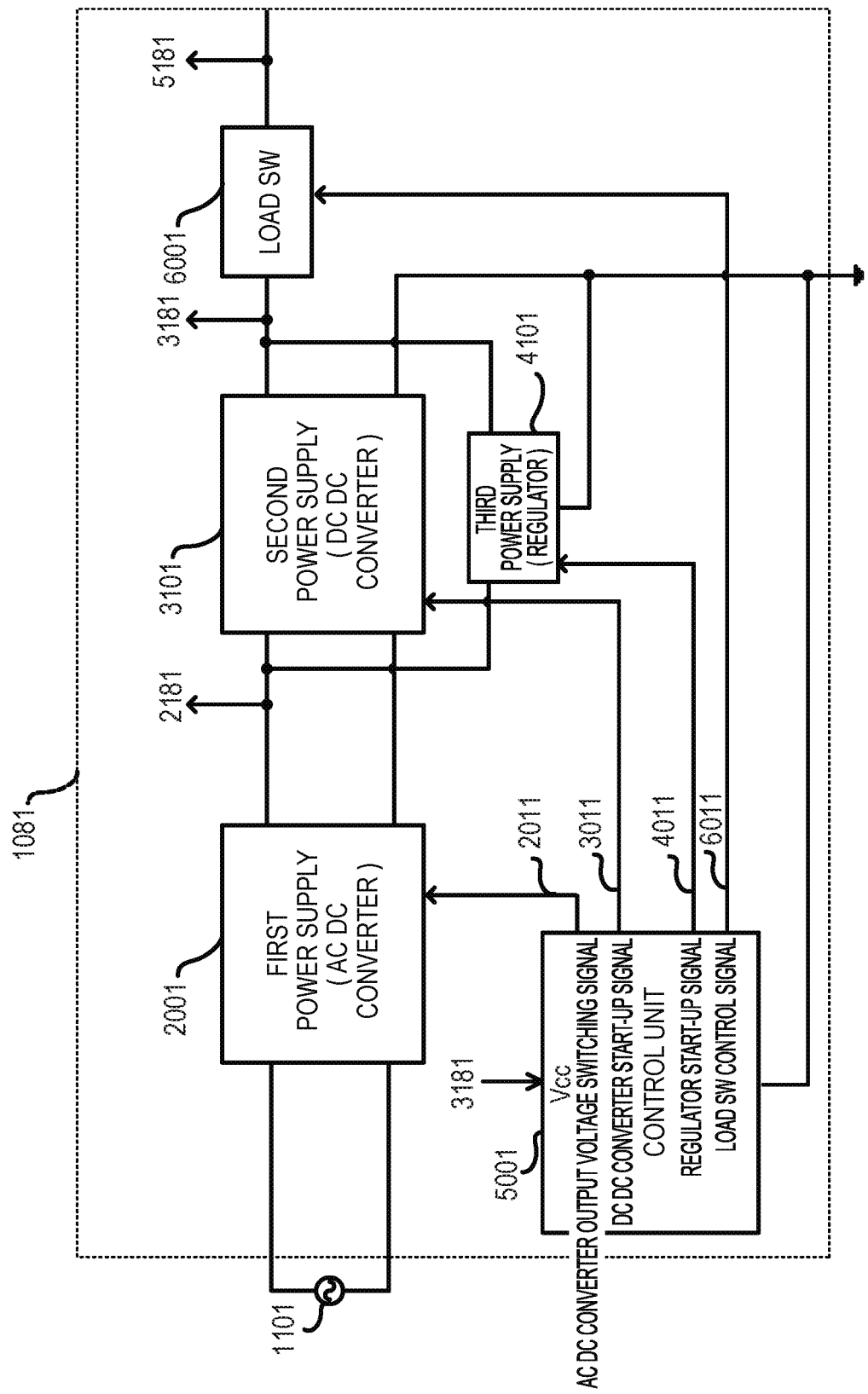
FIG. 21 is a block diagram illustrating a configuration of a power supply in Embodiment 7.

FIG. 21 is a block diagram illustrating an example of the configuration of the power supply 1081 of the present example. The power supply 1081 includes an AC/DC converter 2001 that is a first power supply unit, a DC/DC converter 310 that is a second power supply unit, a regulator 4101 that is a third power supply unit, a control unit 5001, and a load switch (load SW) 6001. Comparing with the power supply 1081 of Example 6, the power supply 1081 of the present example is different in that a DC/DC converter start-up signal 3011 (a first control signal) and a regulator start-up signal 4011 (a second control signal) that are output from the control unit 5001 are added. Further, as describe later, the configurations of the DC/DC converter 310 and the regulator 4101 are different from the configurations of the DC/DC converter 3001 and the regulator 4001 of Example 6. On the other hand, the configurations of the AC/DC converter 2001 and the load SW 6001 are the same as the configurations of Example 6, and a description is omitted here.

The DC/DC converter start-up signal 3011 is a signal that is input to the DC/DC converter 3001 from the control unit 5001, and that is for the control unit 5001 to control the operation and stoppage of the DC/DC converter 3001. Additionally, the regulator start-up signal 4011 is a signal that is input to the regulator 4101 from the control unit 5001, and that is for the control unit 5001 to forcibly turn OFF the FET 3851 irrespectively of the constant voltage control of the regulator 4101.

[Description of DC/DC converter 310]

Figure 22:
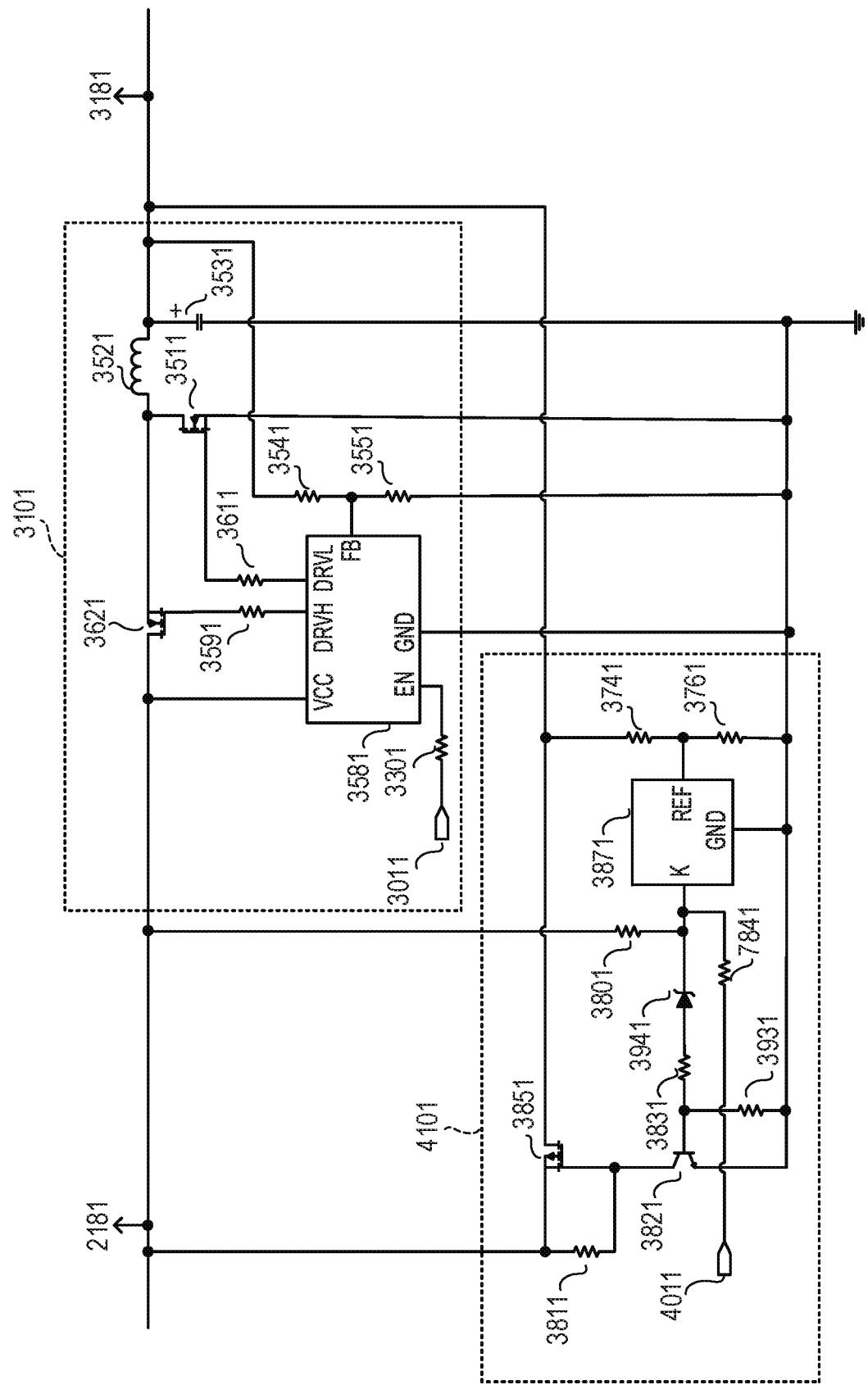
FIG. 22 is a circuit diagram illustrating configurations of a second power supply unit and a third power supply unit in Embodiment 7.

FIG. 22 is a circuit diagram illustrating an example of the circuit configuration of the step-down DC/DC converter 310 and the regulator 4101 of the present example. Note that the same numerals are assigned to the same circuits as those in FIG. 19 of Example 6, and a description is omitted. First, the circuit configuration of the step-down DC/DC converter 310 is described. The DC/DC converter 310 includes a high-side FET 3621, a low-side FET 3511, a power supply IC 3581, an inductor 3521, a capacitor 3531, and resistors 3541, 3551, 3591 and 3611. Comparing with the DC/DC converter 3001 of Example 6, the DC/DC converter 310 is different in that the high-side FET is an N channel FET, and that an EN terminal to which the DC/DC converter start-up signal 3011 is input is added to the power supply IC 3581.

While the DC/DC converter 310 is turning ON the N channel high-side FET 3621 that is a switching element, a current flows to the capacitor 3531 via the inductor 3521. On the other hand, while turning OFF the high-side FET 3601, the energy stored in the inductor 3521 is output via the N channel low-side FET 3511. Note that although the high-side FET 3621 uses the N channel FET in the present example, a P channel FET may be used. Additionally, although the low-side FET 3511 uses the N channel FET, the low-side FET 3511 may be, for example, one of a P channel FET and a rectifier diode.

The power supply IC 3581 performs the switching operations of the high-side FET 3621 and the low-side FET 3511 by the PWM control, and controls the on-duties of the high-side FET 3601 and the low-side FET 3511 such that the voltage of the output voltage 3181 is a target voltage. The output voltage 2181 of the AC/DC converter 2001 is input to the VCC terminal that is a power supply terminal of the power supply IC 3581. The DRVH terminal of the power supply IC 3581 is connected to the gate terminal of the high-side FET 3621 via the resistor 3591, and the DRVL terminal is connected to the gate terminal of the low-side FET 3511 via the resistor 3611. Additionally, the voltage obtained by dividing the output voltage 3181 by the resistor 3541 and the resistor 3551 is input to the FB terminal of the power supply IC 3581. The power supply IC 3581 compares the voltage input to the FB terminal and the reference voltage inside the power supply IC 3581, and outputs drive signals to the high-side FET 3621 and the low-side FET 3511 from the DRVH terminal and the DRVL terminal, respectively, such that the output voltage 3181 is the target voltage. In a case where the output voltage 3181 is lower than the target voltage, the power supply IC 3581 outputs the drive signal from the DRVH terminal such that the on-duty of the high-side FET 3621 becomes high. On the other hand, in a case where the output voltage 3181 is higher than the target voltage, the power supply IC 3581 outputs the drive signal from the DRVL terminal such that the on-duty of the low-side FET 3511 becomes high. The EN terminal of the power supply IC 3581 is a terminal to which the DC/DC converter start-up signal 3011 controlling the start-up and stoppage of the power supply IC 3581 is input from the control unit 5001 via the resistor 3301. In a case where the High level DC/DC converter start-up signal 3011 is input to the EN terminal, the power supply IC 3581 is started up, and in a case where the Low DC/DC converter start-up signal 3011 is input to the EN terminal, the power supply IC 3581 stops the operation.

Next, the voltage accuracy of the output voltage 3181 of the DC/DC converter 310 depending on the difference in the input voltage is described. In a case where the input voltage of the DC/DC converter 310 is high (the output voltage 2181 is 24 V), i.e., in a case where the printer 100 is in the stand-by state and the print state, the voltage difference between the input voltage 2181 and the output voltage 3181 is large. Therefore, the on-duty (the period of the turn-on state) of the DC/DC converter 310 is short, and the period of the turn-off (OFF) state of the high-side FET 3621 at the time of switching of the DC/DC converter 310 is long. Accordingly, the charging period for a capacitor in a bootstrap circuit (not shown) provided inside the power supply IC 3581 is sufficient. As a result, the voltage of the capacitor is raised to a voltage required to drive the high-side FET 3621, and the high-side FET 3621 can be driven. In other words, since the high-side FET 3621 can be driven in a case where the input voltage is high, the DC/DC converter 310 can control the output voltage 3181 to the target voltage.

On the other hand, in a case where the input voltage 2181 of the DC/DC converter 310 is low (the output voltage 2181 is 5.2 V), i.e., in a case where the printer 100 is in the sleeping state, the voltage difference between the input voltage 2181 and the output voltage 3181 is small. Therefore, since the on-duty of the DC/DC converter 310 becomes large (becomes long), the period of the turn-off (OFF) state of the high-side FET 3621 at the time of switching of the DC/DC converter 310 is short. Therefore, the charging period for the capacitor in the bootstrap circuit (not shown) inside the power supply IC 3581 becomes insufficient, the voltage cannot be raised to the voltage required to drive the high-side FET 3621, and the high-side FET 3621 cannot be driven sufficiently. In other words, since the high-side FET 3621 cannot be driven sufficiently in a case where the input voltage 2181 is low, the output voltage 3181 cannot be controlled to be the target voltage, and the output voltage 3181 will decrease. Additionally, in order to drive the on-duty of the high-side FET 3621 at 100%, since there is no period of the turn-off state of the high-side FET 3621, the charging to the capacitor in the bootstrap circuit (not shown) inside the power supply IC 3581 cannot be performed. Therefore, another power supply circuit will be newly required, and an expensive power supply IC will be required. Additionally, since an inexpensive power supply IC does not include another power supply circuit, a limit will be set to the maximum on-duty of the high-side FET 3621. In the present example, it is assumed that the maximum on-duty of the power supply IC 3581 is limited to 80%.

In a case of using a power supply IC whose maximum on-duty is limited, and in a case where the input voltage 2181 of the DC/DC converter 310 decreases, and the on-duty of the power supply IC 3581 reaches the maximum on-duty, the high-side FET cannot be turned ON at 100% as mentioned above. As a result, the output voltage 3181 decreases, and the requested output voltage accuracy cannot be satisfied. Therefore, in the power supply 1081 of the present example, the regulator 4101 connected in parallel with the DC/DC converter 310 is provided. Accordingly, before the DC/DC converter 310 reaches the maximum on-duty and the output voltage 3181 decreases, the regulator 4101 can be operated to prevent the output voltage 3181 from decreasing.

[Operation of regulator 4101]

Next, the operation of the regulator 4101 is described. The regulator 4101 of the present example is a series regulator, and includes the shunt regulator 3871, the transistor 3821, the FET 3851, the Zener diode 3941, and the resistors 3741, 3761, 3801, 3811, 3831, 3931 and 7841. Comparing with the regulator 4001 of Example 6, the regulator 4101 is different in that the regulator start-up signal 4011 is input. As described above, the regulator start-up signal 4011 is a signal that forcibly sets the FET 3851 to the turn-off state, irrespective of the constant voltage control of the regulator 4101. In FIG. 22, in a case where the low level regulator start-up signal 4011 is input from the control unit 5001, the low level signal is input to the base terminal of the transistor 3821 via the resistor 7841, the Zener diode 3941, and the resistor 3831, and the transistor 3821 is turned off. As a result, since the voltage is no longer applied between the gate terminal and the source terminal of the FET 3851, the FET 3851 is set to the turn-off state, and the FET 3851 of the regulator 4101 can be forcibly set to the turn-off state. On the other hand, in a case where the high-level regulator start-up signal 4011 is input from the control unit 5001, it is in the same state as the state where the voltage is output from the K (cathode) terminal of the shunt regulator 3871. Therefore, the transistor 3821 is turned on by inputting the high-level signal to the base terminal of the transistor 3821 via the resistor 7841, the Zener diode 3941, and the resistor 3831. As a result, since the voltage is applied between the gate terminal and the source terminal of the FET 3851, the FET 3851 is set to the turn-on state. In this manner, the constant voltage control of the output voltage 3181 is performed by turning on the transistor 3821, and setting the FET 3851 to the turn-on state.

In this manner, the start-up of the regulator 4101 is performed by the regulator start-up signal 4011. Then, in a case where the regulator 4101 is started up by the regulator start-up signal 4011, the DC/DC converter 310 stops the operation by the DC/DC converter start-up signal 3011 from the control unit 5001. Therefore, in the present example, while the DC/DC converter 3001 described in Example 6 is operating, the FET 3851 of the regulator 4101 does not perform the constant voltage control of the output voltage 3181. Then, while the regulator 4101 is started up, the target voltage of the output voltage of the regulator 4101 can be set higher than the target voltage of the output voltage of the DC/DC converter 3001 (equal to or less than the maximum voltage Vmax (=5.25 V)), and the output voltage accuracy can be improved.

[Description of Control Operation]

Figure 23:
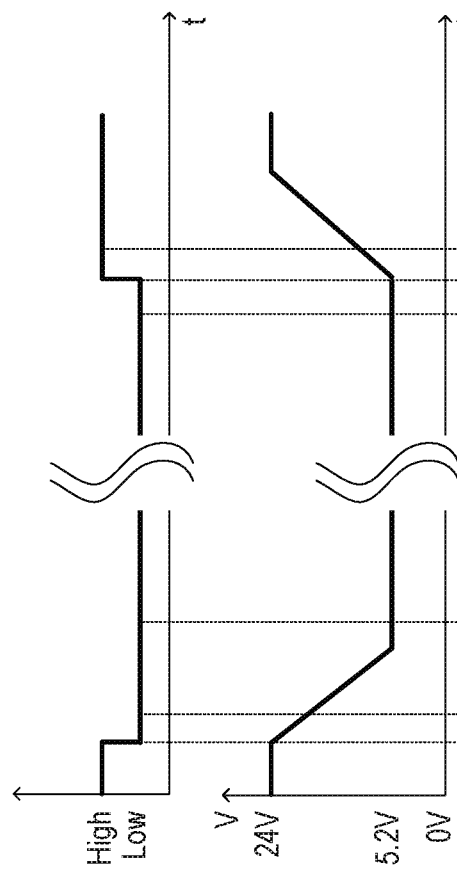
FIG. 23A, FIG. 23B, FIG. 23C, FIG. 23D and FIG. 23E are timing charts used for describing operation of the power supply in Embodiment 7.

FIG. 23A to FIG. 23E are timing charts illustrating the operations of the power supply 1081 in a case where the printer 100 transitions from the stand-by state to the sleeping state, and in a case where the printer 100 transitions from the sleeping state to the stand-by state. FIG. 23A illustrates the output level of the AC/DC converter output voltage switching signal 2011, High indicates the high-level output, and Low indicates the low level output. FIG. 23B is a voltage waveform illustrating the voltage of the output voltage 2181. 24 V and 5.2 V are voltage values of the output voltage 2181. FIG. 23C is a signal waveform illustrating the output level (ON, OFF) of the regulator start-up signal 4011. FIG. 23D is a signal waveform illustrating the output level (ON, OFF) of the DC/DC converter start-up signal 3011. FIG. 23E is a signal waveform illustrating the output level (ON, OFF) of the load SW control signal 6011. Additionally, the horizontal axes of FIG. 23A to FIG. 23E represent the elapsed time t. Ta, Tb, Tc, Td, Te and Tf indicate the timing (time).

First, the operation of the power supply 1081 in a case where the printer 100 transitions from the stand-by state to the sleeping state is described. The timing Ta indicates the timing at which a time T1, which is a predetermined time, has elapsed since the printer 100 transitions to the stand-by state, without transitioning to the print state. As described above, in a case where the predetermined time has elapsed since the printer 100 transitions to the stand-by state, the control unit 5001 makes the printer 100 transition to the sleeping state, to reduce the consumption power of the printer 100. Therefore, the control unit 5001 switches the AC/DC converter output voltage switching signal 2011 from the high level to the low level at the timing Ta. Then, in a case where the AC/DC converter output voltage switching signal 2011 is at the low level, the AC/DC converter 2001 controls the output voltage such that the output voltage 2181 is 5.2 V. As a result, the output voltage 2181 transitions from 24 V to 5.2 V in a case where a response time for the AC/DC converter 2001 has elapsed (the timing Tb).

The timing Tb indicates the timing at which a time T2 has elapsed since the timing Ta. The time T2 is a time for a timing in the middle of the transitions of the output voltage 2181 of the AC/DC converter 2001 from 24 V to 5.2 V. The output voltage 2181 (the predetermined direct current voltage) at the timing Tb is a voltage higher than 5.2 V. At the timing Tb, the regulator start-up signal 4011 is switched from OFF to ON by the control unit 5001, the regulator 4101 is started up, and the regulator 4101 controls the output voltage 3181 to be a constant voltage. Additionally, the control unit 5001 switches the DC/DC converter start-up signal 3011 from ON to OFF to stop the operation of the DC/DC converter 310, to reduce the consumption power in the sleeping state. After the regulator 4101 is started up, even if the operation of the DC/DC converter 310 is stopped, the output voltage 3181 is controlled to be the constant voltage by the regulator 4101. Therefore, the operation of the DC/DC converter 310 can be stopped, and simultaneously, the consumption power in the sleeping state can be reduced.

At the timing Tc, in order to cut off the electric power supply to the load that operates in the print state and the stand-by state, the control unit 5001 switches the load SW control signal 6011 from ON to OFF, and sets the load SW 6001 to the turn-off state. In the sleeping state of the printer 100, the consumption power is reduced by cutting off the electric power supply to the load that is unnecessary for the operation in the sleeping state.

Next, the operation of the power supply 1081 in a case where the printer 100 transitions from the sleeping state to the stand-by state is described. In a case where the print instruction is received from, for example, an external equipment (not shown) such as a personal computer, the control unit 5001 makes the printer 100 transition from the sleeping state to the stand-by state, to perform a print operation. At the timing Td, the control unit 5001 switches the load SW control signal 6011 from the turn-off (OFF) state to the turn-on (ON) state, and sets the load SW 6001 to the turn-on state, to supply the output voltage 5181 to the load. Subsequently, at the timing Te, the control unit 5001 switches the AC/DC converter output voltage switching signal 2011 from the low level to the high level. As described above, the AC/DC converter 2001 is controlled such that the output voltage 2181 is 24 V, in a case where the AC/DC converter output voltage switching signal 2011 is at the high level. As a result, the output voltage 2181 transitions from 5.2 V to 24 V according to the response time for the AC/DC converter 2001. At the timing Tf, in a case where the output voltage 2181 increases from 5.2 V, the control unit 5001 switches the DC/DC converter start-up signal 3011 from OFF to ON to start the DC/DC converter 310. Then, the control unit 5001 switches the regulator start-up signal 4011 from ON to OFF to forcibly set the FET 3851 of the regulator 4101 to the turn-off state, and stops the constant voltage control of the output voltage 3181.

As described above, in the low consumption power mode that decreases the input voltage to the DC/DC converter 3001, and reduces the switching loss, the regulator 4101 is started up by the regulator start-up signal 4011, and is operated to perform the constant voltage control. Then, simultaneously, the operation of the DC/DC converter is stopped by the DC/DC converter start-up signal 3011. Accordingly, the voltage accuracy of the output voltage can be improved, and the consumption power can be reduced. Additionally, in the present example, since the regulator 4101 can set the target voltage setting of the output voltage 3181 to be high, the output voltage accuracy can be further improved than in Example 6.

As described above, according to the present example, the voltage accuracy of the output voltage can be improved in the low consumption power mode.

Example 8

In Example 7, the power supply 1081 in which the start-up of the DC/DC converter and the regulator is controlled by the control unit 5001 has been described. In Example 8, the power supply 1081 including the same DC/DC converter as that in Example 7, and a regulator having a different configuration from that in Example 7 is described. Note that, in the power supply 1081, a description is omitted here by assigning the same numerals to the same circuits as those in Example 7.

Figure 24:
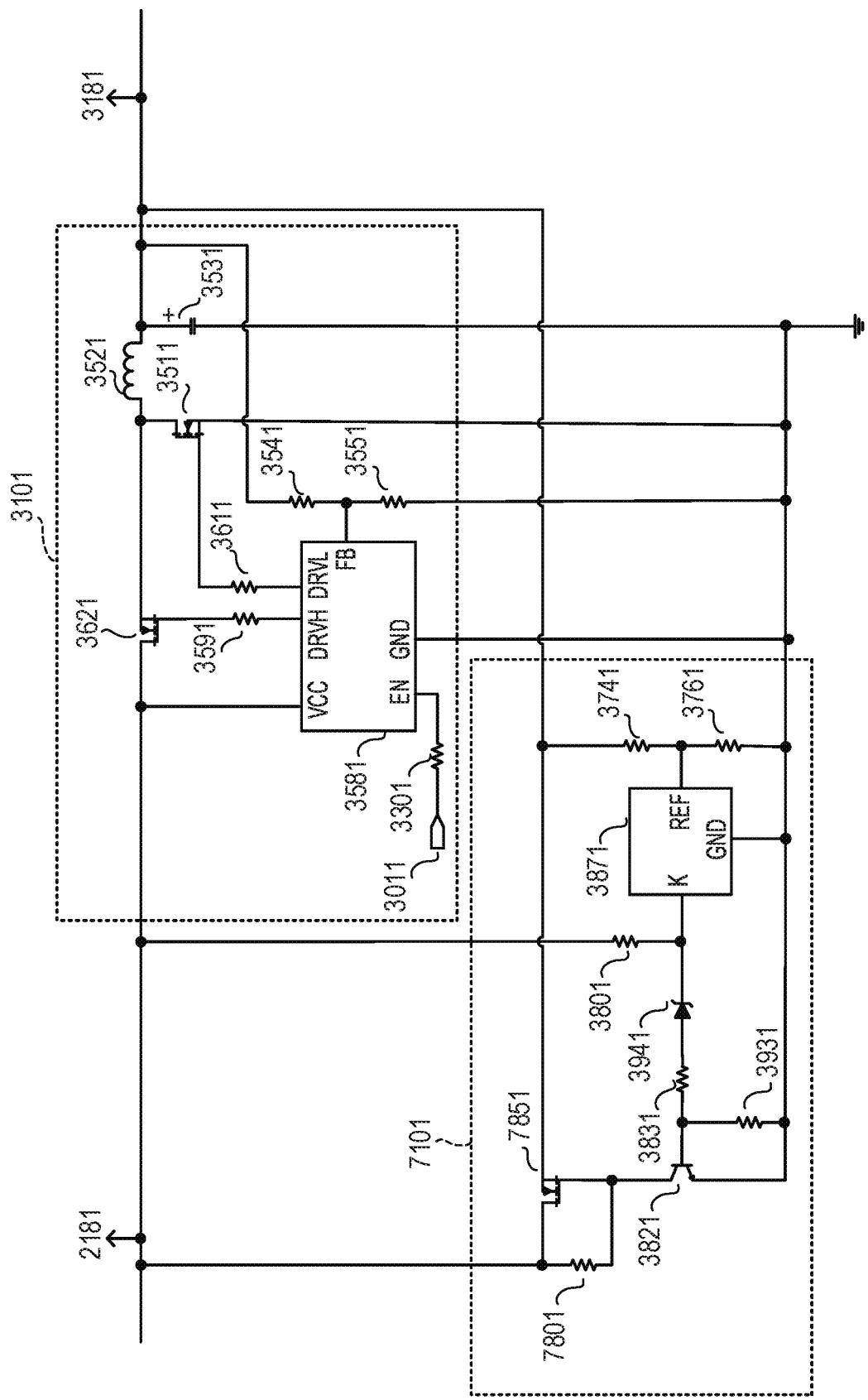
FIG. 24 is a circuit diagram illustrating configurations of a second power supply unit and a third power supply unit in Embodiment 8.

FIG. 24 is a circuit diagram illustrating an example of the circuit configuration of the step-down DC/DC converter 310 and the regulator 7101 of the present example. Note that the DC/DC converter 310 is the same as the DC/DC converter 310 illustrated in FIG. 22 of Example 7, and a description is omitted here.

[Operation of Regulator 7101]

The operation of the regulator 7101 is described. The regulator 7101 of the present example is a series regulator, and includes the shunt regulator 3871, the transistor 3821, an FET 7851, the Zener diode 3941, and the resistors 3741, 3761, 3801, 3831, 3931 and 7801. Note that, comparing with the regulator 4101 of Example 7, the regulator 7101 of the present example is different in that the N channel FET 7851 is used instead of the P channel FET 3851, and the resistor 7801 is used instead of the resistor 3811. Additionally, comparing with the regulator 4101 of Example 7, in the regulator 7101 of the present example, the regulator start-up signal 4011 is eliminated. By controlling the voltage between the gate terminal and the source terminal of the FET 7851 by the transistor 3821, the regulator 7101 controls the voltage applied between the drain terminal and the source terminal of the FET 7851 to perform the constant voltage control of the output voltage 3181. The resistor 7801 is connected to the gate terminal and the source terminal of the FET 7851, and is provided to stabilize the potential between the gate terminal and the source terminal of the FET 7851. The FET 7851 of the present example uses an N channel FET. Therefore, it is necessary to drive the FET 7851 by making the voltage difference between the input voltage 2181 and the output voltage 3181 larger than the threshold voltage of the gate terminal of the FET 7851. Therefore, in the present example, the input voltage 2181 at the time of the sleeping state of the printer 100 is increased to a voltage at which the FET 7851 can be driven. Specifically, by setting the output voltage 2181 at the time of the sleeping state of the AC/DC converter 2001 to voltage $V_{5V}$=6.5 V, the voltage difference between the input voltage 2181 and the output voltage 3181 becomes larger than the threshold voltage of the gate terminal of the FET 7851, and the driving of the FET 7851 is enabled. Accordingly, since the regulator 7101 performs the constant voltage control of the output voltage 3181, even if the output voltage 2181 decreases, and the output voltage 3181 by the DC/DC converter 310 decreases, the voltage accuracy of the output voltage 3181 can be improved.

As described above, in the low consumption power mode that decreases the input voltage to the DC/DC converter 3001, and reduces the switching loss, the voltage accuracy of the output voltage can be improved by performing the constant voltage control of the regulator 7101. Additionally, even if the N channel FET is used as in the FET 7851 of the regulator 7101, the voltage accuracy of the output voltage 3181 can be improved.

As described above, according to the present example, the voltage accuracy of the output voltage can be improved in the low consumption power mode.

Example 9

[Description of Power Supply]

Figure 25:
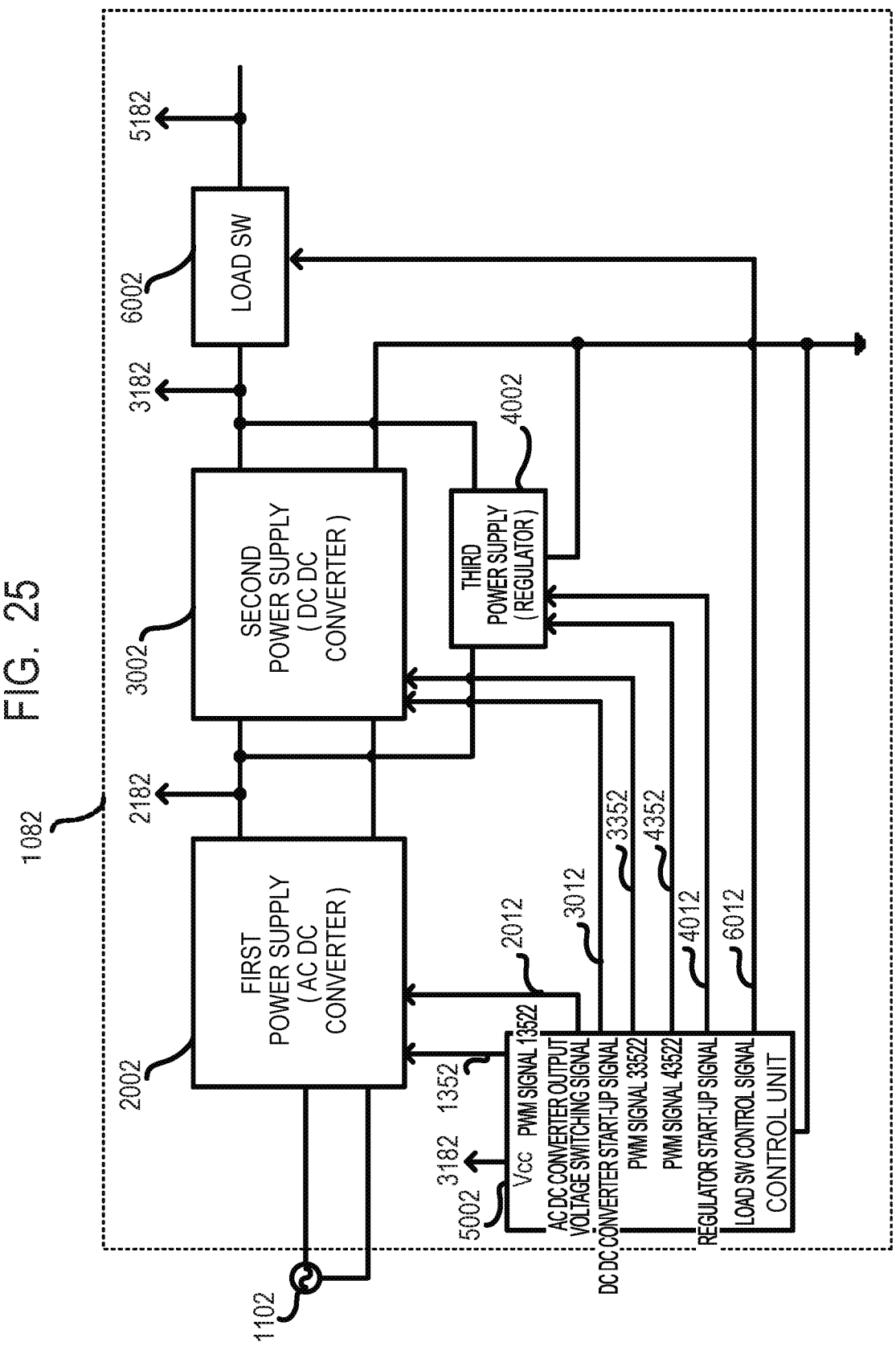
FIG. 25 is a schematic diagram of a power supply in Embodiments 9 to 11.

FIG. 25 illustrates an example of the schematic configuration of a power supply 1082. The AC voltage input from the AC power supply 1102 is input to a first power supply 2002 (hereinafter referred to as the AC/DC converter 2002), and is converted and lowered to a DC output voltage 2182 (hereinafter referred to as the output voltage 2182), which is a first direct current voltage, by the AC/DC converter 2002. The output voltage 2182 is input to a second power supply 3002 (hereinafter referred to as the DC/DC converter 3002), and is lowered to a DC output voltage 3182 (hereinafter referred to as the output voltage 3182), which is a second direct current voltage, by the DC/DC converter 3002. A third power supply 4002 (hereinafter referred to as the regulator 4002) is connected between the input and output of the DC/DC converter 3002. The output voltage 3182 is input to a load switch (hereinafter written as the load SW) 6002. The output of the output voltage 5182 to the load is controlled by bringing a switching element of the load SW 6002 into one of the turn-on state (connection state) and the turn-off state (cut off) (non-connection state).

A control unit 5002, which is the first control unit, is electrically connected to the AC/DC converter 2002, the DC/DC converter 3002, and the load SW 6002, and performs controls by outputting a signal to each of them. Each signal is described below. A PWM signal 13522 is input to the AC/DC converter 2002, and is a signal for adjusting the output voltage 2182. A PWM signal 33522 is input to the DC/DC converter 3002, and is a signal for adjusting the target voltage value of the output voltage 3182. A PWM signal 43522 is input to the regulator 4002, and is a signal for adjusting the target voltage value of the output voltage 3182. An AC/DC converter output voltage switching signal 2012 is input to the AC/DC converter 2002, and is a signal for switching the target voltage of the output voltage 2182. A DC/DC converter start-up signal 3012 is input to the DC/DC converter 3002, and is a signal for controlling the operation and stoppage of the DC/DC converter 3002. A load SW control signal 6012 is input to the load SW 6002, and is a signal for controlling the output of the output voltage 5182. A regulator start-up signal 4012 is input to the regulator 4002, and is a signal for controlling the operation and stoppage of the regulator 4002. The output voltage 3182 is supplied to the control unit 5002 as a power supply.

[Description of AC/DC Converter 2002]

Figure 26:
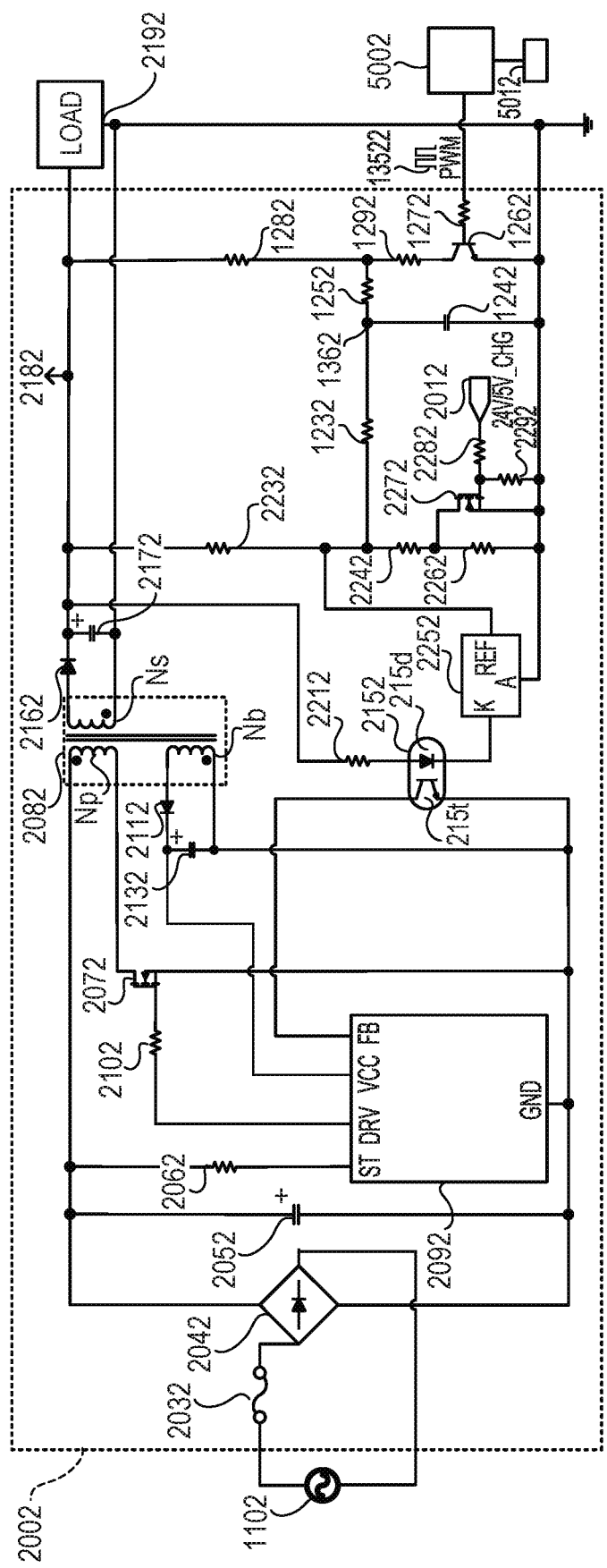
FIG. 26 is a circuit configuration diagram of a first power supply in Embodiment 9.

FIG. 26 illustrates an example of the circuit configuration of the AC/DC converter 2002. The circuit configuration of the AC/DC converter 2002 is described. The AC voltage input from the AC power supply 1102 is subjected to full wave rectification via a current fuse 2032 and a rectifying diode bridge 2042 for circuit protection, and is smoothened by a primary smoothing capacitor 2052 (hereinafter referred to as the smoothing capacitor 2052) into a direct current voltage. Further, in a case where the direct current voltage charged by the smoothing capacitor 2052 is supplied to a ST terminal of the power supply IC 2092, and reaches the start-up voltage of the power supply IC 2092 via a start-up resistor 2062, the power supply IC 2092 is started up. The power supply IC 2092 is a control unit of a field-effect transistor (hereinafter written as the FET) 2072, which is a switching element. In a case where the power supply IC 2092 is started up, the power supply IC 2092 outputs a pulse signal for driving the FET 2072 from a DRV terminal to the gate terminal of the FET 2072 via the resistor 2102. In a period where the pulse signal is at a high level, in a case where the FET 2072 is in a conductive state, the direct current voltage of the smoothing capacitor 2052 is applied to across a primary winding Np of a transformer 2082. At this time, although a voltage is also induced at a secondary winding Ns side of the transformer 2082, since it is the voltage whose negative side is on the anode side of the diode 2162, the diode 2162 is not in the conductive state, and energy is not transmitted to the secondary side of the transformer 2082. Similarly, a voltage is also induced at an auxiliary winding Nb side of the transformer 2082, since it is the voltage whose negative side is on the anode side of the diode 2112, the diode 2112 is not in the conductive state, and energy is not transmitted to the auxiliary winding Nb, either. Accordingly, the current flowing through the primary winding Np of the transformer 2082 is only an exciting current of the transformer 2082, and the energy proportional to the square of the exciting current is accumulated in the transformer 2082. Note that the exciting current increases in proportion to time.

Next, in a case where the pulse signal at a low level is output from the DRV terminal of the power supply IC 2092, in the period of the low level of the pulse signal, the FET 2072 is brought from the conductive state to the non-conductive state. In a case where the FET 2072 is brought into the non-conductive state, a voltage having the polarity opposite to that at the time when the FET 2072 is in the conductive state is induced in each winding of the transformer 2082. As a result, the voltage whose positive side is on the anode side of the diode 2162 is induced in the secondary winding Ns of the transformer 2082, and the diode 2162 is in the conductive state. Then, the energy accumulated in the transformer 2082 is rectified and smoothened by the diode 2162 and the smoothing capacitor 2172 that constitute a rectifying smoothing circuit, and the output voltage 2182 is output as the direct current voltage. Additionally, the voltage whose positive side is on the anode side of the diode 2112 is induced in the auxiliary winding Nb, and the diode 2112 is in the conductive state. Then, the capacitor 2132 is charged via the diode 2112, and the direct current voltage charged to the capacitor 2132 is supplied to a VCC terminal of the power supply IC 2092.

The voltage control of the output voltage 2182 is described in a case where the PWM signal 13522 and the AC/DC converter output voltage switching signal 2012 (illustrated as "24V/5V_CHG" in FIG. 26) are off (low level). In the AC/DC converter 2002, the voltage control of the output voltage 2182 is performed as follows. First, the output voltage 2182 generated in the secondary side of the transformer 2082 is divided by a regulator resistor 2232 connected in series, the combined resistance of the resistor 1232, the resistor 1252 and the resistor 12822, and the resistor 2242 and the resistor 2262. The divided voltage is input to a REF terminal of a shunt regulator 2252. Then, a feedback signal according to the voltage level input to the REF terminal of the shunt regulator 2252 is output from a K terminal of the shunt regulator 2252. The K terminal of the shunt regulator 2252 is connected to a photodiode 2152$d$ of a photocoupler 2152. Additionally, a phototransistor 2152$t$ of the photocoupler 2152 is connected to an FB terminal of the power supply IC 2092. The feedback signal output from the K terminal of the shunt regulator 2252 is input to the FB terminal of the power supply IC 2092 via the photocoupler 2152. A resistor 2212 is a resistor for limiting the current that flows into the photodiode 2152$d$ (LED) of the photocoupler 2152. Then, the power supply IC 2092 can perform stable control of the output voltage 2182 by outputting the pulse signal from the DRV terminal based on the feedback signal input from the FB terminal, and performing switching control of the FET 2072. A GND terminal of the power supply IC 2092 is connected to the low voltage side of the smoothing capacitor 2052. Note that the numerals in the power supply IC 2092 in FIG. 1 are the names of respective terminals.

There are two kinds of output voltage 2182, i.e., a voltage required for the stand-by state and the print state, and a voltage required for the sleeping state, and the output voltage 2182 can be switched in each of the states. The reason for switching the output voltage 2182 in the sleeping state is that it is not necessary to drive a driving unit such as a motor and an image forming unit in the sleeping state, and only a voltage required at the time of sleeping may be output. Therefore, the target voltage of the output voltage 2182 is set to a value close to the target voltage of the output voltage 3182 as much as possible, and the efficiency of the power supply 1082 is improved. Additionally, the output voltage 2182 is electrically connected to the driving unit such as a motor, the photosensitive drum 101 that is the image forming unit, the charge unit 102, the developing unit 103, and the transfer unit 105, via a load SW (not shown). In other words, these members are a load 2192. The load SW (not shown) is brought into the turn-on state in the stand-by state and the print state to perform electric power supply to the driving unit such as a motor and the image forming unit, and is brought into the turn-off state in the sleeping state to reduce the consumption power.

[Switching Control of Output Voltage 2182]

(In a Case where the On-Duty of the PWM Signal 13522 is 0%)

(Stand-by State and Print State)

The switching control of the output voltage 2182 is described by taking a case where the PWM signal 13522 is not output, that is, a case where the on-duty of the PWM signal 13522 is 0% in FIG. 26 as an example. Note that the on-duty of the PWM signal 13522 is a ratio of the ON time to one cycle of the PWM signal 13522, and hereinafter, it is also merely called the duty. The specific voltage value of the output voltage 2182 is, for example, about 24 V in the stand-by state and the print state, and about 5 V in the sleeping state.

First, in the stand-by state and the print state of the printer 100, the power supply 1082 supplies the output voltage 2182 to the driving unit such as a motor, and the load 2192 such as the image forming unit. At this time, the control unit 5002 outputs the high-level AC/DC converter output voltage switching signal 2012, and the voltage divided by the resistor 2282 and the resistor 2292 is supplied to the gate terminal of the FET 2272. Accordingly, since the FET 2272 is turned on, and the drain terminal and the source terminal of the FET 2272 are conducted to each other, it will be in a state where the resistor 2262 is negligible. The PWM signal 13522 is input to the base terminal of the transistor 1262 via the resistor 1272, and in a case where the duty of the PWM signal 13522 is 0%, it will be in the non-conductive state. At this time, the voltage obtained by dividing the output voltage 2182 by the combined resistance including the resistor 2232, the resistor 1232, the resistor 1252 and the resistor 12822, and the resistor 2242 is fed back to the REF terminal of the shunt regulator 2252, and the output voltage 2182 is controlled.

It is assumed that the resistance values of the resistor 2232, the resistor 2242, the resistor 2262, the resistor 1232, the resistor 1252, the resistor 12822, and the resistor 1292 are $R_{2232}$, $R_{2242}$, $R_{2262}$, $R_{1232}$, $R_{1252}$, $R_{12822}$, and $R_{1292}$, respectively. It is assumed that the combined resistance value of the resistor 2232, the resistor 1232, the resistor 1252, and the resistor 12822 is $R_{2232OFF}$, and the reference voltage of the shunt regulator 2252 is $V_{REF}$. The above-described combined resistance value $R_{2232OFF}$ is expressed by the following formula (1).

$$R_{225OFF} = \frac{R_{223} \cdot (R_{123} + R_{125} + R_{138})}{R_{323} + R_{123} + R_{125} + R_{128}} \qquad \text{formula (1)}$$

For simplification of calculation, assuming that the on-resistance of the FET 2272 is so small that it is negligible, the output voltage 2182 ($V_{24V\_OFF}$) at the time of 24 V output is controlled to be a value derived from the next formula (2).

$$V_{24V\_OFF} = V_{REF} \cdot \frac{R_{223OFF} + R_{234}}{R_{224}} \qquad \text{formula (2)}$$

It is assumed that $V_{24V}$=24 V as a setting example of the specific numerical value.

(Sleeping State)

Next, in the sleeping state of the printer 100, the power supply 1082 is in a state where the output voltage 2182 is decreased compared with that in the stand-by state and the print state, and the output voltage value is about 5 V. At this time, the control unit 5002 outputs the AC/DC converter output voltage switching signal 2012 at a low level, and the voltage divided by the resistor 2282 and the resistor 2292 is supplied to the gate terminal of the FET 2272. Accordingly, the FET 2272 is turned off, and it will be in a state where both ends of the resistor 2262 are opened. For simplification of calculation, assuming that the current flowing at the time of the turn-off of the FET 2272 is 0 Å, the output voltage 2182 ($V_{5V\_OFF}$) at the time of 5 V output is controlled to be a value derived from the next formula (3).

$$V_{5V\_OFF} = V_{REF} \cdot \frac{R_{222OFF} + R_{224} + R_{226}}{R_{224} + R_{226}} \qquad \text{formula (3)}$$

It is assumed that $V_{5V}$=5.15 V as a setting example of the specific numerical value.

[Description of DC/DC Converter 3002]

Figure 27:
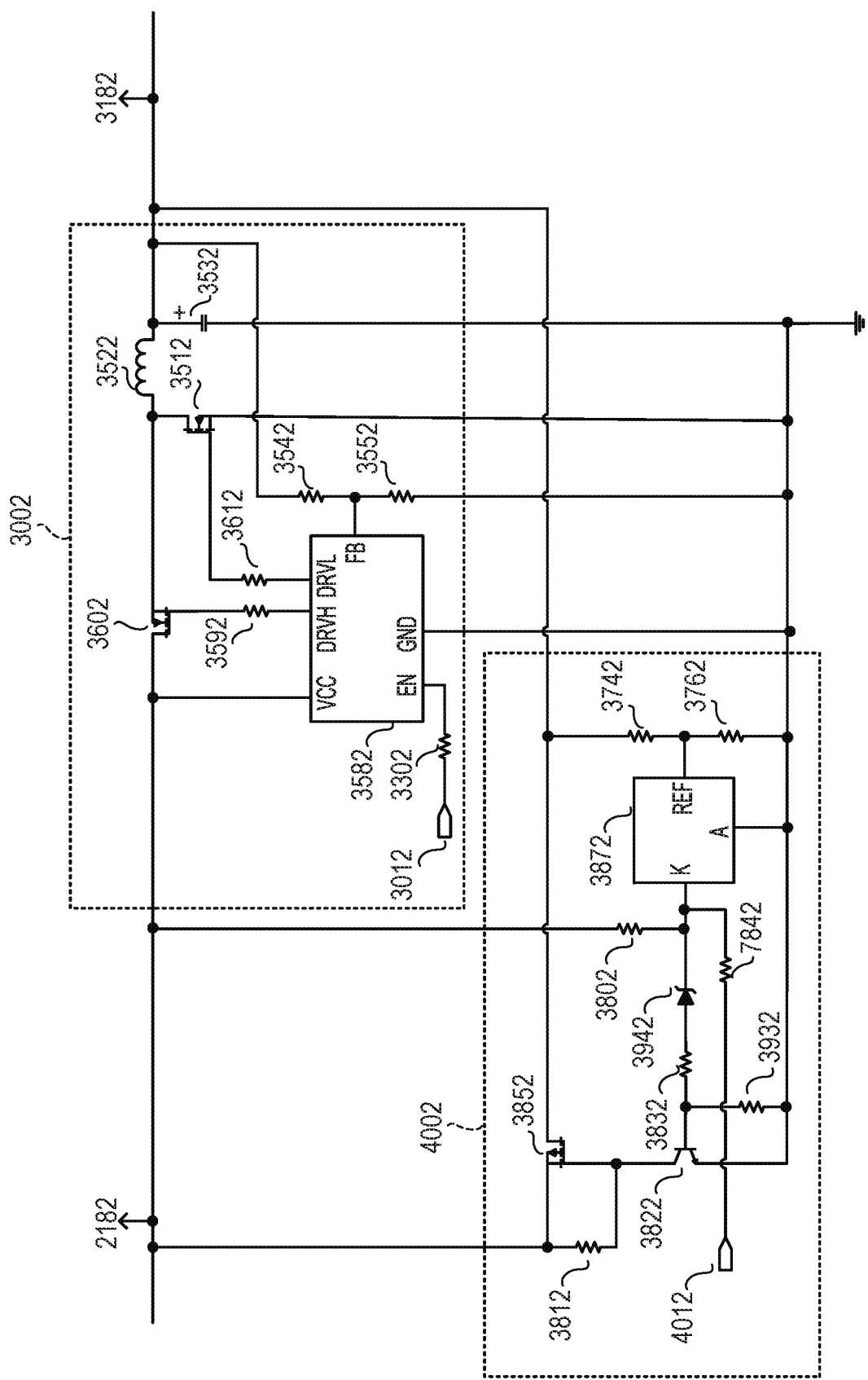
FIG. 27 is a circuit configuration diagram of a second power supply and a third power supply in Embodiment 9.

FIG. 27 illustrates an example of the internal circuit of the step-down DC/DC converter 3002 and the regulator 4002. The circuit configuration of the step-down DC/DC converter 3002 (hereinafter referred to as the DC/DC converter 3002) is described. While the DC/DC converter 3002 turns on an N channel high-side FET 36022 (hereinafter referred to as the high-side FET 36022), which is a switching element, the current flows through a capacitor 3532 via an inductor 3522. On the other hand, while the high-side FET 36022 is turned off, the energy stored in the inductor 3522 is output via an N channel low-side FET 3512 (hereinafter referred to as the low-side FET 3512). Note that the high-side FET 36022 may be a P channel FET, and the low-side FET 3512 may be one of a P channel FET and a rectifier diode.

[Description of DC/DC Converter 3002]

The power supply IC 3582, which is the second control unit, alternately turns on the high-side FET 36022 and low-side FET 3512 by the PWM control. Accordingly, the power supply IC 3582 is controlling the on-duties of the high-side FET 36022 and the low-side FET 3512 such that the target voltage is achieved, while feeding back the output voltage 3182. A VCC terminal is a power supply terminal of the power supply IC 3582, and the output voltage 2182 is input to the VCC terminal. The DRVH terminal is connected to the gate terminal of the high-side FET 36022 via a resistor 3592. The DRVL terminal is connected to the gate terminal of the low-side FET 3512 via a resistor 3612. The voltage obtained by dividing the output voltage 3182 by a resistor 3542 and a resistor 3552 is input to the FB terminal. The power supply IC 3582 compares the voltage input to the FB terminal and the reference voltage inside the power supply IC 3582, and outputs the drive signal to the DRVH terminal and the DRVL terminal so that the output voltage 3182 is the target voltage. In a case where the output voltage 3182 is lower than the target voltage, the power supply IC 3582 outputs the drive signal to the DRVH terminal so that the on-duty of the high-side FET 36022 becomes high. In a case where the output voltage 3182 is higher than the target voltage, the power supply IC 3582 outputs the drive signal to the DRVL terminal so that the on-duty of the low-side FET 3512 becomes high. An EN terminal is a terminal that controls the start-up and stoppage of the power supply IC 3582. In a case where the DC/DC converter start-up signal 3012 at a high level is input to the EN terminal, the power supply IC 3582 is started up, and in a case where the DC/DC converter start-up signal 3012 at a low level is input to the EN terminal, the power supply IC 3582 is stopped. The DC/DC converter start-up signal 3012 is input to the EN terminal via a resistor 3302.

It is assumed that the output voltage 3182 controlled by the DC/DC converter 3002 is $V_{5V\_DC/DC}$, the reference voltage inside the power supply IC 3582 is $V_{FB(DC/DC)}$, the resistance values of the resistor 3542, and the resistor 3552 are $R_{3542}$ and $R_{3552}$, respectively. $V_{5V\_DC/DC}$, which is the output voltage 3182, is controlled to be the voltage expressed by the following formula (4).

$$V_{5V\_DC/DC} = V_{FB(DC/DC)} \cdot \frac{R_{354} + R_{355}}{R_{355}} \qquad \text{formula (4)}$$

It is assumed that $V_{5V\_DC/DC}$=5.21 V as an example of the specific numerical value.

(The Power Accuracy of the Output Voltage 3182 Depending on the Difference in the Input Voltage)

Next, the voltage accuracy of the output voltage 3182 of the DC/DC converter 3002 depending on the difference in the input voltage (the output voltage 2182 of the AC/DC converter 2002) is described. In a case where the input voltage is high (the stand-by state and the print state) (the output voltage 2182 ($V_{24V}$)), the voltage difference between the input voltage (24 V) and the output voltage (5.21 V) is large, and the on-duty of the DC/DC converter 3002 is low. In other words, the "off" period of the high-side FET 36022 at the time of switching of the DC/DC converter 3002 is long. Therefore, the charging period for a capacitor in a bootstrap circuit (not shown) inside the power supply IC 3582 is sufficient, the voltage can be raised to a voltage required to drive the high-side FET 36022, and the high-side FET 36022 can be driven. In other words, since the high-side FET 36022 can be driven in a case where the input voltage is high, the output voltage 3182 can be controlled to be the target voltage.

On the other hand, in a case where the input voltage is low (the sleeping state) (the output voltage 2182 ($V_{5V}$)), the difference between the input voltage (5.15 V) and the output voltage (5.21 V) is small, and the on-duty of the DC/DC converter 3002 is large. In other words, the "off" period of the high-side FET 36022 at the time of switching of the DC/DC converter 3002 is short. Therefore, the charging period for the capacitor in the bootstrap circuit (not shown) inside the power supply IC 3582 is insufficient, the voltage cannot be raised to a voltage required to drive the high-side FET 36022, and the high-side FET 36022 cannot be driven sufficiently. In other words, since the high-side FET 36022 cannot be driven sufficiently in a case where the input voltage is low, the output voltage 3182 cannot be controlled to be the target voltage, and the output voltage will drop. Additionally, driving the high-side FET 36022 with the on-duty of 100% means that there is no "off" period of the high-side FET 36022. Therefore, the capacitor in the bootstrap circuit (not shown) inside the power supply IC 3582 cannot be charged, a new power supply circuit will be separately required, and an expensive power supply IC will be required. Additionally, since an inexpensive power supply IC does not include another power supply circuit, the maximum on-duty of the high-side FET 36022 is often limited. In Example 9, the limitation of the maximum on-duty of the power supply IC 3582 is defined to be, for example, 80%, which is a predetermined on-duty.

In a case of using a power supply IC whose maximum on-duty is limited as described above, when the input voltage decrease and the limit value (for example, 80%) of the maximum on-duty is reached, as described above, the high-side FET cannot be turned on at 100%. Therefore, the output voltage 3182 will drop, and the requested voltage accuracy of the output voltage 3182 cannot be satisfied. Therefore, the regulator 4002 is provided separately from the DC/DC converter 3002. In this case, when the DC/DC converter 3002 reaches the maximum on-duty and the output voltage 3182 drops, the regulator 4002 is operated by outputting the regulator start-up signal 4012 at a high level via a resistor 7842. The drop in the output voltage 3182 is prevented by operating the regulator 4002.

[Description of Regulator 4002]

The circuit configuration of the regulator 4002 is described. The regulator 4002 is a series regulator, controls the voltage between the gate and source of the FET 3852, and controls the voltage applied between the drain and source of the FET 3852 to control the output voltage 3182 to be a constant voltage. The output voltage 3182 is divided by a regulator resistor 3742 and a resistor 3762, and is input to the REF terminal of a shunt regulator 3872. Then, a feedback signal according to the voltage level input to the REF terminal of the shunt regulator 3872 is output from the K terminal of the shunt regulator 3872. The voltage of the K terminal of the shunt regulator 3872 pulls up a resistor 3802 with the output voltage 2182, and after being divided by a resistor 3832 and a resistor 3932 via a Zener diode 3942, is electrically connected to the base terminal of a transistor 3822. A resistor 3812 is connected between the gate and source of the FET 3852, and is used for the potential stability between the gate and the source. The transistor 3822 adjusts the voltage of the gate terminal of the FET 3852 with the feedback signal output from the K terminal of the shunt regulator 3872. Note that the shunt regulators 3872 may be an element (a comparator, an operational amplifier, etc.) capable of controlling the output voltage 3182 to be the target voltage. The Zener diode 3942 lowers the voltage of the feedback signal, and is connected to positively turn on and turn off the transistor 3822. Since the transistor 3822 can be controlled without lowering the voltage of the K terminal in a case where the voltage range of the K terminal of the shunt regulator 3872 is wide, the Zener diode 3942 may be eliminated. Note that, since there is no possibility that the FET 3852 is turned on by a dark current in a case where the dark current of the transistor 3822 is small, it is not necessary to divide the voltage by the resistor 3932 and the resistor 3832, and the resistor 3932 may be eliminated. Note that the regulator start-up signal 4012 is connected to the K terminal of the shunt regulator 3872 via the resistor 7842.

(Constant Voltage Control)

The constant voltage control of the regulator 4002 is described. Since the voltage of the K terminal falls, and the base current of the transistor 3822 falls in a case where the output voltage 3182 is higher than the target voltage, a collector current also decreases. Therefore, since the voltage between the gate and source of the FET 3852 falls, and the on-resistance between the drain and source of the FET 3852 increases, the output voltage 3182 decreases. Note that, in a case where the output voltage 3182 is controlled by the DC/DC converter 3002 to be a voltage higher than the target voltage of the regulator 4002, the FET 3852 is brought into the turn-off state (the on-resistance is maximized), and the regulator 4002 is stopped. Since the voltage of the K terminal goes up, and the base current of the transistor 3822 increases in a case where the output voltage 3182 is lower than the target voltage, the collector current also increases. Therefore, since the voltage between the gate and source of the FET 3852 increases, and the on-resistance between the drain and source of the FET 3852 decreases, the output voltage 3182 increases.

It is assumed that the output voltage 3182 controlled by the regulator 4002 is $V_{5V\_REG}$. Assuming that the reference voltage of the shunt regulator 3872 is $V_{REF(REG)}$, and the resistance values of the resistor 3742 and the resistor 3762 are $R_{3742}$ and $R_{3762}$, respectively, $V_{5V\_REG}$ is controlled to be the voltage expressed by the following formula (5).

$$V_{5V\_REG} = V_{REF(REG)} \cdot \frac{R_{374} + R_{376}}{R_{376}} \quad \text{formula (5)}$$

It is assumed that $V_{5V\_REG}$=5.2 V as an example of the specific numerical value.

(Operation of Regulator)

The operation of the regulator 4002 is described. Since the DC/DC converter 3002 can control the output voltage 3182 to be the target voltage in a case where the input voltage is high (the output voltage 2182 ($V_{24V}$)), the regulator 4002 is controlled to turn off the FET 3852 as described above. Specifically, when the DC/DC converter 3002 is controlling the output voltage 3182 with, for example, $V_{5V\_DC/DC}$=5.21 V, the regulator 4002 feeds back the voltage of the output voltage 3182 output by the DC/DC converter 3002. Then, the regulator 4002 determines that it is higher than the target voltage $V_{5V\_REG}$ of the output voltage 3182 of the regulator 4002. Therefore, the regulator 4002 controls the FET 3852 to be turned off as described above. Next, in a case where the input voltage is low (the output voltage 2182 ($V_{5V}$)), the DC/DC converter 3002 cannot control the output voltage 3182 to be the target voltage $V_{5V\_DC/DC}$=5.21 V as described above, and the output voltage 3182 decreases. In a case where the output voltage 3182 becomes lower than the target voltage $V_{5V\_REG}$=5.2 V of the output voltage of the regulator 4002, the regulator 4002 is started up, and performs the constant voltage control of the output voltage 3182.

Next, the reason for making the target voltage $V_{5V\_REG}$ (5.2 V) of the output voltage 3182 of the regulator 4002 lower than the target voltage V 5 V_DC/DC (5.21 V) of the output voltage 3182 of the DC/DC converter 3002 is described. In a case where the regulator 4002 controls the FET 3852 to be turned on, it is necessary to perform the control in a state where the difference between the input voltage to the regulator 4002 and the output voltage is small or in a state where there is almost no difference, and to reduce the loss by the FET 3852. While the DC/DC converter 3002 is controlling the output voltage 3182 to be the target voltage, it is in a state where the input voltage to the regulator 4002 is high. In a case where the regulator 4002 turns on the FET 3852, the loss by the FET 3852 will become large. Therefore, in a case where the DC/DC converter 3002 can control the output voltage 3182 to be the target voltage, the target voltage of the output voltage 3182 of the regulator 4002 is set to be lower than the target voltage of the output voltage of the DC/DC converter 3002. Accordingly, the FET 3852 is turned off. Here, the case where the DC/DC converter 3002 can control the output voltage 3182 to be the target voltage is the case where the input voltage to the regulator 4002 is high.

In this manner, in a case where the input voltage is high (the stand-by state and the print state) (the output voltage 2182 ($V_{24V}$)), the output voltage 3182 is controlled to be the target voltage $V_{5V\_DC/DC}$ by the DC/DC converter 3002. In a case where the input voltage is high, the operation of the regulator 4002 is stopped. In a case where the input voltage is low (the sleeping state) (the output voltage 2182 ($V_{5V}$)), the regulator 4002 is operated, and the output voltage 3182 is controlled to be the target voltage $V_{5V\_REG}$ by the regulator 4002.

(Effects of Regulator)

Next, the effects of the regulator 4002 are described. In the DC/DC converter 3002, in a case where the input voltage decreases, as previously mentioned, the on-duty of the high-side FET 36022 becomes high, and reaches the maximum on-duty (for example, 80%) that can be output by the power supply IC 3582. In a state where the maximum on-duty that can be output by the power supply IC 3582 is reached, the output voltage 3182 cannot be maintained to be the target voltage in the switching state, and the output voltage 3182 will decrease lower than the target voltage. Specifically, it is assumed that there is no load of the output voltage 3182, and the target voltage of the output voltage 3182 of the DC/DC converter 3002 is $V_{5V\_DC/DC}$=5.21 V. Then, in a case where the input voltage to the DC/DC converter 3002 continues decreasing (the output voltage of the AC/DC converter 2002 2182$V_{5V}$=near 5.2 V), the high-side FET 36022 cannot be driven at 100%. Therefore, the output voltage 3182 (equal to or less than $V_{5V\_DC/DC}$=5.21 V) of the DC/DC converter 3002 will decrease. Therefore, since the output voltage 3182 also decreases when the input voltage to the DC/DC converter 3002 continues decreasing as is, the above-described standard of the voltage accuracy cannot be satisfied. Specifically, $V_{5V\_DC/DC}$<Vmin.

Therefore, in a case where the input voltage to the DC/DC converter 3002 continues decreasing, the regulator 4002 performs the constant voltage control of the output voltage 3182 by the FET 3852 as described above. Specifically, it is assumed that there is no load of the output voltage 3182, and the target voltage of the output voltage 3182 of the DC/DC converter 3002 is $V_{5V\_DC/DC}$=5.21 V. Then, in a case where the input voltage (the output voltage of the AC/DC converter 2002 $V_{5V}$=near 5.2 V) to the DC/DC converter 3002 continues decreasing, the high-side FET 36022 cannot be driven at 100%. Therefore, the output voltage 3182 (equal to or less than $V_{5V\_DC/DC}$=5.21 V) of the DC/DC converter 3002 decreases. However, since the regulator 4002 feeds back the output voltage 3182, and performs the constant voltage control of the output voltage 3182 by the FET 3852, the voltage accuracy of the output voltage ($V_{5V\_REG}$=5.2 V) of the regulator 4002 can be satisfied. Accordingly, even in a case where the input voltage to the DC/DC converter 3002 continues decreasing, the above-described standard of the voltage accuracy can be satisfied. Specifically, Vmin<$V_{5V\_REG}$<Vmax.

[Adjustment Range of Output Voltage 2182 by PWM Signal 13522]

(When the On-Duty of the PWM Signal 13522 is 0%)

Using the circuit diagram of the AC/DC converter 2002 of FIG. 26, the adjustment range of the output voltage 2182 when the on-duty of the PWM signal 13522 changes from 0% to 100% is described. As described above, when the duty of the PWM signal 13522 output from the control unit 5002 is 0%, the output voltage 2182 ($V_{24V\_OFF}$) at the time of 24 V output (the stand-by state or the print state) is expressed by the formula (2). Additionally, the output voltage 2182 ($V_{5V\_OFF}$) at the time of 5 V output (the sleeping state) is expressed by the formula (3). "_OFF" indicates that the on-duty of the PWM signal 13522 is 0%. The output voltage 2182 at this time becomes the lowest voltage among the voltages that can be taken by the output voltage 2182.

(When the On-Duty of the PWM Signal 13522 is 100%)

Next, when the on-duty of the PWM signal 13522 is 100%, the transistor 1262 is turned on. Here, it is assumed that the combined resistance value of the resistor 2242, the resistor 1232, the resistor 1252, and the resistor 1292 is $R_{2242ON}$. The combined resistance value of the resistor 2242, the resistor 2262, the resistor 1232, the resistor 1252, and the resistor 1292 is $R_{2262ON}$. For simplification of calculation, assuming that the saturation voltage $V_{CE(sat)}$ between the collector and emitter of the transistor 1262 and the on-resistance of the FET 2272 are so small that they are negligible, they are expressed by the following formula (6) and formula (7), respectively.

$$R_{3240N} = \frac{R_{224} \cdot (R_{123} + R_{125} + R_{129})}{R_{234} + R_{123} + R_{125} + R_{129}} \quad \text{formula (6)}$$

$$R_{2260N} = \frac{(R_{224} + R_{226}) \cdot (R_{123} + R_{125} + R_{129})}{R_{234} + R_{320} + R_{323} + R_{325} + R_{329}} \quad \text{formula (7)}$$

The output voltage 2182 ($V_{24V\_ON}$) at the time of 24 V output at this time (the stand-by state or the print state), and the output voltage 2182 ($V_{5V\_ON}$) at the time of 5 V output (the sleeping state) are controlled to be the values derived from the next formula (8) and formula (9).

$$V_{24V\_ON} = V_{REF} \cdot \frac{R_{2240N} + R_{223}}{R_{2240N}} \quad \text{formula (8)}$$

$$V_{5V\_ON} = V_{REF} \cdot \frac{R_{2260N} + R_{223}}{R_{2260N}} \quad \text{formula (9)}$$

"_ON" indicates that the on-duty of the PWM signal 13522 is 100%. The output voltage 2182 at this time becomes the highest voltage among the voltages that can be taken by the output voltage 2182.

(When the On-Duty of the PWM Signal 13522 is Other than 0% and 100%)

Next, the operation in a case where the duty of the PWM signal 13522 is other than 0% and 100% is described. The PWM signal 13522 drives the transistor 1262 with the current limited by the resistor 1272. The voltage according to the duty of the PWM signal 13522 is charged to the capacitor 1242 by the time constants of the resistor 1252 and a capacitor 1242. Let the voltage across the capacitor 1242 be a voltage 2362. Here, the time constants of the resistor 1252 and the capacitor 1242 are set to be large with respect to the frequency of the PWM signal 13522. In other words, in order to decrease the ripple voltage of the output voltage 2182, the voltage 2362 is DC converted. The DC converted voltage 2362 is supplied to the REF terminal of the shunt regulator 2252 as the reference voltage $V_{REF}$ via the resistor 1232 for current adjustment. The output voltage 2182 is adjusted by adjusting the amount of current supply to the REF terminal of the shunt regulator 2252 supplied as the reference voltage $V_{REF}$. In other words, the output voltage 2182 is adjusted according to the duty of the PWM signal 13522.

As described above, when the PWM signal 13522 is changed from 0% to 100%, the available range for the output voltage 2182 ($V_{24V}$) at the time of 24 V output is expressed by the next formula (10) from the formula (2) and the formula (8). Additionally, the available range for the output voltage 2182 ($V_{5V}$) at the time of 5 V output is expressed by the next formula (11) from the formula (3) and the formula (9).

$$V_{REF} \cdot \frac{R_{223OFF} + R_{224}}{R_{224}} = \quad \text{formula (10)}$$

$$V_{24V\_OFF} \le V_{24V} \le V_{24V\_ON} = V_{REF} \cdot \frac{R_{2240N} + R_{223}}{R_{2240N}}$$

$$V_{REF} \cdot \frac{R_{223OFF} + R_{224} + R_{226}}{R_{224} + R_{226}} = \quad \text{formula (11)}$$

$$V_{5V\_OFF} \le V_{5V} \le V_{5V\_ON} = V_{REF} \cdot \frac{R_{2260N} + R_{223}}{R_{2260N}}$$

[Calculating Method of Duty of PWM Signal 13522]

The method of calculating the duty of the PWM signal 13522 from the targeted output voltage 2182 is described. For facilitation of description, assuming that the saturation voltage $V_{CE(sat)}$ between the collector and emitter of the transistor 1262 is so small that it is negligible, the duty of the PWM signal 13522 and the output voltage 2182 are in a substantially proportionality. It is assumed that the duties of the PWM signal 13522 at the time of 24 V output and 5 V output are $D_{24V}$ and $D_{5V}$, respectively. $D_{24V}$ and $D_{5V}$ can be expressed by the next formula (12) and formula (13) by using the voltage values $V_{24V\_T}$ and $V_{5V\_T}$ of the targeted output voltage 2182.

$$D_{24V} = \frac{V_{24V\_T} - V_{24V\_OFF}}{V_{24V\_ON} - V_{24V\_OFF}} \quad \text{formula (12)}$$

$$D_{5V} = \frac{V_{5V\_T} - V_{5V\_OFF}}{V_{5V\_ON} - V_{5V\_OFF}} \quad \text{formula (13)}$$

Thus, the approximate duty of the PWM signal 13522 can be defined with respect to the voltage values $V_{24V\_T}$ and $V_{5V\_T}$ of the targeted output voltage 2182. However, actually, an error is present, since there are the rising time and falling time of the PWM signal 13522, and the saturation voltage $V_{CE(sat)}$. In order to accurately output the target output voltage 2182, the duty of the PWM signal 13522 needs to be adjusted. The duty serving as the optimum voltage value may be stored in advance in the memory 5012, and may be read by the control unit 5002, or may be monitored and fed back by an AD converter (not shown) of the control unit 5002. As the data stored in the memory 5012, there are the duty [%], the ON time, the clock number of ON, etc.

As examples of the specific numerical values, it is assumed that $V_{REF}$=2.5 V, $R_{2232}$=39 kΩ, $R_{2242}$=4.3 kΩ, $R_{2262}$=33 kΩ, $R_{1232}$=47 kΩ, $R_{1252}$=1 kΩ, $R_{12822}$=220 kΩ, and $R_{1292}=1$ kΩ. In this case, by changing the duty of the PWM signal 13522, in the stand-by state or the print state, the output voltage 2182 is adjusted to be 22292 V<V24 V<27.16 V, which is within a first range. Additionally, in the sleeping state, the output voltage 2182 is adjusted to be 4.78 V<$V_{5V}$<7.10 V, which is within a second range. Further, assuming that the optimum voltage value at the time of the stand-by state or the print state is $V_{24V}$=24.0 V, the duty of the PWM signal 13522 will be $D_{24V}$=35.0%. Assuming that the optimum voltage value at the time of the sleeping state is $V_{5V}$=5.15 V, the duty of the PWM signal 13522 will be $D_{5V}$=15.9%.

[Description of Control Operation]

FIG. 28A to FIG. 28E illustrate the timing charts of the operation of the power supply 1082 in a case where the printer 100 transitions from the stand-by state to the sleeping state. It is assumed that the above-described specific numerical values are used for the respective constants in the description of FIG. 28A to FIG. 28E. In other words, it is assumed that $V_{REF}$=2.5 V, $R_{2232}$=39 kΩ, $R_{2242}$=4.3 kΩ, $R_{2262}$=33 kΩ, $R_{1232}$=47 kΩ, $R_{1252}$=1 kΩ, $R_{12822}$=220 kΩ, and $R_{1292}$=1 kΩ. Additionally, it is assumed that $V_{FB(Dc/DC)}$=1242 V, $R_{3742}$=39 kΩ, $R_{3762}$=14.7 kΩ $V_{REF(REG)}$=1242V, $R_{3542}$=47 kΩ, and $R_{3552}$=14.7 kΩ. The voltage adjustment range of the output voltage 2182 is the above-described 22292V<$V_{24V}$<27.16 V and 4.78 V<$V_{5V}$<7.10 V. The output voltage 3182 is controlled to be $V_{5V\_DC/DC}$=5.21 V and $V_{5V\_REG}$=5.20 V.

In the graphs of FIG. 28A to FIG. 28E, the horizontal axes represent the time t. The vertical axes of FIG. 28A to FIG. 28E represent the output (high level (High) or low level (Low)) of the AC/DC converter output voltage switching signal 2012 in FIG. 28A, the waveform (24 V, 5.15 V) of the output voltage 2182 in FIG. 28B, the output (ON or OFF) of the regulator start-up signal 4012 in FIG. 28C, the output (ON or OFF) of the DC/DC converter start-up signal 3012 in FIG. 28D, and the output (ON or OFF) of the load SW control signal 6012 in FIG. 28E, respectively.

(Transition from the Stand-by State to the Sleeping State)

In the stand-by states (or the print state), the AC/DC converter output voltage switching signal 2012 is at the high level, and the output voltage 2182 is 24.0 V. Additionally, the regulator start-up signal 4012 is turned off, the DC/DC converter start-up signal 3012 is turned on, and the load SW control signal 6012 is turned on. The output voltage 2182 is V24V=24.0 V ($D_{24V}$=35.0%), and the output voltage 3182 is $V_{5V\_DC/DC}$=5.21 V. The regulator 4002 is in the turn-off state.

The timing Ta indicates the timing at which the predetermined time has elapsed since the printer 100 transitioned to the stand-by state. As described above, in a case where the predetermined time has elapsed since the printer 100 transitioned to the stand-by state, in order to reduce the consumption power of the printer 100, the control unit 5002 makes the printer 100 transition to the sleeping state. At the timing Ta, the control unit 5002 switches the AC/DC converter output voltage switching signal 2012 from the high level to the low level. As described above, the AC/DC converter 2002 controls the output voltage 2182 to be 24 V when the AC/DC converter output voltage switching signal 2012 is at the high level. The AC/DC converter 2002 controls the output voltage 2182 to be about 5 V (the voltage value of 4.78 V<$V_{5V}$<7.10 V by the duty of the PWM signal 13522 in the above-described constant), when the AC/DC converter output voltage switching signal 2012 is at the low level.

Additionally, when transition is performed to the sleeping state from the stand-by state at the timing Ta, the control unit 5002 changes the duty of the PWM signal 13522. The reason is for adjusting the output voltage 2182 to the input voltage (=the output voltage 2182) with which the DC/DC converter 3002 can operate, and to the input voltage as low as possible. As described above, since the maximum duty of the DC/DC converter 3002 is 80%, in a case where the output voltage 2182 is controlled to be the target voltage 5.15 V, the DC/DC converter 3002 can operate until the output voltage 2182 is 5.15 V/80%=6.44 V. For example, assuming that the duty of the PWM signal 13522 is $D_{5V}$=82.6% from the formula (13), the output voltage 2182 will be 6.70 V. In this manner, the control unit 5002 adjusts the target voltage value ($V_{5V\_T}$) of the output voltage 2182 to be 6.70 V at the timing Ta, by switching the duty of the PWM signal 13522 from 35% to 82.6%. Accordingly, also when the output voltage 2182 decreases, the DC/DC converter 3002 can output 5.21 V, which is the target voltage.

The timing Tb is the timing at which the output voltage 2182 has become 6.70 V. The time until the output voltage 2182 becomes 6.7 V from 24.0 V is T1. At the timing Tb, the control unit 5002 turns off the DC/DC converter start-up signal 3012, after turning on the regulator start-up signal 4012. Then, the control of the output voltage 3182 is switched from the DC/DC converter 3002 to the regulator 4002. In this manner, the timing at which the DC/DC converter 3002 is operated close to (for example, 6.7 V) the lower limit (for example, 6.44 V) of the voltage range where the DC/DC converter 3002 can operate, and at which the operation of the regulator 4002 is started is assumed to be the timing at which the output voltage 2182 decreases, when possible. Accordingly, the voltage applied between the drain and source of the FET 3852 of the regulator 4002 can be made low. Accordingly, the inexpensive FET 3852 having a low tolerance for the drain-source voltage and a low on-resistance can be selected. Additionally, at the timing Tb, in order to make the output voltage 2182 to be 5.15 V, which is the target voltage, the duty of the PWM signal 13522 is further changed. In a case where the output voltage 2182 is 5.15 V, the duty of the PWM signal 13522 will be $D_{5V}$=15.9% from the formula (13).

The timing Tc is the timing at which the output voltage 2182 has become 5.15 V. The time until the output voltage 2182 becomes 5.15 V from 6.7 V is T2. At the timing Tc, the control unit 5002 stops supplying voltage to a load in the subsequent stage of the FET 6002 that is not required in the sleeping state, by turning off the load SW control signal 6012, and turning off the FET 6002. For example, to stop supplying voltage to a paper conveyance sensor (not shown), etc. that detects the position of a recording material that is being printed can be mentioned. Accordingly, the consumption power in the sleeping state can be further reduced. As described above, the printer 100 completes transition from the stand-by state to the sleeping state.

Note that, in the sleeping state, the output voltage 2182 is $V_{5V}$=5.15 V ($D_{5V}$=15.9%), the DC/DC converter 3002 is turned off, the regulator 4002 is turned on, and $V_{5V\_REG}$=5.20 V. Therefore, the FET 3852 of the regulator 4002 is in the 100% turn-on state, and 5.15 V is output for the output voltage 3182.

(Transition from the Sleeping State to the Stand-by State)

Next, the operation of the power supply 1082 in a case where the printer 100 transitions from the sleeping state to the stand-by state is described. For example, in a case where a print instruction is notified to the printer 100 from an external equipment (not shown) such as a personal computer, in order to start the print operation, the control unit 5002 makes the printer 100 transition from the sleeping state to the stand-by state.

At the timing Td, the control unit 5002 supplies power to the output voltage 5182 by switching the load SW control signal 6012 from off to on, and bringing the load SW 6002 into the turn-on state. The time T3 is a turn-on waiting time of the load SW 6002.

Next, at the timing Te, the control unit 5002 makes the AC/DC converter output voltage switching signal 2012 from the low level to the high level, and changes the duty of the PWM signal 13522. Here, in order to set the target voltage of the output voltage 2182 to 24.0 V, the duty of the PWM signal 13522 is $D_{24V}=35.0\%$ from the formula (12).

Next, the timing Tf is the timing at which the output voltage 2182 becomes 6.7 V. The time until the output voltage 2182 becomes 6.7 V from 5.15 V is T4. At this time, after turning on the DC/DC converter start-up signal 3012, the control unit 5002 turns off the regulator start-up signal 4012. As a method of determining the timing Tf, for example, the output voltage 2182 may be AD converted and monitored by the control unit 5002, or the timing Tf may be predicted from the rising time of the output voltage 2182.

The timing Tg is the timing at which the output voltage 2182 becomes 24.0 V. The time until the output voltage 2182 becomes 24.0 V from 6.7 V is 15. The transition to the stand-by state is completed at the timing Tg.

Additionally, in Example 9, the switching (24V/5V) of the output voltage 2182 is performed by switching the resistance value $(R_{2242}+R_{2262})$ connected to the REF terminal of the shunt regulator 2252 to one of $(R_{2242}+R_{2262})$ and $R_{2242}$ by the FET 2272. However, 24 V and 5 V can be output for the output voltage 2182 only by controlling the duty of the PWM signal 13522. As examples of the specific numerical values, it is assumed that $V_{REF}=2.5$ V, $R_{2232}=39$ kΩ, $R_{2242}=4.3$ kΩ, $R_{2262}=33$ kΩ, $R_{1232}=1$ kΩ, $R_{1252}=2.2$ kΩ, $R_{12822}=1$ kΩ, and $R_{1292}=47$ kΩ. From the formula (11), the output voltage 2182 ($V_O$) at this time is controlled to be 4.70 V<$V_O$<27.12 V. However, it is necessary to note that the output voltage 2182 cannot be adjusted finely by adjusting from 5 V to 24 V with the PWM signal 13522 in the PWM signal 13522 having the same resolution.

Additionally, in Example 9, the output voltage 2182 is adjusted by the PWM signal 13522. However, the output voltage 2182 may be adjusted by, for example, outputting a predetermined direct current voltage to a connection point 2362 using a DA converter (not shown), etc. of the control unit 5002, and adjusting the voltage of the REF terminal of the shunt regulator 2252, or may be adjusted by other methods.

As described above, according to Example 9, when transitioning to the power-saving (sleep) state in which the input voltage (the output voltage 2182) to the DC/DC converter 3002 is reduced, the applied voltage to the FET 3852 can be reduced as much as possible. Additionally, in the power-saving (sleep) state, the voltage accuracy of the output voltage 3182 can be improved, while reducing the consumption power by stopping the switching operation of the DC/DC converter 3002.

As mentioned above, according to Example 9, the voltage accuracy of the output voltage in the power supply can be improved in the low consumption power mode.

Example 10

Figure 29:
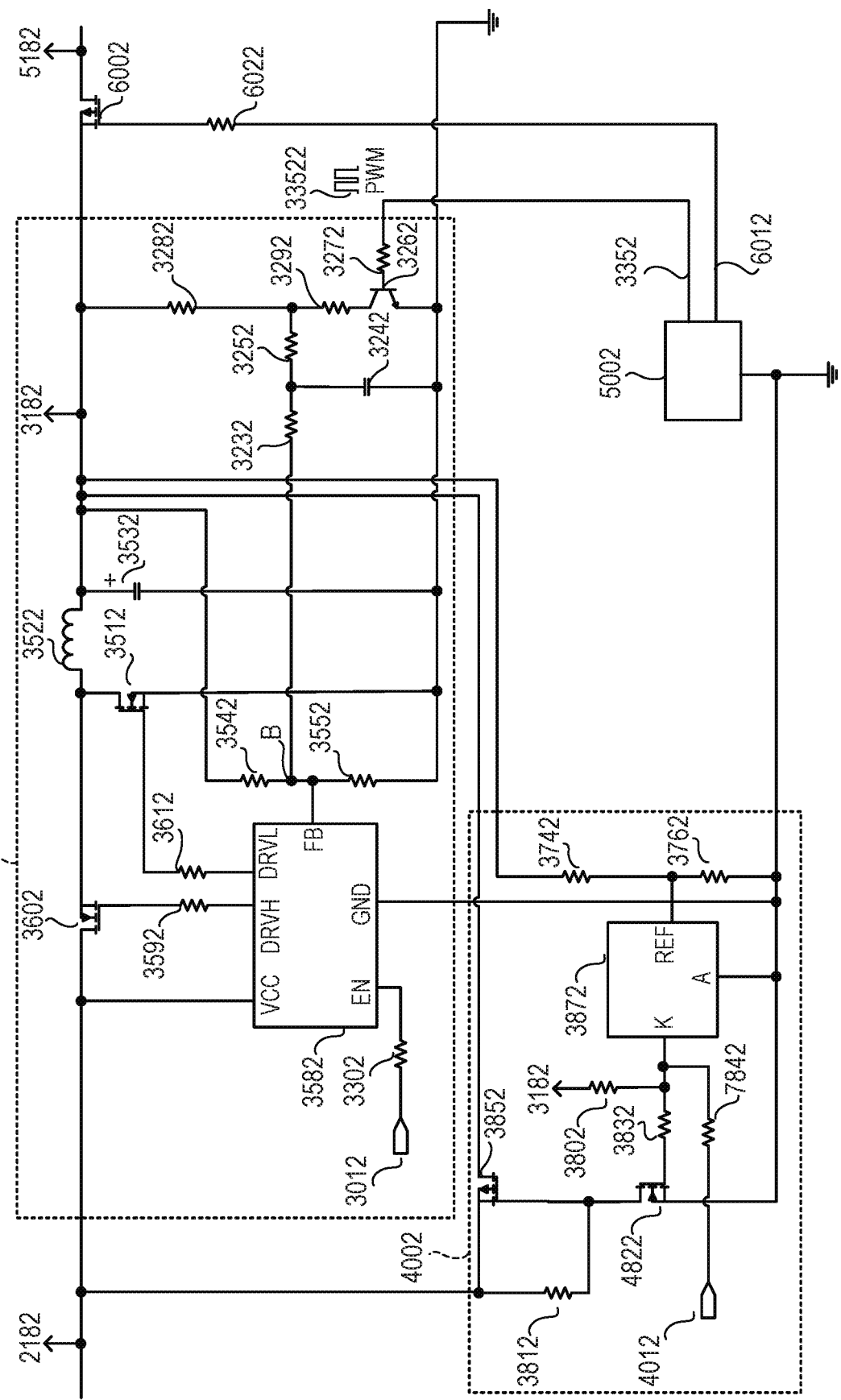
FIG. 29 is a circuit configuration diagram of a second power supply and a third power supply in Embodiment 10.

In Example 9, the configuration of adjusting the output voltage 2182 of the AC/DC converter 2002 with the PWM signal 13522 has been described. In Example 10, the configuration of adjusting the target voltage by the DC/DC converter 3002 of the output voltage 3182 with the PWM signal in addition to the output voltage 2182 is described. Hereinafter, the same numerals are assigned to the same configurations as those in the power supply 1082 of Example 9, and a description is omitted. FIG. 25 and FIG. 26 are the same circuit configurations also in Example 10. FIG. 29 illustrates the circuit diagram of the second power supply 3002 and the regulator 4002 in Example 10. Compared with Example 9, a PWM signal 33522, which is a second PWM signal for adjusting the feedback unit of the DC/DC converter 3002, is added.

The control unit 5002 outputs the PWM signal 33522 to the base terminal of a transistor 3262 of the DC/DC converter 3002 via a resistor 3272. A resistor 3252 and a capacitor 3242 are a circuit operated with a predetermined time constant, similarly to the circuit including the resistor 1252 and the capacitor 1242 of FIG. 26. In the DC/DC converter 3002 of FIG. 29, the added resistor 3232, resistor 3252, resistor 3282, resistor 3292, capacitor 3242, transistor 3262, and resistor 3272 are the circuit for changing the voltage value input to the FB terminal of the power supply IC 3582. The resistor 3232 is connected to the connection point B between the resistor 3542 and the resistor 3552.

Additionally, as for the regulator 4002, a modification of the regulator 4002 of Example 9 is illustrated, the Zener diode 3942 and the resistor 3932 are omitted, and the transistor 3822 is changed to an FET 482. Further, in Example 9, the output voltage 2182 is connected to the base terminal of the transistor 3822 of the regulator 4002 via the resistor 3832, the Zener diode 3942, and the resistor 3802. In Example 10, the output voltage 3182 is connected to the gate terminal of the FET 482 via the resistor 3832 and the resistor 3802. Further, the load SW 6002 is specifically an FET 6002, and the load SW control signal 6012 is output to the gate terminal of the FET 6002 via a resistor 6022.

[Adjustment Range of Output Voltage 3182 by PWM Signal 33522]

(When the Duty of the PWM Signal 33522 is 0%)

When the duty of the PWM signal 33522 is 0%, the transistor 3262 will be in the non-conductive state. Here, it is assumed that the resistance values of the resistor 3232, the resistor 3252, the resistor 3282, and the resistor 3292 are $R_{3232}$, $R_{3252}$, $R_{3282}$, and $R_{3292}$, respectively, and the combined resistance value of the resistor 3542, the resistor 3232, the resistor 3252, and the resistor 3282 is $R_{3542OFF}$. Then, the combined resistance $R_{3542OFF}$ can be expressed by the following formula (14).

$$R_{3540FF} = \frac{R_{354} \cdot (R_{323} + R_{325} + R_{328})}{R_{354} + R_{323} + R_{325} + R_{328}} \quad \text{formula (14)}$$

Assuming that the reference voltage inside the power supply IC 3582 is $V_{FB(DC/DC)}$, the output voltage 3182 ($V_{5V\_DC/DC\_OFF}$) at this time is controlled to be the value derived from the next formula (15).

$$V_{SV\_DCDC\_OFF} = V_{FB(DCDC)} \cdot \frac{R_{3540FF} + R_{355}}{R_{355}} \quad \text{formula (15)}$$

(When the Duty of the PWM Signal 33522 is 100%)

It is assumed that, when the duty of the PWM signal 33522 is 100%, the resistance value of the resistor 3552 is $R_{3552}$, and the combined resistance value of the resistor 3552, the resistor 3232, the resistor 3252, and the resistor 3292 is $R_{3552ON}$. For simplification of calculation, assuming that the saturation voltage $V_{CE(sat)}$ between the collector and emitter of the transistor 3262 is so small that it is negligible, it can be expressed by a formula (16).

$$R_{355ON} = \frac{R_{355} \cdot (R_{323} + R_{325} + R_{329})}{R_{355} + R_{323} + R_{325} + R_{329}} \quad \text{formula (16)}$$

The output voltage 3182 ($V_{5V\_DC/DC\_ON}$) at this time is controlled as expressed by a formula (17).

$$V_{5V\_DCDC\_ON} = V_{FB(DCDC)} \cdot \frac{R_{355ON} + R_{354}}{R_{355ON}} \quad \text{formula (17)}$$

(Available Range for the Output Voltage 3182)

Thus, when the PWM signal 33522 is changed from 0% to 100%, the available range for the output voltage 3182 ($V_{5V\_DC/DC}$) is expressed by the next formula (18) from the formula (15) and the formula (17).

$$V_{FB(DCDC)} \cdot \frac{R_{354OFF} + R_{355}}{R_{355}} = \quad \text{formula (18)}$$

$$V_{5V\_DCDC\_OFF} \leq V_{5V\_DCDC} \leq V_{5V\_DCDC\_ON} =$$

$$V_{FB(DCDC)} \cdot \frac{R_{533ON} + R_{354}}{R_{533ON}}$$

It is assumed that $V_{FB(DC/DC)}$=1242 V, $R_{3542}$=39 kΩ, $R_{3552}$=12 kΩ, $R_{3232}$=10 kΩ, $R_{3252}$=$10$ kΩ, $R_{3282}$=470 kΩ, and $R_{3292}$=1 kΩ. Then, from the formula (18), the output voltage 3182 ($V_{5V\_DC/DC}$) is controlled to be 4.97 V<$V_{5V\_DC/DC}$<7.57 V, which is within a third range. Additionally, the duty $D_{5V\_DC/DC}$ of the PWM signal 33522 and the output voltage 3182 ($V_{5V\_DC/DC}$) are in a proportional relationship, and $D_{5V\_DC/DC}$ can be expressed by the next formula (19) using the targeted voltage value $V_{5V\_DC/DC\_T}$ of the output voltage 3182.

$$D_{5V\_DCDC} = \frac{V_{5V\_DCDC\_T} - V_{5V\_DCDC\_OFF}}{V_{5V\_DCDC\_ON} - V_{5V\_DCDC\_OFF}} \quad \text{formula (19)}$$

In Example 10, in order to achieve $V_{5V\_DC/DC}$=5.24 V, the duty $D_{5V\_DC/DC}$ is 10.3%. By using the PWM signal 33522, the output voltage 3182 in the stand-by state can be adjusted.

[Description of Control Operation]

Example 10 is also described by using FIG. 28A to FIG. 28E of Example 9. FIG. 28A to FIG. 28E are diagrams illustrating the timing charts of the operation of the power supply 1082 in a case where the printer 100 transitions from the stand-by state to the sleeping state. In the stand-by state (or the print state), the AC/DC converter output voltage switching signal 2012 is at the high level, and the output voltage 2182 is 24.0 V. Additionally, in the stand-by state (or the print state), the regulator start-up signal 4012 is turned off, the DC/DC converter start-up signal 3012 is turned on, and the load SW control signal 6012 is turned on. The output voltage 2182 is $V_{24V}$=24.0 V ($D_{24V}$=35.0%), and the output voltage 3182 is $V_{5V\_DC/DC}$=5.24 V. The regulator 4002 is in the turn-off state. As the timing charts, since they are the same as those in Example 9, a description is omitted.

The difference from Example 9 that does not appear in the timing charts of FIG. 28A to FIG. 28E is as follows. Since the maximum duty of the DC/DC converter 3002 is 80%, in a case where the output voltage 3182 is controlled to be the target voltage 5.24 V, the DC/DC converter 3002 can operate until the output voltage 2182 is 5.24V/80%=6.55 V. In Example 10, since the output voltage 3182 is 5.24 V, the voltage range in which the DC/DC converter 3002 can operate is different from that in Example 9. Additionally, the maximum duty of the DC/DC converter 3002 is 80% in Example 10. However, in a case of the DC/DC converter 3002 that can have the maximum duty of 100%, even if the DC/DC converter start-up signal 3012 is not turned off, the loss of the DC/DC converter 3002 can be reduced. In this case, at the timing Tb of FIG. 28A to FIG. 28E, the target output voltage value is set to be 7.0 V, which is near the maximum value (7.1 V) in the adjustment range of the output voltage 2182 in the sleeping state, and is made larger than the output voltage 2182 (6.7 V) at the time of the maximum duty 80%. Accordingly, since the DC/DC converter 3002 is turned on 100%. the loss due to the switching operation of the DC/DC converter 3002 can be reduced.

Additionally, in Example 10, although the PWM signal is output in order to adjust the target output voltage of the AC/DC converter 2002 and the target output voltage of the DC/DC converter 3002, the PWM signal 33522 may be output only to the DC/DC converter 3002. At this time, in the mode (the stand-by state or the print state) in which the AC/DC converter 2002 is outputting 24 V, the improvement in the voltage accuracy of the output voltage 3182 is enabled. As described above, according to Example 10, in addition to Example 9, the accuracy of the output voltage can be improved, by adjusting the output voltage 3182 in the stand-by state and the print state.

As mentioned above, according to Example 10, in the low consumption power mode, the voltage accuracy of the output voltage in the power supply can be improved.

Example 11

Figure 30:
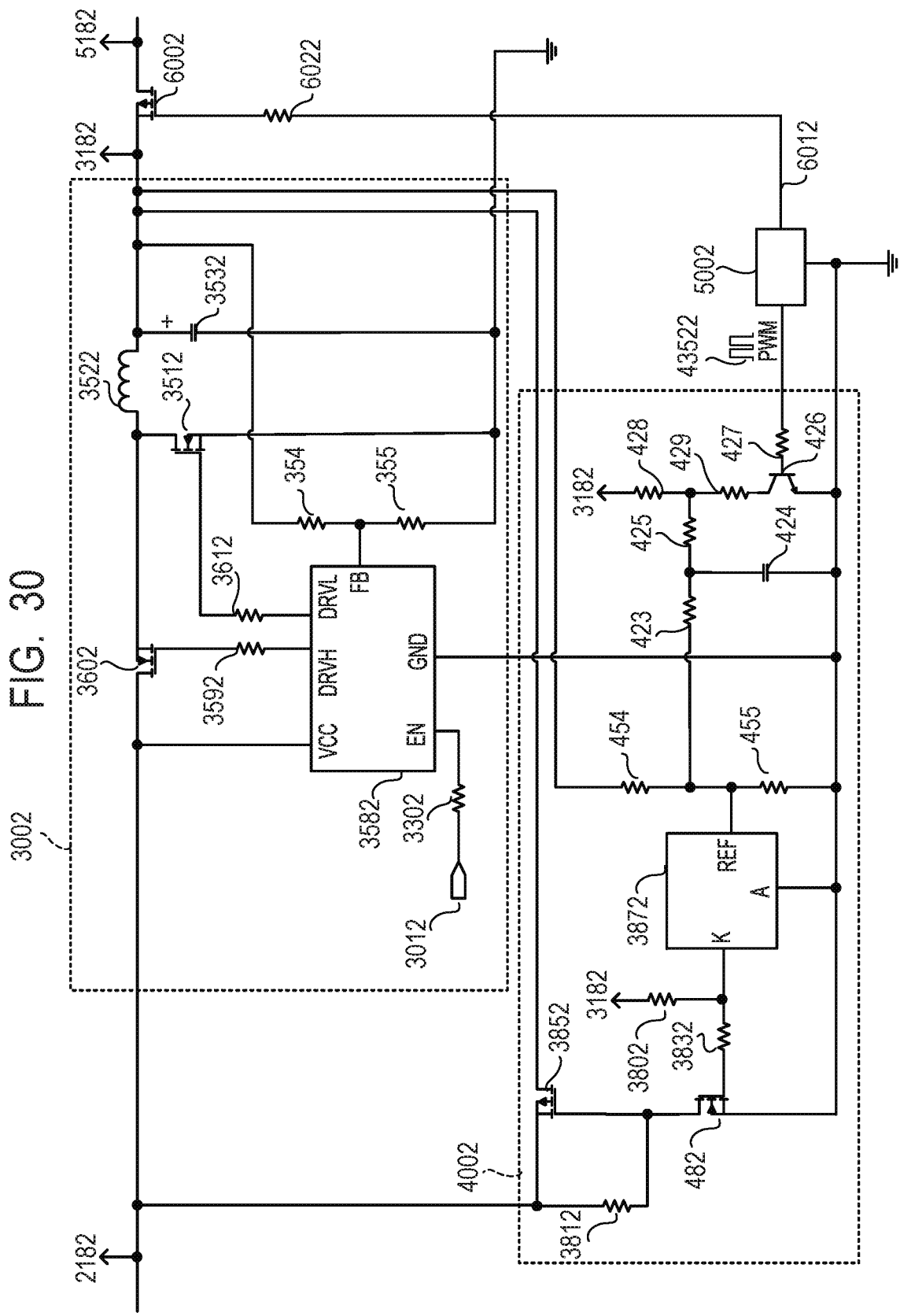
FIG. 30 is a circuit configuration diagram of a second power supply and a third power supply in Embodiment 11.

In Example 9, the configuration of adjusting the output voltage 2182 of the AC/DC converter 2002 with the PWM signal 13522 has been described. In Example 11, the configuration of adjusting the target voltage by the regulator 4002 of the output voltage 3182 in addition to the output voltage 2182 with the PWM signal 43522, which is a third PWM signal, is described. Hereinafter, the same numerals are assigned to the same configurations as those in the power supply 1082 of Example 9, and a description is omitted. FIG. 25 and FIG. 26 are the same circuit configurations also in Example 11. FIG. 30 illustrates the circuit diagram of the second power supply 3002 and the regulator 4002 in Example 11. Compared with Example 9, the PWM signal 43522 that adjusts the feedback unit of the regulator 4002 is added, and the regulator start-up signal 4012 is eliminated.

The control unit 5002 outputs the PWM signal 43522 to the base terminal of a transistor 426 of the regulator 4002 via a resistor 427. A resistor 425 and a capacitor 424 are a circuit operated with a predetermined time constant, similarly to the circuit including the resistor 1252 and the capacitor 1242 of FIG. 26. In the regulator 4002 of FIG. 30, the added resistor 423, resistor 425, resistor 428, resistor 429, capacitor 424, transistor 426, and resistor 427 are the circuit for changing the voltage value input to the REF terminal of the shunt regulator 3872.

Additionally, in the regulator 4002, similar to the regulator 4002 of Example 10, the Zener diode 3942 and the resistor 3932 of Example 9 are omitted, and the transistor 3822 is changed to the FET 482. Further, in Example 9, the output voltage 2182 is connected to the base terminal of the transistor 3822 of the regulator 4002 via the resistor 3832, the Zener diode 3942, and the resistor 3802. Also in Example 11, the output voltage 3182 is connected to the gate terminal of the FET 482 via the resistor 3832 and the resistor 3802.

[Adjustment Range of Output Voltage 3182 by PWM Signal 43522]

(When the Duty of the PWM Signal 43522 is 0%)

It is assumed that, when the duty of the PWM signal 43522 is 0%, the resistance values of the resistor 423, the resistor 425, the resistor 428, and the resistor 429 are $R_{423}$, $R_{425}$, $R_{428}$, and $R_{429}$, respectively, and the combined resistance value of the resistor 454, the resistor 423, the resistor 425, and the resistor 428 is $R_{454OFF}$. Then, the combined resistance $R_{454OFF}$ can be expressed by the next formula (20).

$$R_{454OFF} = \frac{R_{454} \cdot (R_{423} + R_{425} + R_{428})}{R_{454} + R_{423} + R_{425} + R_{428}} \quad \text{formula (20)}$$

Assuming that the reference voltage inside the shunt regulator 3872 is $V_{REF(REG)}$, the output voltage 3182 ($V_{5V\_REG\_OFF}$) at this time is controlled to be the value derived from the next formula (21).

$$V_{5V\_REG\_OFF} = V_{REF(REG)} \cdot \frac{R_{454OFF} + R_{455}}{R_{455}} \quad \text{formula (21)}$$

(When the Duty of the PWM Signal 43522 is 100%)

It is assumed that when the duty of the PWM signal 43522 is 100%, the resistance value of the resistor 455 is $R_{455}$, and the combined resistance value of the resistor 455, the resistor 423, the resistor 425, and the resistor 429 is $R_{455ON}$. For simplification of calculation, assuming that the saturation voltage $V_{CE(sat)}$ between the collector and emitter of the transistor 426 is so small that it is negligible, it can be expressed by the next formula (22).

$$R_{455ON} = \frac{R_{455} \cdot (R_{423} + R_{425} + R_{429})}{R_{455} + R_{423} + R_{425} + R_{429}} \quad \text{formula (22)}$$

The output voltage 3182 ($V_{5V\_REG\_ON}$) at this time is controlled as expressed by the next formula (23).

$$V_{5V\_REG\_ON} = V_{REF(REG)} \cdot \frac{R_{455ON} + R_{454}}{R_{455ON}} \quad \text{formula (23)}$$

(The Available Range for the Output Voltage 3182)

Thus, when the PWM signal 43522 is changed from 0% to 100%, the available range for the output voltage 3182 ($V_{5V\_REG}$) is expressed by the next formula (24) from the formula (21) and the formula (23).

$$V_{REF(REG)} \cdot \frac{R_{454OFF} + R_{455}}{R_{455}} = \quad \text{formula (24)}$$
$$V_{5V\_REG\_OFF} \leq V_{5V\_REG} \leq V_{5V\_REG\_ON} =$$
$$V_{REF(REG)} \cdot \frac{R_{455ON} + R_{454}}{R_{455ON}}$$

Here, it is assumed that $V_{REF(REG)}$=1242 V, $R_{454}$=39 kΩ, $R_{455}$=12 kΩ, $R_{423}$=10 kΩ, $R_{425}$=10 kΩ, $R_{428}$=470 kΩ, and $R_{429}$=1 kΩ. From the formula (24), the output voltage 3182 ($V_{5V\_REG}$) is controlled to be 4.97 V<$V_{5V\_REG}$<7.57 V, which is within a fourth range. Additionally, the duty $D_{5V\_REG}$ of the PWM signal 43522 and the output voltage 3182 ($V_{5V\_REG}$) are in a proportional relationship, and $D_{5V\_REG}$ can be expressed by the next formula (25) using the targeted voltage value $V_{5V\_REG\_T}$ of the output voltage 3182.

$$D_{5V\_REG} = \frac{V_{5V\_REG\_T} - V_{5V\_REG\_OFF}}{V_{5V\_REG\_ON} - V_{5V\_REG\_OFF}} \quad \text{formula (25)}$$

[Description of Control Operation]

Figure 28:
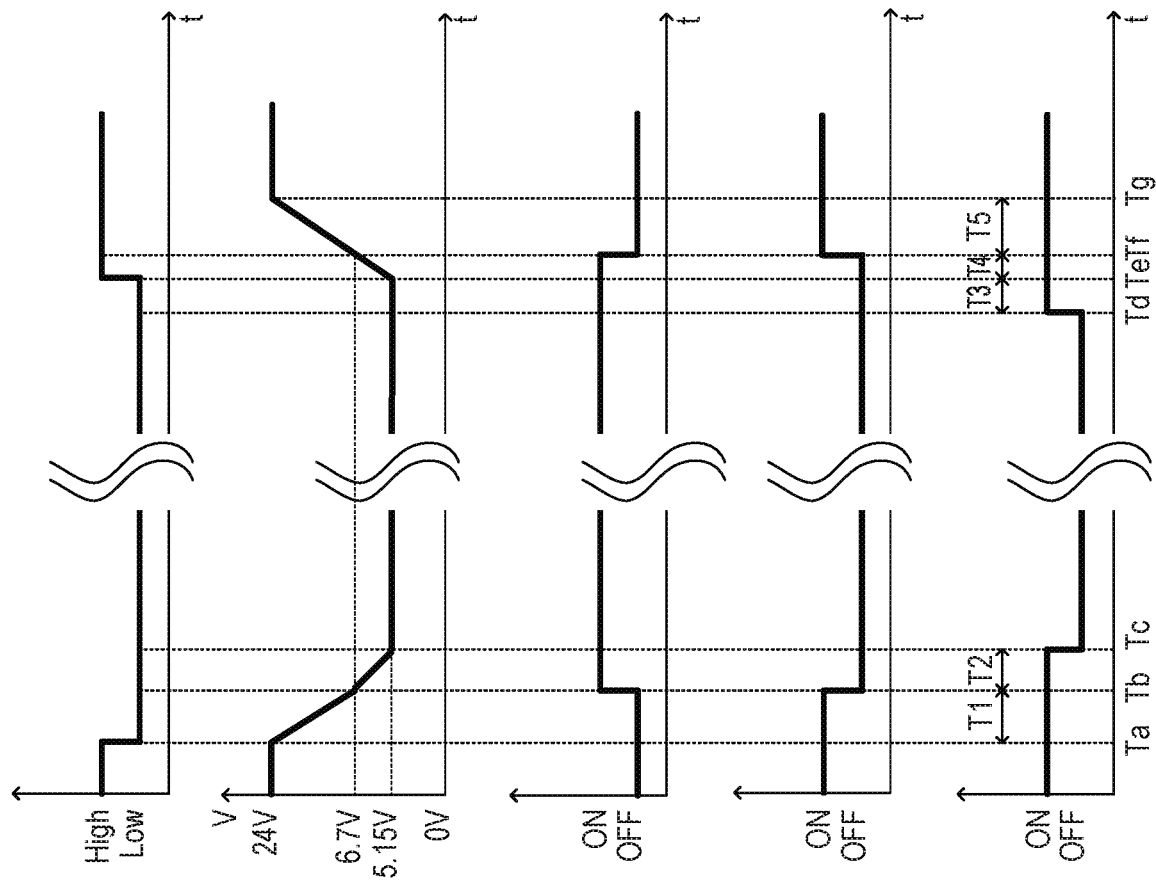
FIG. 28A, FIG. 28B, FIG. 28C, FIG. 28D and FIG. 28E are timing charts illustrating transitions between stand-by and sleeping in Embodiment 9.

FIG. 31A to FIG. 31D illustrate the timing charts of the operation of the power supply 1082 in a case where the printer 100 transitions from the stand-by state to the sleeping state. In comparison with the timing charts of FIG. 28A to FIG. 28E, the regulator start-up signal 4012 of FIG. 28C is eliminated, and the output voltage 3182 in the sleeping state is set to 5.20 V in FIG. 31A to FIG. 31D.

(Transition from the Stand-by State to the Sleeping State)

In the stand-by state (and the print state), the AC/DC converter output voltage switching signal 2012 is at the high level, the output voltage 2182 is 24.0 V, the DC/DC converter start-up signal 3012 is turned on, and the load SW control signal 6012 is turned on. The output voltage 2182 is $V_{24V}$=24.0 V ($D_{24V}$=35.0%), and the output voltage 3182 is $V_{5V\_DC/DC}$=5.20 V. The target voltage value $V_{5V\_REG\_T}$ of the regulator 4002 is 5.15 V ($D_{5V\_REG}$=6.8%). Since the output voltage 3182 is higher than $V_{5V\_REG\_T}$, the FET 3852 of the regulator 4002 is in the 100% turn-off state. In this manner, in Example 11, the regulator start-up signal 4012 may not be input to the regulator 4002.

At the timing Ta, in order to make the printer 100 transition to the sleeping state, the control unit 5002 switches the AC/DC converter output voltage switching signal 2012 from the high level to the low level. The output voltage 2182 is controlled to be about 5 V. Additionally, the control unit 5002 changes the duty of the PWM signal 13522. The reason is for adjusting the output voltage 2182 to the input voltage (=the output voltage 2182) with which the DC/DC converter 3002 can operate, and to the input voltage as low as possible. As described above, since the maximum duty of the DC/DC converter 3002 is 80%, in a case where the output voltage 3182 is controlled to be the target voltage 5.20 V, the DC/DC converter 3002 can operate until the output voltage 2182 is 5.20V/80%=6.5 V. For example, assuming that the duty of the PWM signal 13522 is $D_{5V}$=82.6% from the formula (13), the output voltage 2182 is 6.70 V. Accordingly, also when the output voltage 2182 decreases, the DC/DC converter 3002 can output 5.20 V, which is the target voltage.

The timing Tb is the timing at which the output voltage 2182 has become 6.70 V The time until the output voltage 2182 becomes 6.7 V from 24.0 V is T1. At the timing Tb, the DC/DC converter start-up signal 3012 is turned off, after changing the duty of the PWM signal 43522. Then, the control of the output voltage 3182 is switched from the DC/DC converter 3002 to the regulator 4002. Assuming that the duty of the PWM signal 43522 at this time is $D_{5V\_REG}$=8.7% from the formula (25), the output voltage 3182 is controlled to be 5.20 V. In this manner, the control unit 5002 changes the duty of the PWM signal 43522 to 8.7% at the timing Tb. Further, the control unit 5002 changes the duty of the PWM signal 13522 in order to set the output voltage 2182 to 5.20 V, which is the target voltage. In a case where the output voltage 2182 is 5.20 V, the duty of the PWM signal 13522 is $D_{5V}$=18.0% from the formula (13).

The timing Tc is the timing at which the output voltage 2182 has become 5.20 V. The time until the output voltage 2182 becomes 5.20 V from 6.7 V is T2. At the timing Tc, in order to achieve $V_{5V\_REG}$=5.24 V, the control unit 5002 changes the duty of the PWM signal 43522 to $D_{5V\_REG}$=10.3% (from the formula (25)). As described above, since the output voltage 2182 is lower than the target voltage value of the regulator 4002 (5.20 V<5.24 V), the FET 3852 of the regulator 4002 is in the 100% turn-on state. The FET 3852 can be positively brought into the 100% turn-on state by adjusting the target value of the output voltage 3182 of the regulator 4002 with the PWM signal 43522.

Further, the control unit 5002 stops supplying voltage to a load in the subsequent stage of the FET 6002 that is not required in the sleeping state, by turning off the load SW control signal 6012, and turning off the FET 6002. For example, there is a paper conveyance sensor (not shown), etc. that detects the position of a recording material that is being printed. Accordingly, the consumption power in the sleeping state is further reduced. As described above, the printer 100 completes the transition from the stand-by state to the sleeping state.

Note that, in the sleeping state, the output voltage 2182 is $V_{5V}$=5.20 V ($D_{5V}$=18.0%), the DC/DC converter 3002 is turned off, the FET 3852 of the regulator 4002 is in the 100% turn-on state, and 5.20 V is output for the output voltage 3182.

(Transition from the Sleeping State to the Stand-by State)

Next, the operation of the power supply 1082 in a case where the printer 100 transitions from the sleeping state to the stand-by state is described. At the timing Td, the control unit 5002 supplies power to the output voltage 5182 by switching the load SW control signal 6012 from off to on, and bringing the load SW 6002 into the turn-on state. The time T3 is a turn-on waiting time of the load SW 6002.

Next, at the timing Te, the control unit 5002 changes the AC/DC converter output voltage switching signal 2012 from the low level to the high level, and changes the duty of the PWM signal 13522. In order to set the target voltage to 24.0 V, the duty of the PWM signal 13522 is $D_{24V}$=35.0% from the formula (12). Further, in order to achieve $V_{5V\_REG}$=5.20 V, the control unit 5002 changes the duty of the PWM signal 43522 to $D_{5V\_REG}$=8.7% (from the formula (25)).

Next, the timing Tf is the timing at which the output voltage 2182 becomes 6.7 V. The time until the output voltage 2182 becomes 6.7 V from 5.20 V is T4. At this time, the control unit 5002 turns on the DC/DC converter start-up signal 3012. As a method of determining the timing Tf, the output voltage 2182 may be AD converted and monitored by the control unit 5002, or the timing Tf may be predicted from the rising time of the output voltage 2182.

The timing Tg is the timing at which the output voltage 2182 becomes 24.0 V. The time until the output voltage 2182 becomes 24.0 V from 6.7 V is T5. At this time, in order to achieve $V_{5V\_REG}$=5.15 V, the duty of the PWM signal 43522 is changed to $D_{5V\_REG}$=6.8% (from the formula (25)). As described above, since the output voltage 3182 is higher than $V_{5V\_REG\_T}$ (>5.15 V), the FET 3852 of the regulator 4002 is in the 100% turn-off state. The transition to the stand-by state is completed at the timing Tg.

Additionally, in Example 11, although the PWM signal is output to the target output voltage of the AC/DC converter 2002 and the target output voltage of the regulator 4002, the PWM signal 43522 may be output only to the regulator 4002. At this time, in the low consumption power mode in which the AC/DC converter 2002 is outputting about 5 V, the improvement in the voltage accuracy of the output voltage 3182 is enabled.

As described above, according to Example 11, in addition to Example 9, the voltage accuracy can be improved by adjusting the output voltage 3182 in the sleeping state. Additionally, since the regulator start-up signal 4012 can be eliminated, the improvement in the output voltage accuracy can be enabled more inexpensively than in Example 9.

As mentioned above, according to Example 11, the voltage accuracy of the output voltage in the power supply can be improved in the low consumption power mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-229504, filed Dec. 7, 2018, 2018-244384, filed Dec. 27, 2018, 2018-244383, filed Dec. 27, 2018, and 2019-008740, filed Jan. 22, 2019, which are hereby incorporated by reference herein in their entirety.

What is claimed is:

1. A power supply capable of operating in a first state and a second state having a consumption power lower than a consumption power of the first state, the power supply comprising:
   a first power supply configured to convert AC voltage into a first DC voltage and output the first DC voltage;
   a second power supply configured to convert the first DC voltage into a second DC voltage lower than the first DC voltage in the first state output the second DC voltage to a predetermined load, wherein the second power supply is configured to stop operation in the second state;
   a third power supply configured to convert the first DC voltage into a third DC voltage lower than or equal to the first DC voltage in the second state and output the third DC voltage to the predetermined load, wherein the third power supply is configured to stop operation in the first state; and
   a first control unit configured to control the first power supply so that the first DC voltage reaches a first voltage value in the first state, and control the first power supply so that the first DC voltage reaches a second voltage value lower than the first voltage value in the second state.

2. The power supply according to claim 1, wherein the first control unit performs control to stop the operation of the second power supply during the operation of the third power supply.

3. The power supply according to claim 2, wherein the first control unit performs control to stop the operation of the second power supply before the first DC voltage decreases from the first voltage value to the second voltage value in a case where the first state transitions to the second state.

4. The power supply according to claim 3, comprising a load switch configured to be in one of a connection state in which the second DC voltage or the third DC voltage is supplied to the predetermined load and a non-connection state in which a supply of the second DC voltage and the third DC voltage to the predetermined load is cut off, wherein the first control unit performs control to bring the load switch into the non-connection state after stopping the operation of the second power supply.

5. The power supply according to claim 2, wherein the first control unit performs control to start the operation of the second power supply before the first DC voltage increases from the second voltage value to the first voltage value in a case where the second state transitions to the first state.

6. The power supply according to claim 5, comprising a load switch configured to be in one of a connection state in which the second DC voltage or the third DC voltage is supplied to the predetermined load and a non-connection state in which a supply of the second DC voltage and the third DC voltage to the predetermined load is cut off, wherein the first control unit performs control to bring the load switch into the connection state before starting the operation of the second power supply.

7. The power supply according to claim 1, comprising a second control unit configured to perform control to stop the operation of the second power supply during the operation of the third power supply operates.

8. The power supply according to claim 7, wherein the second control unit performs control to stop the operation of the second power supply before the first DC voltage decreases from the first voltage value to the second voltage value in a case where the first state transitions to the second state.

9. The power supply according to claim 8, comprising a load switch configured to be in one of a connection state in which the second DC voltage or the third DC voltage is supplied to the predetermined load and a non-connection state in which a supply of the second DC voltage and the third DC voltage to the predetermined load is cut off, wherein the first control unit performs control to bring the load switch into the non-connection state after the second control unit stops the operation of the second power supply, and wherein the second control unit stops operation in response to the load switch being in the non-connection state.

10. The power supply according to claim 7, wherein the second control unit performs control to start the operation of the second power supply before the first DC voltage increases from the second voltage value to the first voltage value in a case where the second state transitions to the first state.

11. The power supply according to claim 10, comprising a load switch configured to be in one of a connection state in which the second DC voltage or the third DC voltage is supplied to the predetermined load and a non-connection state in which a supply of the second DC voltage and the third DC voltage to the predetermined load is cut off, wherein the first control unit performs control to bring the load switch into the connection state before the second control unit starts the operation of the second power supply, and wherein the second control unit starts operation in response to the load switch being in the connection state.

12. The power supply according to claim 1, wherein the second power supply includes at least one switching element and a third control unit configured to control ON and OFF of the switching element, and wherein while the third control unit controls an ON-duty of the switching element, the ON-duty is limited to a value less than 100%.

13. The power supply according to claim 1, wherein in the second state, a target voltage value of the third DC voltage is set at a value lower than a target voltage value of the second DC voltage.

14. The power supply according to claim 1, wherein the first control unit operates on the second DC voltage or the third DC voltage.

15. The power supply according to claim 1, wherein the third power supply is a series regulator.

16. The power supply according to claim 1,
wherein the third power supply is a regulator including a switching element and configured to use the switching element to maintain an output voltage value of the third DC voltage, and
wherein the third power supply is started up by a start-up signal input into the third power supply with a timing at which a consumption power of the switching element does not exceed an allowable power of the switching element.

17. An image forming apparatus including a power supply and an image forming unit configured to form an image on a recording material, the image forming apparatus configured to receive power supplied from the power supply,
the power supply being capable of operating in a first state and a second state having a consumption power lower than a consumption power of the first state, the power supply comprising:
a first power supply configured to convert AC voltage into a first DC voltage and output the first DC voltage;
a second power supply configured to convert the first DC voltage into a second DC voltage lower than the first DC voltage in the first state and output the second DC voltage to a predetermined load, wherein the second power supply is configured to stop operation in the second state;
a third power supply configured to convert the first DC voltage into a third DC voltage lower than or equal to the first DC voltage in the second state and output the third DC voltage to the predetermined load, wherein the third power supply is configured to stop operation in the first state; and
a first control unit configured to control the first power supply so that the first DC voltage reaches a first voltage value in the first state, and control the first power supply so that the first DC voltage reaches a second voltage value lower than the first voltage value in the second state.

18. The image forming apparatus according to claim 17, comprising a second control unit configured to switch among a print state in which the image forming unit is controlled to perform image formation on a recording material, a stand-by state capable of transitioning to the print state, and a sleeping state in which a consumption power is reduced,
wherein the first control unit is configured to control the first power supply so that the first DC voltage becomes the first voltage value in the print state and the stand-by state, and control the first power supply so that the first DC voltage becomes the second voltage value in the sleeping state.

19. The image forming apparatus according to claim 18, wherein the power supply includes a load switch configured to be in one of a connection state in which the second DC voltage or the third DC voltage is supplied to the predetermined load and a non-connection state in which a supply of the second DC voltage and the third DC voltage to the predetermined load is cut off, and wherein the first control unit controls the load switch to output the second DC voltage to the predetermined load in the print state and the stand-by state and not to output the second DC voltage to the predetermined load in the sleeping state.

* * * * *